April 12, 1966 H. KOCHALSKI ETAL 3,245,558
METHOD OF AND APPARATUS FOR HANDLING CIGARETTES
AND LIKE ELONGATED ARTICLES
Original Filed March 22, 1962 22 Sheets-Sheet 1

Inventors:
Horst Kochalski   Willy Rudszinat   Harry David
Otto Erdmann      Ludwig Rode       Hans Suck
   by      Michael S. Striker
              Attorney

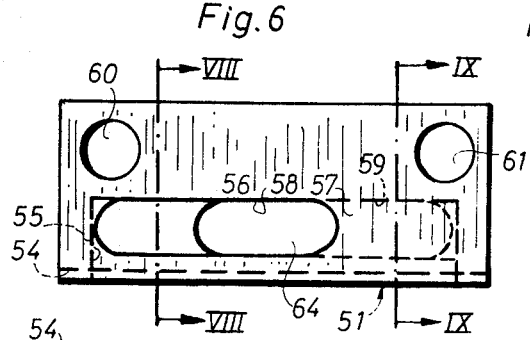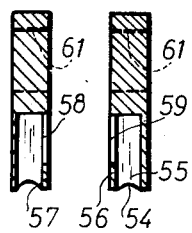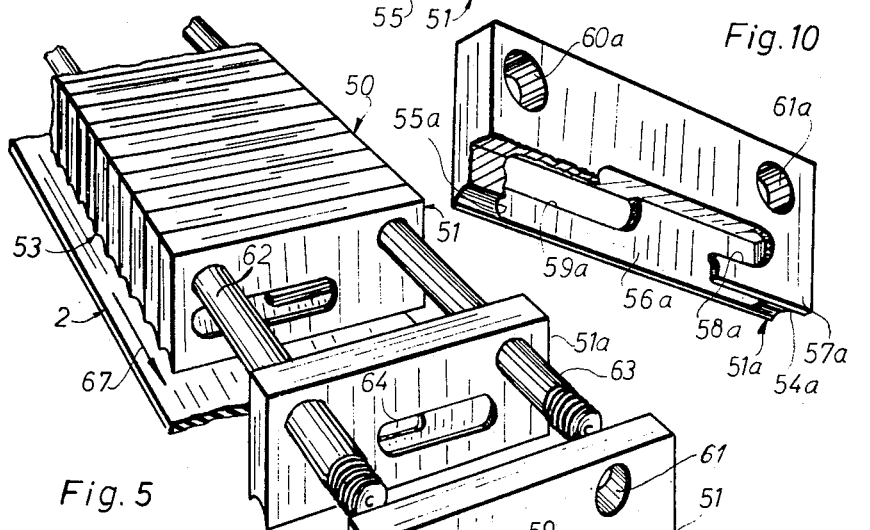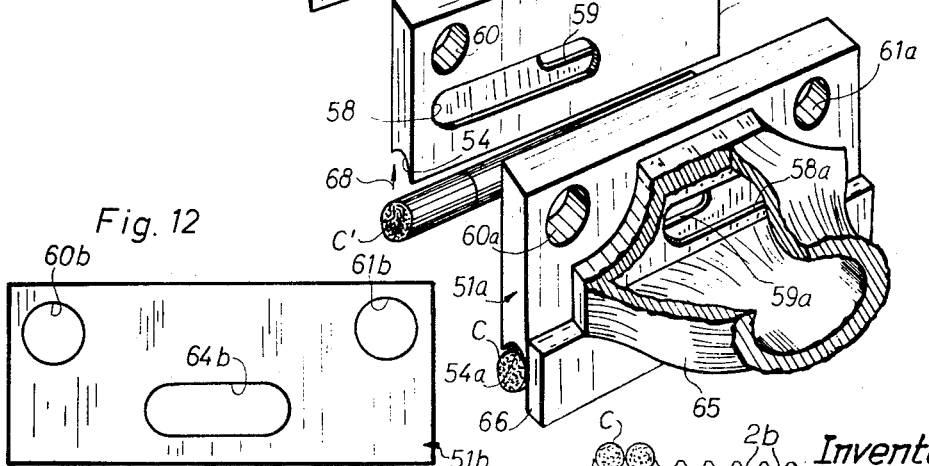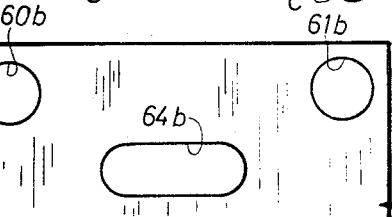

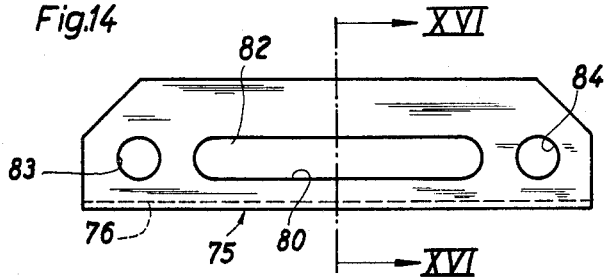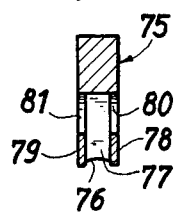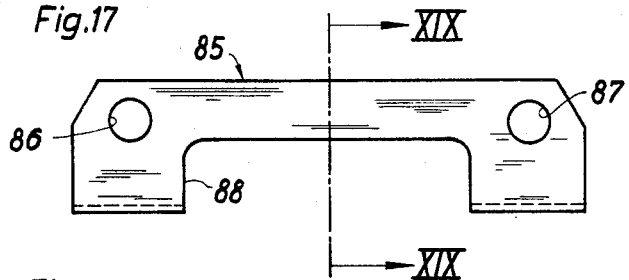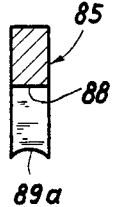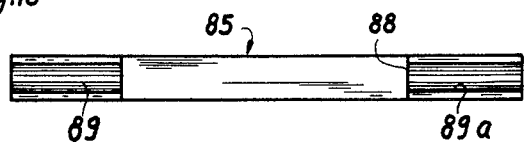

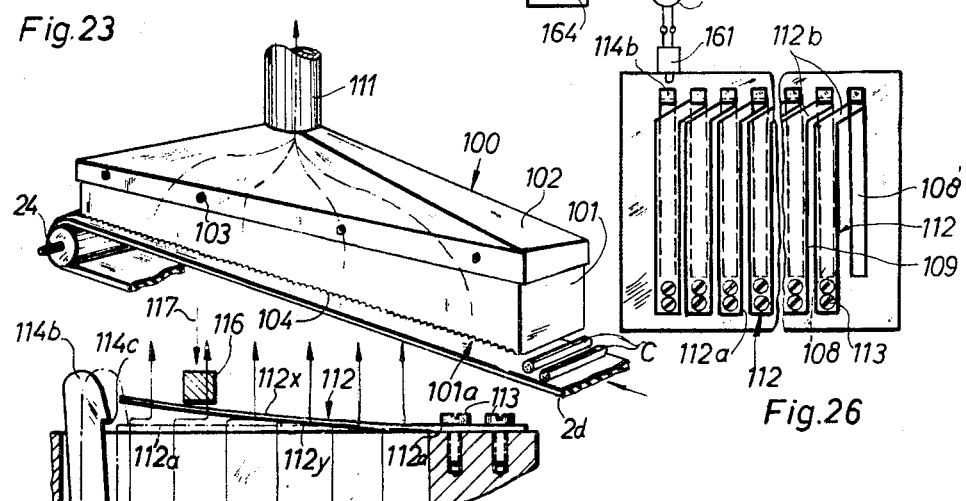
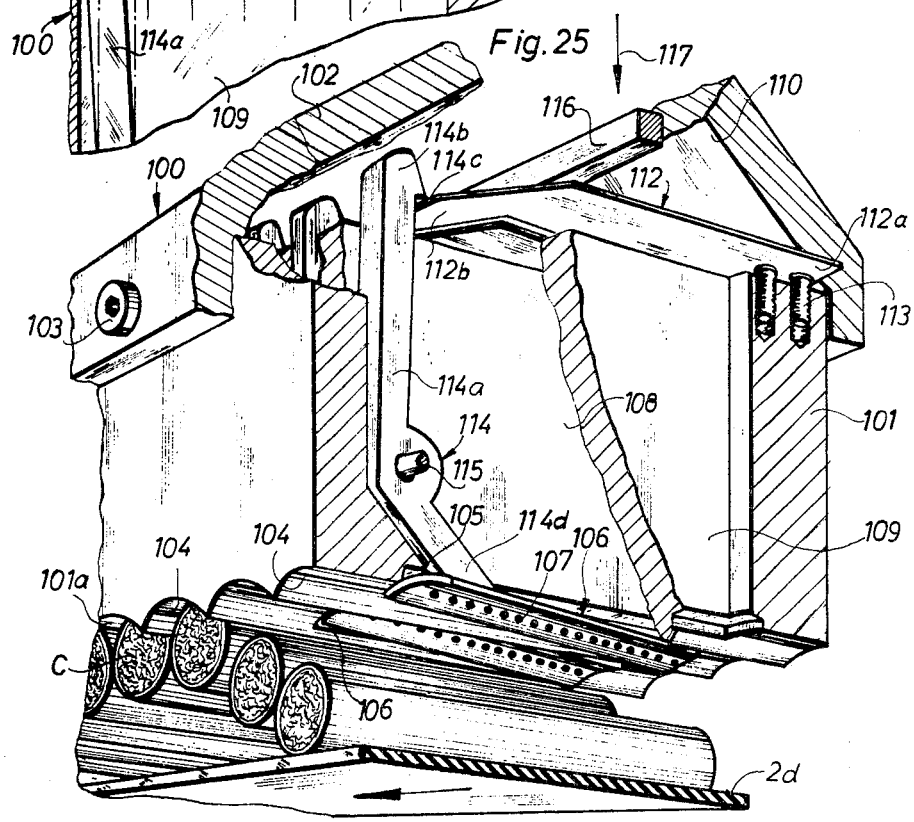

April 12, 1966  H. KOCHALSKI ETAL  3,245,558
METHOD OF AND APPARATUS FOR HANDLING CIGARETTES
AND LIKE ELONGATED ARTICLES
Original Filed March 22, 1962  22 Sheets-Sheet 9
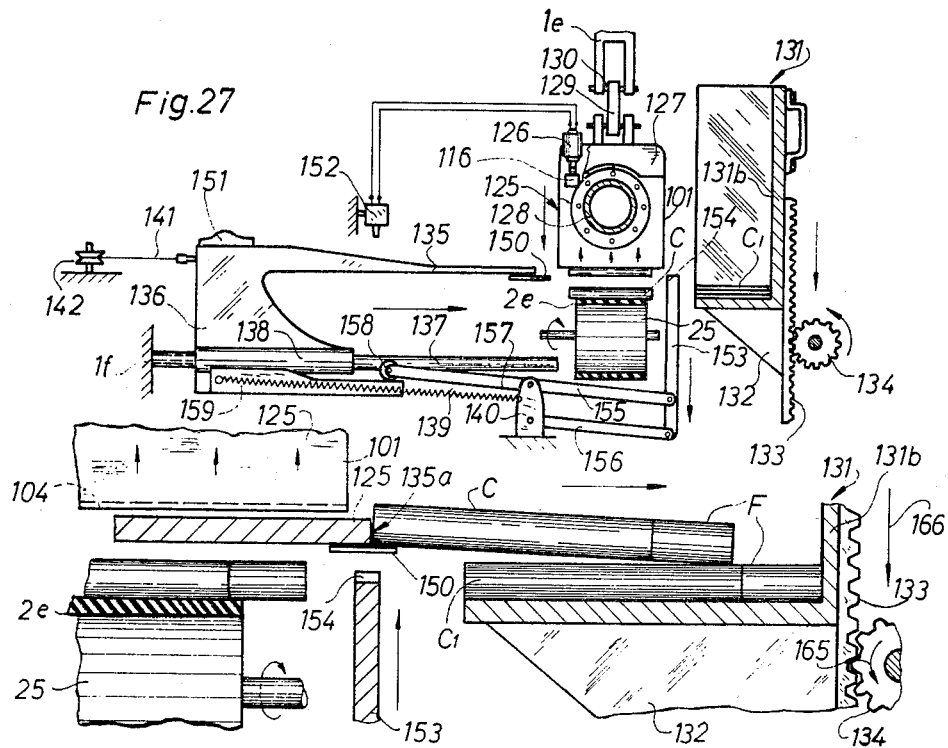
Fig. 27
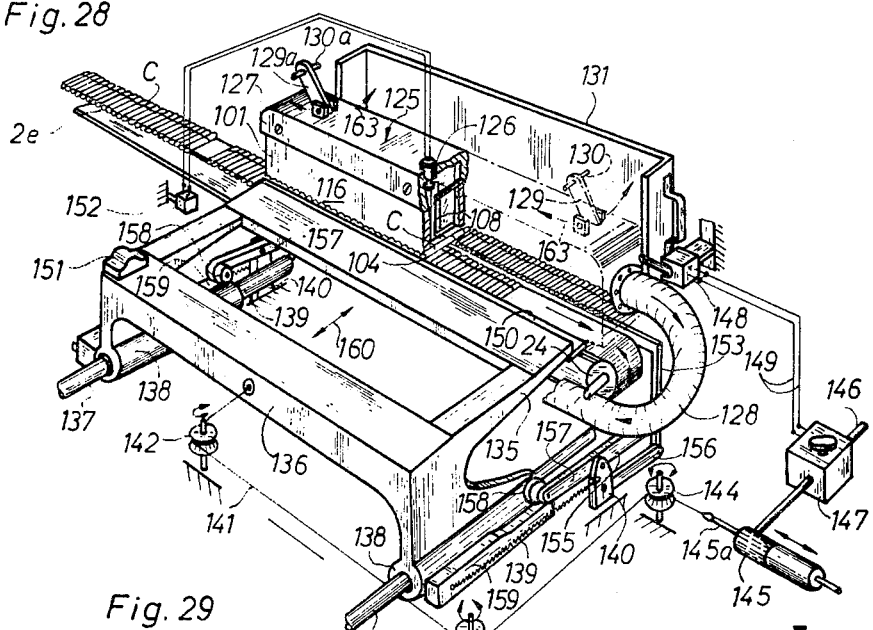
Fig. 28
Fig. 29

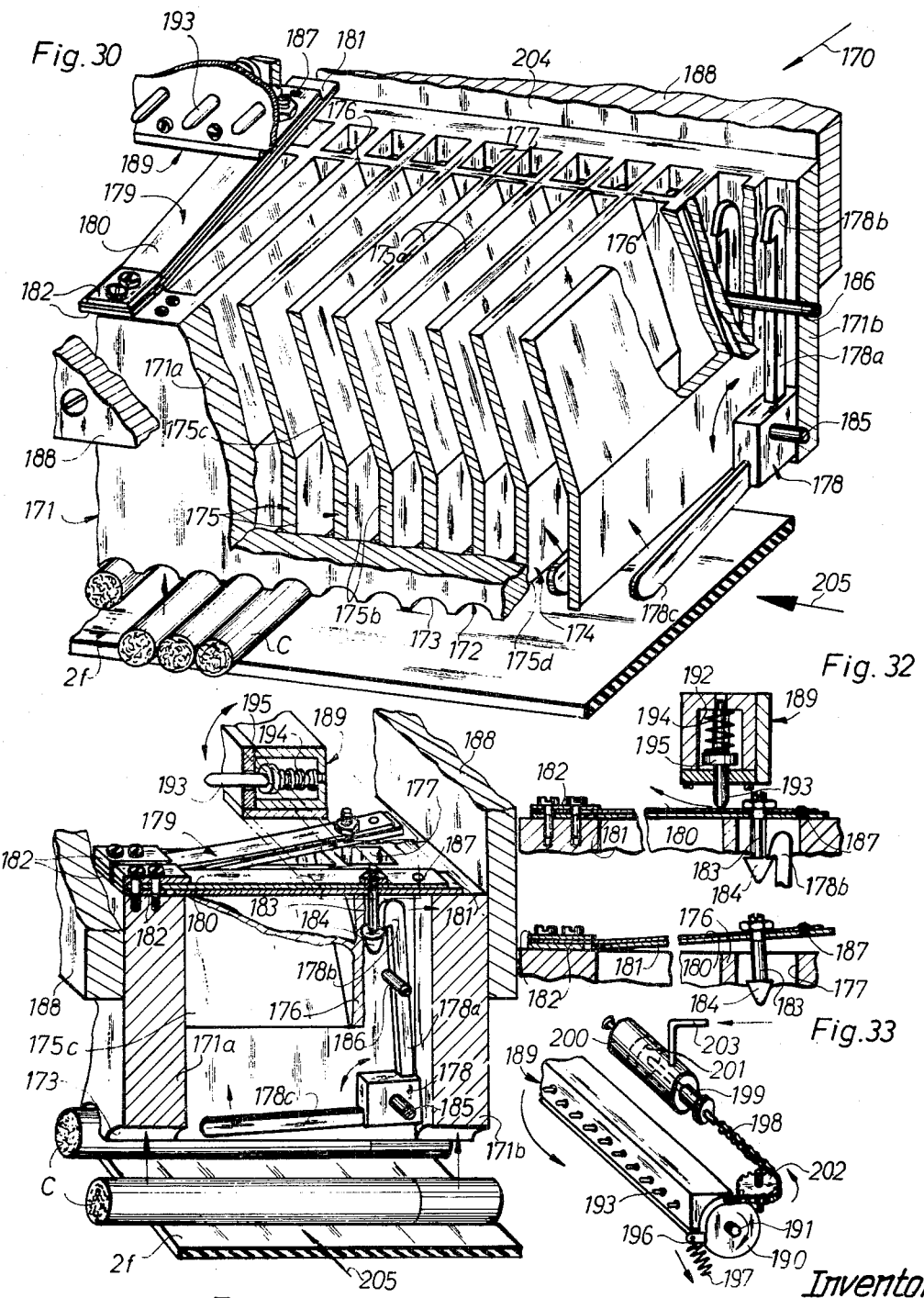

April 12, 1966 H. KOCHALSKI ET AL 3,245,558
METHOD OF AND APPARATUS FOR HANDLING CIGARETTES
AND LIKE ELONGATED ARTICLES
Original Filed March 22, 1962 22 Sheets-Sheet 11
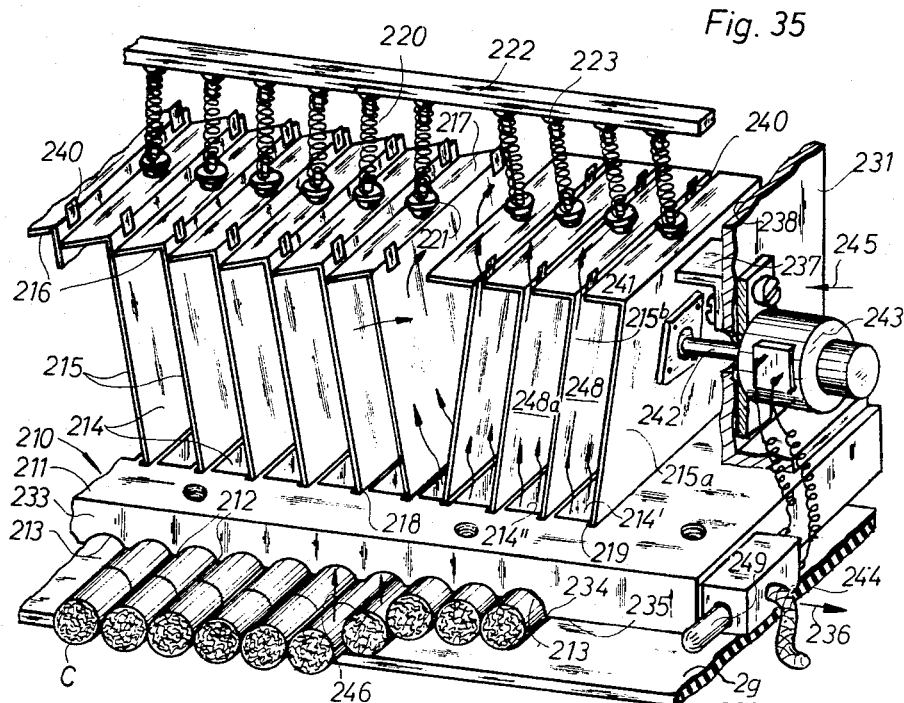
Fig. 35
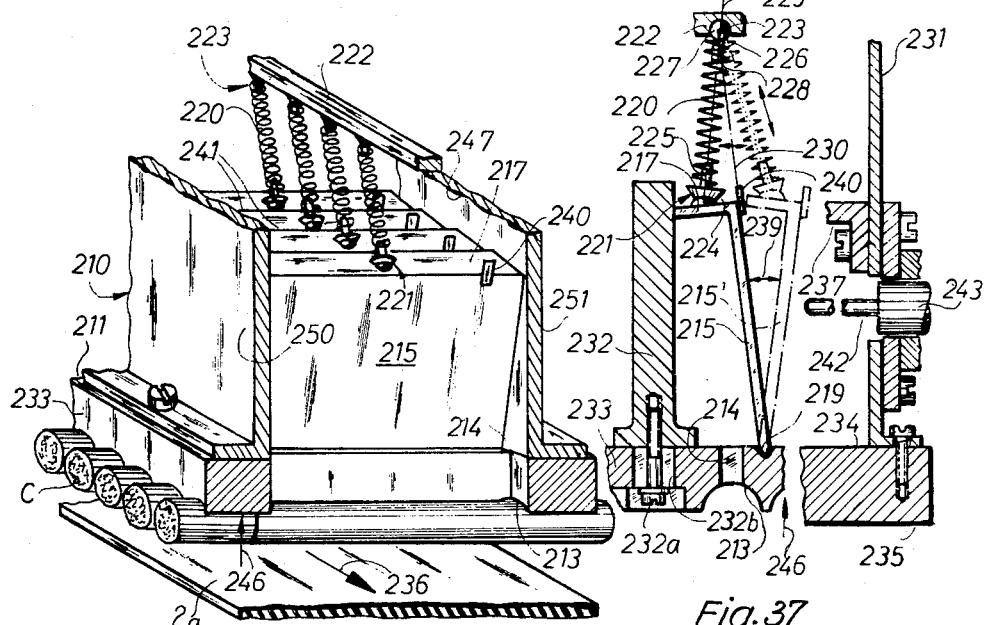
Fig. 36
Fig. 37
Inventors:
Hans Kochalski, Willy Rudszinat, Harry David,
Otto Erdmann, Ludwig Rode, Hans Suck
by Michael S. Striker
Attorney

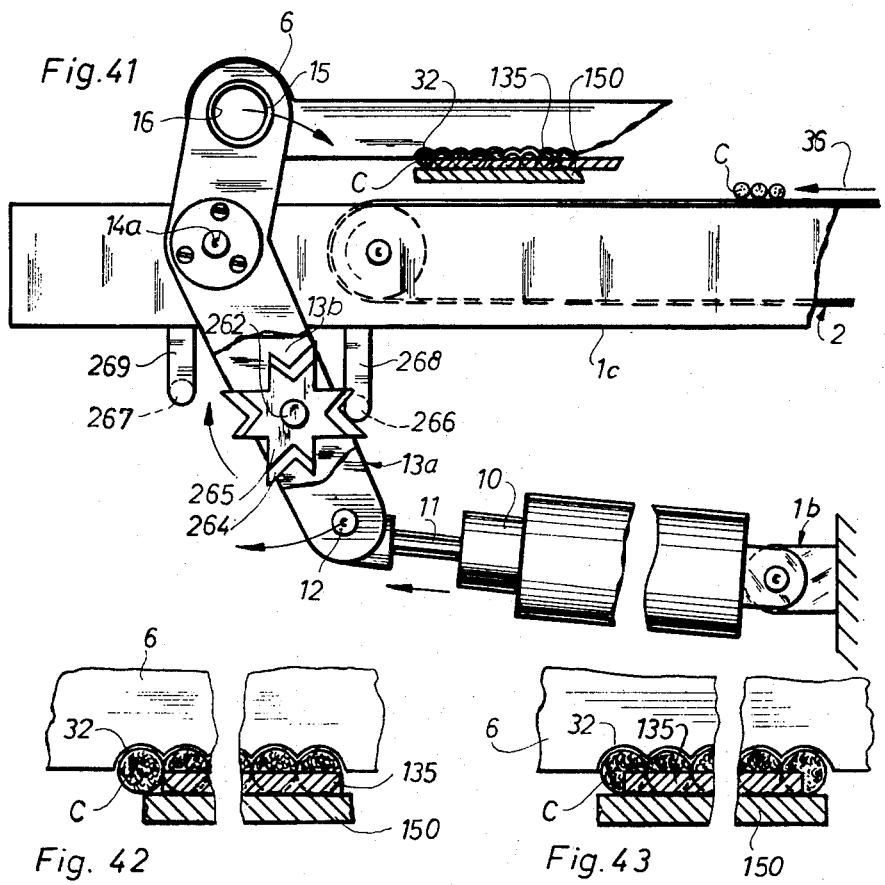
Fig. 41
Fig. 42
Fig. 43
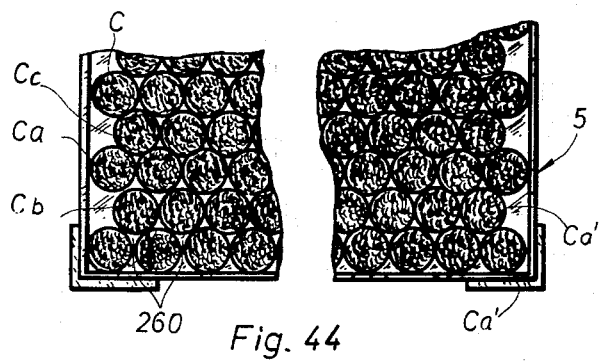
Fig. 44
Inventors:
Hans Kochalski, Willy Rudszinat, Harry David,
Otto Erdmann, Ludwig Rode, Hans Suck
by Michael S. Striker
Attorney April 12, 1966   H. KOCHALSKI ETAL   3,245,558
METHOD OF AND APPARATUS FOR HANDLING CIGARETTES
AND LIKE ELONGATED ARTICLES
Original Filed March 22, 1962   22 Sheets-Sheet 15

Inventors

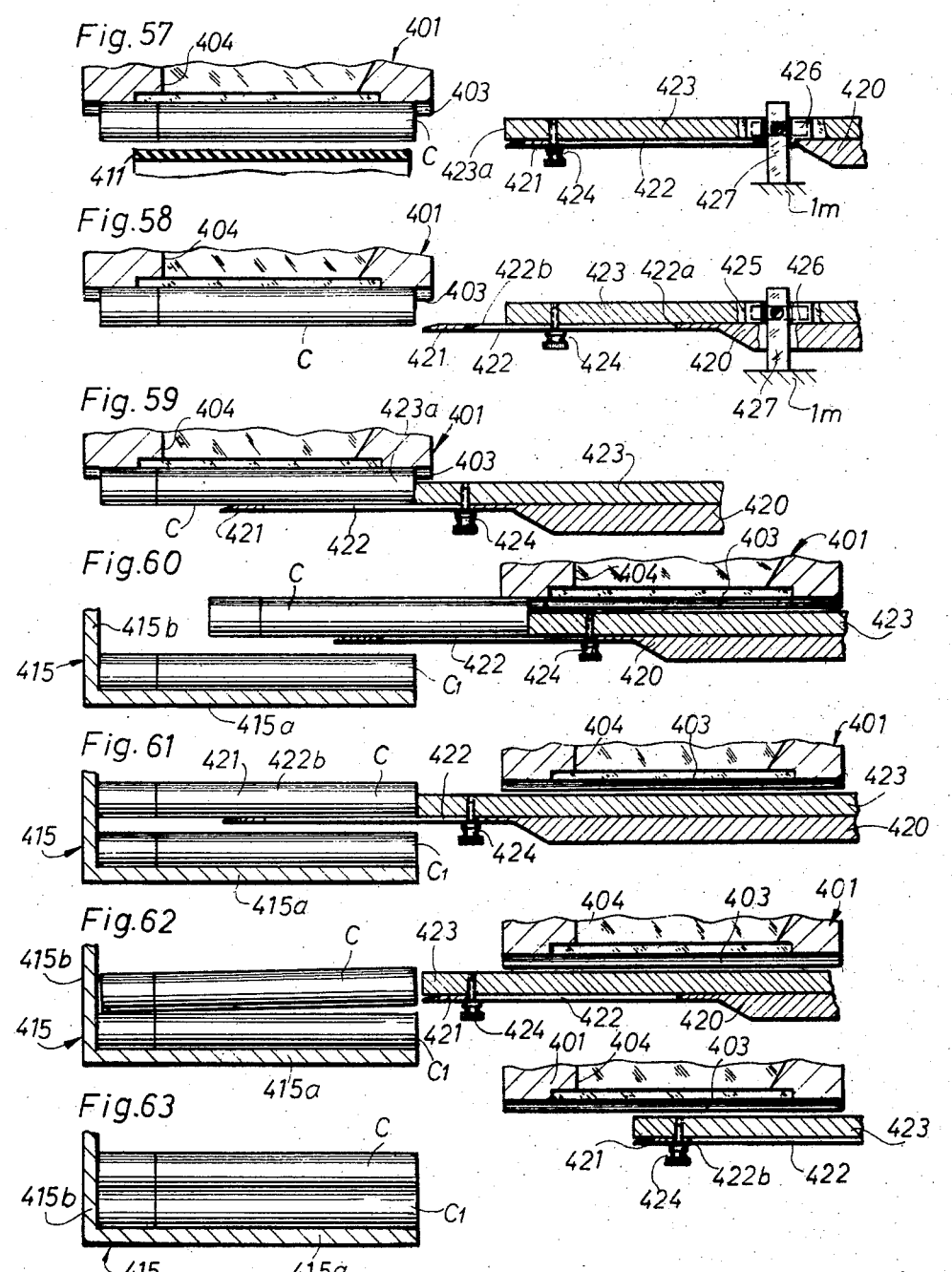

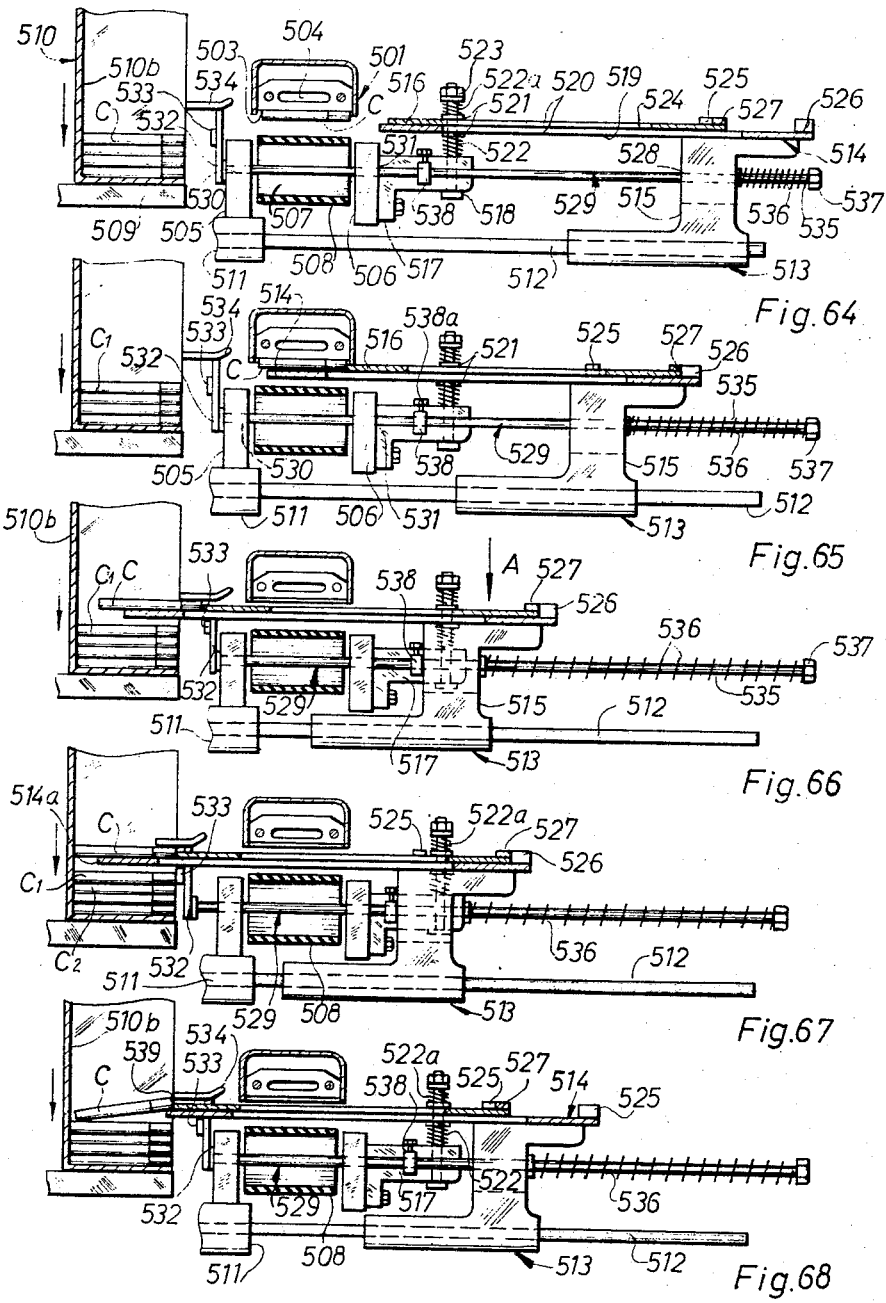

April 12, 1966  H. KOCHALSKI ETAL  3,245,558
METHOD OF AND APPARATUS FOR HANDLING CIGARETTES
AND LIKE ELONGATED ARTICLES
Original Filed March 22, 1962  22 Sheets-Sheet 20

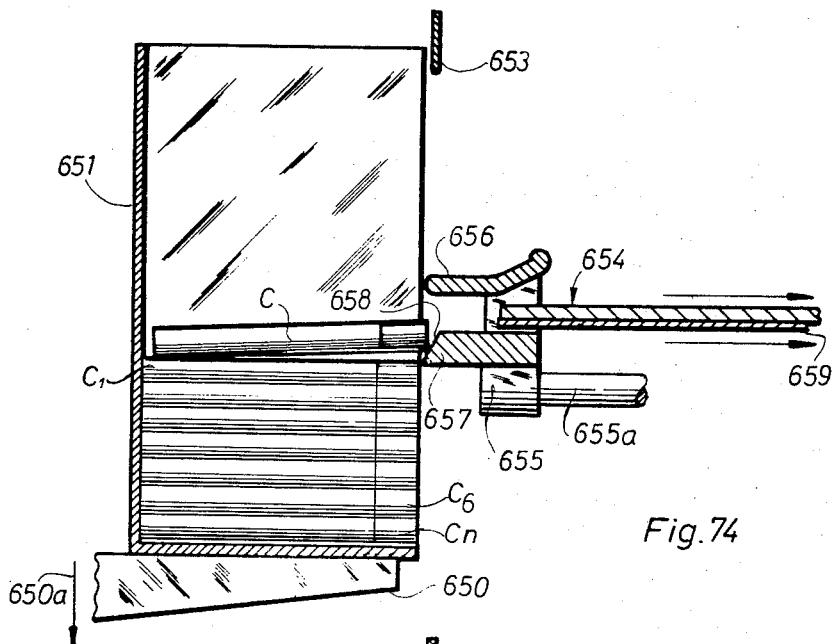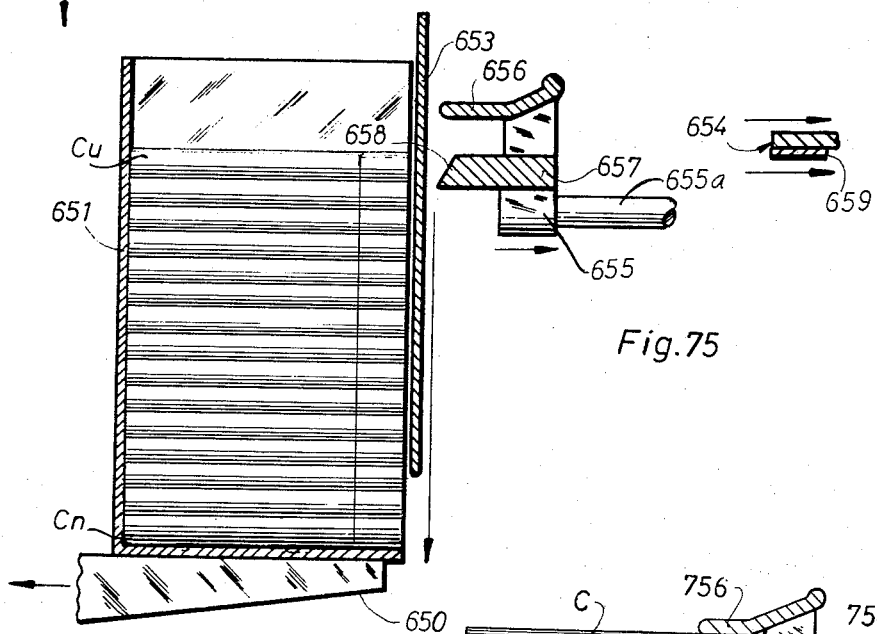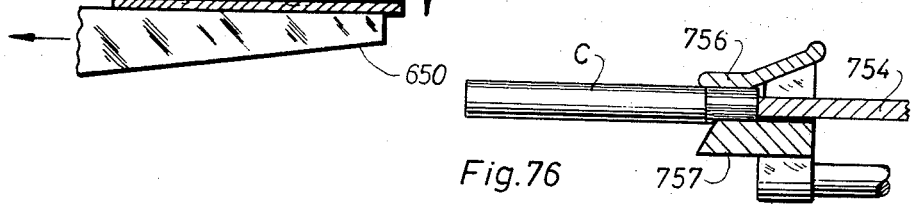

United States Patent Office 3,245,558
Patented Apr. 12, 1966

3,245,558
METHOD OF AND APPARATUS FOR HANDLING CIGARETTES AND LIKE ELONGATED ARTICLES
Horst Kochalski and Willy Rudszinat, Hamburg-Lohbruegge, Harry David and Otto Erdmann, Hamburg-Bergedorf, Ludwig Rode, Neu-Bornsen, and Hans Suck, Hamburg-Neuengamme, Germany, assignors to Hauni Werke, Korber & Co., KG, Hamburg-Bergedorf, Germany
Original application Mar. 22, 1962, Ser. No. 181,669, now Patent No. 3,190,459, dated June 22, 1965. Divided and this application Sept. 3, 1963, Ser. No. 306,368
Claims priority, application Great Britain, Mar. 23, 1961, 10,676/61; Apr. 13, 1961, 13,293/61; Apr. 24, 1961, 14,708/61; May 5, 1961, 16,341/61; May 18, 1961, 18,163/61; June 2, 1961, 19,979/61; Aug. 14, 1961, 29,241/61; Aug. 28, 1961, 30,911/61; Sept. 18, 1961, 33,415/61; Nov. 8, 1961, 39,977/61; Nov. 9, 1961, 40,146/61
47 Claims. (Cl. 214—6)

This is a division of our application Serial No. 181,669 filed March 22, 1962, now Patent No. 3,190,459.

The present invention relates to a method of and to an apparatus for handling elongated stick-shaped articles, and more particularly to processing of cigarettes, filters, cigars, cigarillos and similar articles which, either by themselves or in combination with other stick-shaped articles, constitute tobacco-containing products. Still more particularly, the invention relates to a method of and to an apparatus for stacking rows of elongated articles in trays, boxes and other types of storing devices.

In the manufacture of cigarettes with or without filters, the products manufactured in a cigarette making machine are subjected to careful inspection to make sure that only flawless products are admitted into storage or into packaging machines. Furthermore, it is very important to store cigarettes in orderly fashion because, when the cigarettes are fed into packaging machines, the flow of cigarettes must be continuous in order to avoid unnecessary bridging, jamming or other irregularities. Certain other problems arise when the cigarettes discharged by the cigarette making machine at equal or nearly equal intervals are caused to advance through one or more inspecting stations at which all defective cigarettes are ejected. The spacing between cigarettes leaving the last inspecting station is not uniform since a gap is formed in the layer of cigarettes passing through the inspecting station whenever a cigarette is discarded for lack of perfection. Therefore, in order to store the cigarettes in orderly fashion, means must be provided for collecting, for aligning, for equalizing the spacing between and for transferring the aligned cigarettes into trays, boxes, packs or other storing devices.

Accordingly, it is an important object of the present invention to provide an apparatus for handling cigarettes and like stick-shaped articles which is constructed and assembled in such a way that it can automatically collect, align, transfer and stack predetermined quantities of articles into one or more storing devices.

Another object of the invention is to provide an apparatus of the just outlined characteristics which is especially suited to handle articles of circular or nearly circular cross section and which can stack such articles in quincunx form so that the articles forming an upper row are received in upwardly opening gaps defined by the articles in a lower row.

A further object of the invention is to provide an apparatus for handling cigarettes and like comparatively sensitive and deformable articles wherein the articles are lifted, supported, transferred, deposited and stacked with minimal friction so that the likelihood of damage or deformation is very remote.

An additional object of our invention is to provide an apparatus for handling cigarettes with or without filter tips wherein the cigarettes are stacked at the same rate of speed at which they are delivered by one or more cigarette making machines so that a single apparatus may process the entire output of at least one cigarette making machine.

A concomitant object of the invention is to provide an apparatus of the above outlined characteristics embodying a novel row forming system which is constructed and assembled in such a way that it can transform a series of unequally spaced articles into one, two or more rows of equidistant articles.

A further object of the invention is to provide a system of the just outlined characteristics which may be rapidly and conveniently converted to form shorter or longer rows of equidistant articles and which may be converted for use as a means for forming a single row or two or more rows of articles at a time.

Still another object of the invention is to provide an apparatus of the above outlined characteristics embodying a novel transferring arrangement which is especially suited for rapidly delivering one or more rows of equidistant articles from a lifting arrangement into one or more storing devices without changing the position of the articles with respect to each other.

An additional object of the instant invention is to provide an arrangement of the just outlined characteristics which not only removes one or more rows of articles from a row forming system but which also supports the articles while the articles advance to the storing devices.

A further object of our invention is to provide an apparatus of the above outlined characteristics which is constructed and assembled in such a way that it can automatically stagger consecutively formed rows of articles with respect to each other so that the rows of articles are deposited in quincunx fashion for maximum utilization of space available in the storing devices.

An additional object of the invention is to provide a novel method of handling cigarettes discharged by a cigarette making machine during transfer of cigarettes to a packaging machine or into storage.

A concomitant object of our invention is to provide a method of the just outlined characteristics according to which large quantities of articles may be stacked in orderly fashion and within exceptionally short periods of time and without any danger that the storing devices which receive the stacked articles would be filled with anything less but perfect regularity.

With the above objects in view, the invention resides in the provision of a method which comprises the steps of advancing the articles in an elongated path so that the articles are substantially perpendicular to the longitudinal direction of the path, lifting a first group of articles above the path and simultaneously arranging the lifted articles in one or more rows of equidistant articles, transferring the lifted and arranged articles in the longitudinal direction thereof and depositing the transferred articles, and consecutively lifting, arranging transferring and depositing additional rows of articles onto the first row or rows of articles. If the articles are of circular cross section, each newly deposited row of articles is shifted with respect to the row therebelow or vice versa through a distance corresponding to one-half diameter of an article so that the upper row of articles is received in gaps defined by the row of articles therebelow.

The apparatus for the practice of our method comprises conveyer means for advancing a series of articles in an elongated path so that the articles remain substantially perpendicular to the longitudinal direction of the path, mechanical and/or pneumatic row forming means comprising means for consecutively lifting predetermined numbers of articles above the conveyer means, storing means adjacent to the lifting means, and transferring means for moving the articles in the longitudinal direction thereof from the lifting means into the storing means.

Certain other features of the improved apparatus reside in special construction of the lifting means, in special construction of the transferring means, and in special construction of the means which shifts the uppermost row of cigarettes and like articles of circular cross section with respect to the row located therebelow or vice versa.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

FIG. 5 is an exploded fragmentary perspective view of a modified pneumatic lifter which comprises a variable number of plate-like lifting elements;

FIG. 6 is an enlarged front elevational view of a lifting element which forms part of the pneumatic lifter shown in FIG. 5;

FIG. 7 is a bottom plan view of the lifting element;

FIGS. 8 and 9 are transverse vertical sections taken respectively along the lines VIII—VIII and IX—IX of FIG. 6, as seen in the direction of arrows;

FIG. 10 is a fragmentary perspective view of another lifting element which forms part of the pneumatic lifter shown in FIG. 5;

FIG. 11 is a fragmentary side elevational view of a modified conveyer belt which may be utilized for delivering stick-shaped articles to the lifter of FIG. 5;

FIG. 12 is a front elevational view of a plate-like spacer which may be utilized in the pneumatic lifter of FIG. 5 for separating groups of lifting elements from each other;

FIG. 14 is a front elevational view of a modified lifting element;

FIG. 15 is a bottom plan view of the lifting element shown in FIG. 14;

FIG. 16 is a transverse vertical section as seen in the direction of arrows from the line XVI—XVI of FIG. 14;

FIG. 17 is a front elevational view of a further lifting element;

FIG. 18 is a bottom plan view of the lifting element shown in FIG. 17;

FIG. 19 is a transverse vertical section as seen in the direction of arrows from the line XIX—XIX of FIG. 17;

FIG. 23 is a schematic perspective view of a pneumatic lifter which embodies another form of our invention and which is provided with specially constructed sensing elements;

FIG. 24 is an enlarged fragmentary perspective view of the structure shown in FIG. 23;

FIG. 25 is a fragmentary transverse section through the pneumatic lifter of FIGS. 23 and 24, showing a valve member which normally seals the upper end of the associated suction chamber provided in the interior of the lifter;

FIG. 26 is a top plan view of the housing which forms part of the pneumatic lifter shown in FIGS. 23 to 25;

FIG. 27 is a somewhat schematic partly front elevational and partly transverse sectional view of a combined row forming and transferring arrangement which is installed at a modified transfer station and which embodies a pneumatic lifter similar to the lifter shown in FIGS. 23 to 26;

FIG. 28 is an enlarged transverse section showing a detail of the structure illustrated in FIG. 27;

FIG. 29 is a perspective view of the structure shown in FIG. 27, further showing a control system which initiates movements of the pneumatic lifter and of the transferring assembly;

FIG. 30 is a fragmentary perspective view of a pneumatic lifter which constitutes a modification of the lifter shown in FIGS. 23 to 29;

FIG. 31 is a perspective view of a detail of the structure shown in FIG. 30;

FIG. 32 is a fragmentary transverse vertical section through the pneumatic lifter of FIGS. 30 and 31, showing a hollow rail-shaped device which is adapted to depress the valve members of the lifter to sealing position and further showing a valve member in sealing position;

FIG. 33 is a similar vertical section showing the valve member of FIG. 32 in open position;

FIG. 34 is a fragmentary perspective view of a means which operates the depressing device of the lifter shown in FIGS. 30 to 33;

FIG. 35 is a fragmentary perspective view of a pneumatic lifter whose suction slots are separated from each other by pivotable partitions;

FIG. 36 is another fragmentary perspective view of the structure shown in FIG. 33;

FIG. 37 is a fragmentary longitudinal central section through the pneumatic lifter of FIGS. 35 and 36, showing a partition in two extreme positions;

FIG. 41 illustrates the shifting assembly in a position in which the lifter is ready to transfer a row of articles into gaps defined by the articles deposited in a preceding step;

FIG. 42 is a greatly enlarged fragmentary side elevational view of the lifter in the position of FIG. 40, further showing the position of a plunger forming part of an arrangement which transfers articles from the lifter into a storing device;

FIG. 43 illustrates the lifter and the plunger in the positions they occupy in FIG. 41;

FIG. 44 is a fragmentary front elevational view of a storing device showing the manner in which superimposed rows of stacked stick-shaped articles are staggered with respect to each other;

FIG. 57 is a fragmentary transverse section through an arrangement which utilizes a pneumatic lifter adapted to collect a row of stick-shaped articles off the upper run of an endless belt, the arrangement being shown in idle position;

FIG. 58 illustrates the arrangement of FIG. 57 in an intermediate position in which the transfer mechanism which removes the articles from the lifter is about to engage the articles;

FIG. 59 shows the arrangement of FIGS. 57 and 58 in a further intermediate position in which the articles are about to be stripped off the lifter;

FIG. 60 illustrates the next step in the operation of the arrangement shown in FIGS. 57 to 59 when the articles are supported by and advance with the transfer mechanism into the interior of a tray-shaped storing device;

FIG. 61 illustrates the arrangement of FIGS. 57 to 60 in a position it assumes when the transfer mechanism has completed its forward stroke and the articles are located in the interior of the storing device;

FIG. 62 shows the arrangement of FIGS. 57 to 61 in partly retracted position in which the row of articles is about to descend by gravity onto the uppermost row of articles already contained in the storing device;

FIG. 63 illustrates the arrangement of FIGS. 57 to 62 in a further position in which the transfer mechanism is midway between its foremost and rearmost positions;

FIG. 64 is a fragmentary partly elevational and partly sectional view of a further arrangement which again utilizes a pneumatic lifter and which delivers rows of stick-shaped articles into a tray-shaped storing device by utilizing a transfer mechanism which is slightly different from the transfer mechanism shown in FIGS. 51 to 63;

FIG. 65 illustrates the arrangement of FIG. 64 in an intermediate position in which the transfer mechanism is about to strip the articles off the lifter;

FIG. 66 illustrates a further stage in the operation of the arrangement shown in FIGS. 64 and 65 in which the articles are being advanced into the interior of the storing device;

FIG. 67 shows the arrangement of FIGS. 64 to 66 in a position it assumes when the transfer mechanism has completed its forward stroke and the leading ends of the articles are moved into abutment with the side wall of the storing device;

FIG. 68 illustrates the arrangement of FIGS. 64 to 67 in a position in which the transfer mechanism permits the row of articles to descend onto the uppermost row of articles already contained in the storing device;

FIG. 74 is a fragmentary transverse vertical section through a different storing device and through a portion of a modified transfer mechanism which is shown in a position it assumes at the time a row of articles just delivered into the storing device is about to descend onto the row of articles located therebelow;

FIG. 75 illustrates the arrangement of FIG. 74 in a different position in which the transfer mechanism is partially withdrawn and in which the cover of the storing device is permitted to descend so as to maintain the stored articles in stacked position; and FIG. 76 is a fragmentary section through a modified transfer mechanism which defines a tunnel wherein the articles, assumed to be filter tip cigarettes, are partially compressed during transfer into the storing device.

*The apparatus*

Figure 1:
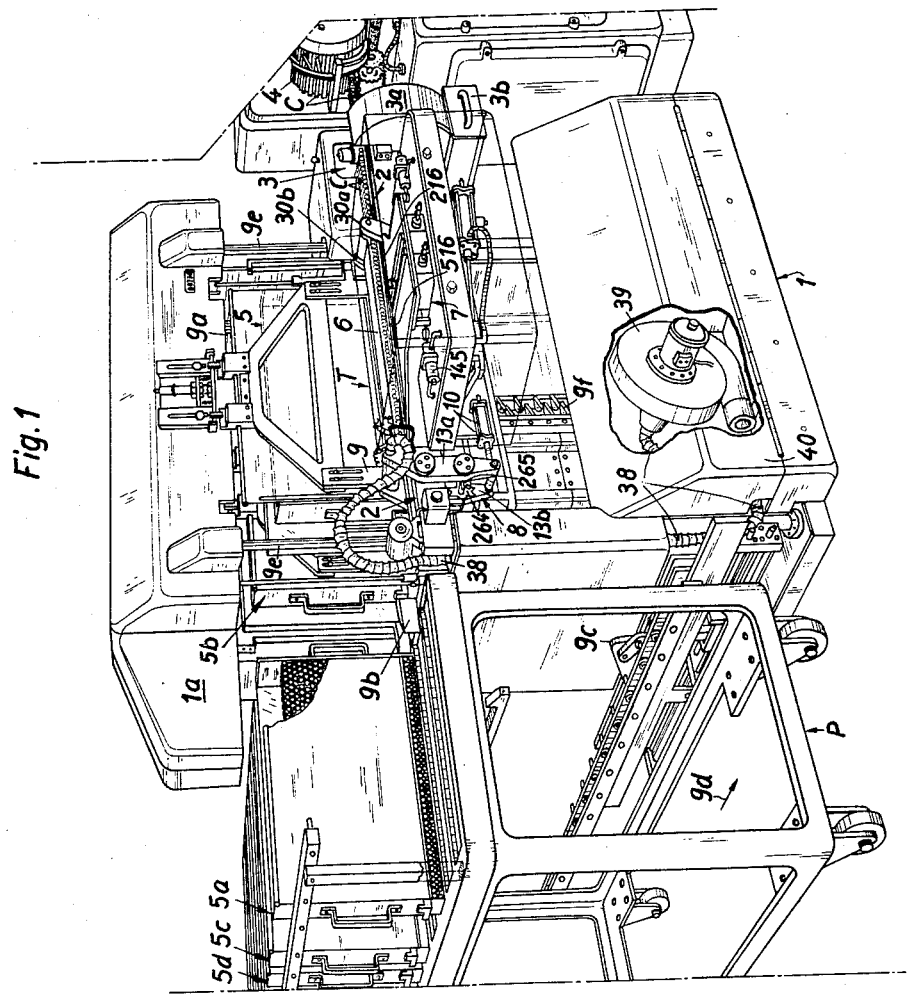
FIG. 1 is a perspective view of an apparatus for handling elongated stick-shaped articles in the form of cigarettes or filter tip cigarettes, the purpose of this apparatus being to properly fill storing devices in the form of trays, a series of which is stacked on a wheel-mounted pushcart.

Referring now in greater detail to FIG. 1, there is shown an apparatus for handling elongated stick-shaped articles such as cigarettes, filter tip cigarettes, filters, cigars, cigarillos and the like. In the following description, the articles acted upon by the various components of the improved apparatus will be referred to as cigarettes or filter tip cigarettes.

The apparatus comprises a frame 1 for a conveyer means including an endless belt 2 whose horizontal upper run supports and advances cigarettes C in an elongated path along and past an inspecting station 3 at which the cigarettes are checked and which comprises a device adapted to remove from the belt 2 all such defective cigarettes which are not in condition for storing and for packaging. The rejects are caused to pass through a chute 3a and accumulate in a receptacle 3b which is emptied at certain intervals. The exact construction of the inspection device at the station 3 forms no part of the invention.

The belt 2 receives cigarettes from a source in the form of a cigarette making machine including a reversing drum 4. This drum deposits the cigarettes in such a way that each cigarette C is perpendicular or nearly perpendicular to the direction in which the belt 2 advances, and the end portions of the cigarettes are assumed to extend beyond the lateral edge portions of the belt (see FIG. 4).

The purpose of the apparatus shown in FIG. 1 is to stack groups or rows of cigarettes C in special storing devices in the form of trays 5 one of which is illustrated in operative position adjacent to the path of the cigarettes C. As indicated in the left-hand portion of FIG. 1, the rows of cigarettes stored in a filled tray 5a are arranged in quincunxes by being staggered with respect to each other so that the cigarettes forming the uppermost row are received in gaps defined by the cigarettes forming the next lower row, that each cigarette in the third row is vertically aligned with a cigarette in the uppermost row, and so forth (see, for example, FIGS. 44 to 48).

In order to make sure that each row contains a predetermined number of cigarettes, means must be provided for forming rows of cigarettes prior to transfer of cigarettes into the tray 5, i.e. the cigarettes should not be stacked in haphazard fashion because a properly filled tray containing a certain number of regularly stacked cigarettes is of considerable help in further processing of cigarettes by insuring that the packaging machines (not shown) can operate without interruption. The apparatus of our invention embodies means for forming groups or rows of cigarettes, and this row-forming means may comprise a pneumatically operated lifter 6 which is mounted above the upper run of the belt 2 and which is adjacent to the open side of the tray 5. The exact construction and various modifications of the lifter 6 will be described in greater detail hereinafter. The important function of this lifter will be readily understood if one considers that the device at the inspecting station 3 removes defective cigarettes from the upper run of the continuously moving belt 2 so that the layer of cigarettes at the downstream side of the inspecting station 3 is interrupted wherever a defective cigarette was ejected into the chute 3a. Its novel construction enables the lifter 6 to form groups or rows of cigarettes in which the cigarettes are equidistant from each other so that the rows consecutively transferred into the tray 5 always contain a predetermined number of cigarettes.

The apparatus of FIG. 1 further comprises a novel arrangement 7 for consecutively transferring rows of cigarettes formed by the lifter 6 into the interior of the tray 5 and for properly depositing the rows onto the bottom wall of this tray or onto the previously deposited row. The exact construction and various modifications of the transferring arrangement 7 will be described in full detail under a separate heading.

In order that the consecutively formed rows of cigarettes may be deposited in staggered relation, either the tray 5 or the lifter 6 must be shifted through predetermined distances so that the cigarettes forming the uppermost row will be received in gaps formed by the cigarettes in the previously deposited row. The apparatus of FIG. 1 comprises a staggering assembly 8 which is operatively connected with and which shifts the lifter 6 in rhythm with the operation of the transferring arrangement 7.

Finally, the apparatus of FIG. 1 also comprises means for advancing or circulating the trays to and from the transfer station T at which the arrangement 7 introduces rows of cigarettes C into the tray 5. This advancing means cooperates with a wheel-mounted conveyance in the form of a pushcart P and includes a vertically reciprocable carrier or platform 9 which is movable up and down at the transfer station T in order to lower the tray 5 through a predetermined distance after each deposition of a row of cigarettes C. The pushcart P is adjacent to the discharge end of the belt 2 and is detachably coupled to the frame 1 so as to be moved forwardly (arrow 9d) in rhythm with the operation of the remaining components in order to receive the tray 5 at the time the apparatus requires an empty tray. The means for withdrawing an empty tray from the pushcart P and for returning a filled tray onto the pushcart comprises a chain conveyor which is accommodated beneath a hood 1a and which is provided with a swingable bifurcated motion transmitting element 9a, the latter adapted to advance an empty tray (e.g. the tray 5b) from the supporting table of the pushcart P and along elongated ways or rails 9b into a position rearwardly of the tray 5. As soon as the tray 5 is filled and descends with the platform 9 beneath the transfer station T, it is moved below the empty tray 5b and is thereupon lifted to occupy space previously occupied by the tray 5b subsequent to automatic transfer of the tray 5b onto the lifted platform 9. The direction of movement of the motion transmitting element 9a is then reversed so that this element automatically advances the newly filled tray 5 along the ways 9b and onto the pushcart P to occupy space immediately behind the filled tray 5a. The pushcart P is then advanced by a mechanism 9c in the direction indicated by the arrow 9d in order to move the next empty tray 5c into alignment with the chain conveyer in the hood 1a, i.e. into alignment with the ways 9b. The motion transmitting element 9a of this conveyer advances the tray 5c onto and along the ways 9b and into the space occupied in FIG. 1 by the tray 5b. The operation is then repeated in the above-described manner, i.e. the tray 5b is filled and descends beneath the tray 5c which latter moves onto the platform 9, the tray 5b is returned onto the pushcart P to occupy space previously occupied by the tray 5c, the next empty tray 5d is moved onto the ways 9b after the pushcart advances in the direction indicated by the arrow 9d, and so on. The platform 9 is reciprocable along a pair of spaced uprights 9e, and the means for reciprocating this platform comprises one or more racks 9f.

The exact construction of the means which circulates the trays between the transfer station T and the pushcart P forms no part of this invention. The present invention is mainly concerned with an apparatus which advances cigarettes C to the transfer station T, which thereupon forms rows of cigarettes so that each row comprises a predetermined number of cigarettes and that the cigarettes in each row assume predetermined positions with respect to each other, which thereupon transfers the rows into an empty or partly filled storing device, and which staggers the consecutively formed rows so that the cigarettes forming the uppermost row are deposited in gaps defined by the cigarettes in the preceding row. Our invention is also concerned with the method of handling elongated stick-shaped articles. It will be understood that the source which delivers stick-shaped articles onto the belt 2 may assume the form of a magazine, hopper, chute, receptacle or the like as long as it can deliver articles in such a way that the longitudinal extension of each article is at least nearly perpendicular to the direction in which the belt advances.

Furthermore, if the apparatus of FIG. 1 is utilized for handling of non-circular articles, such as cigars or cigarillos of square, rectangular or similar cross-section, the shifting assembly 8 may be rendered inactive or it may be dispensed with because articles of square or rectangular cross-section can be properly stacked without any shifting of the rows.

Means for forming rows of cigarettes

Figure 2:
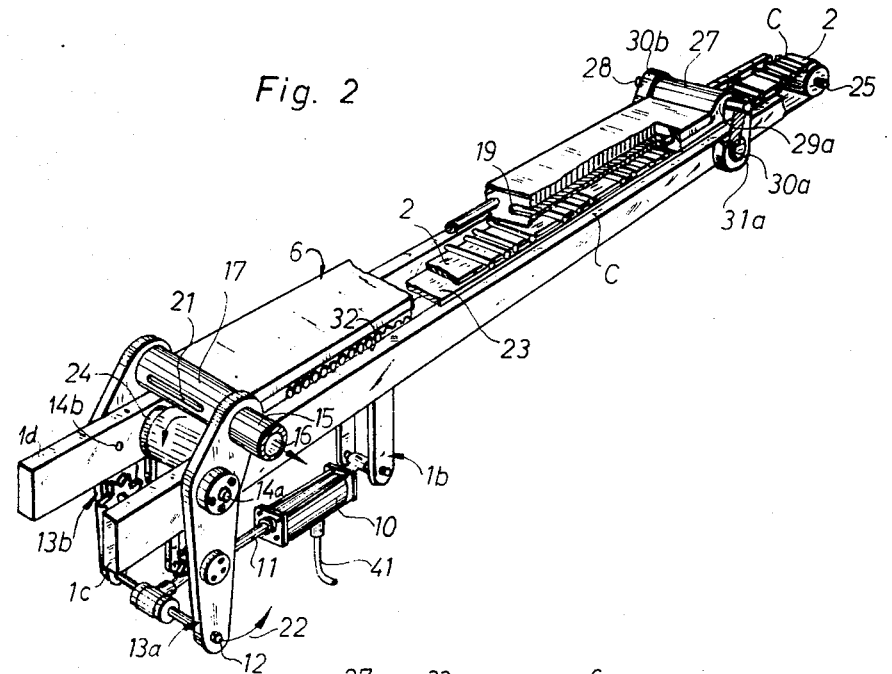
FIG. 2 is an enlarged perspective view of a pneumatic lifter which forms part of the apparatus shown in FIG. 1 and which serves as a means for forming rows of equidistant articles prior to transfer of the rows into a storing device, certain parts of the lifter being broken away for the sake of clarity.
Figure 4:
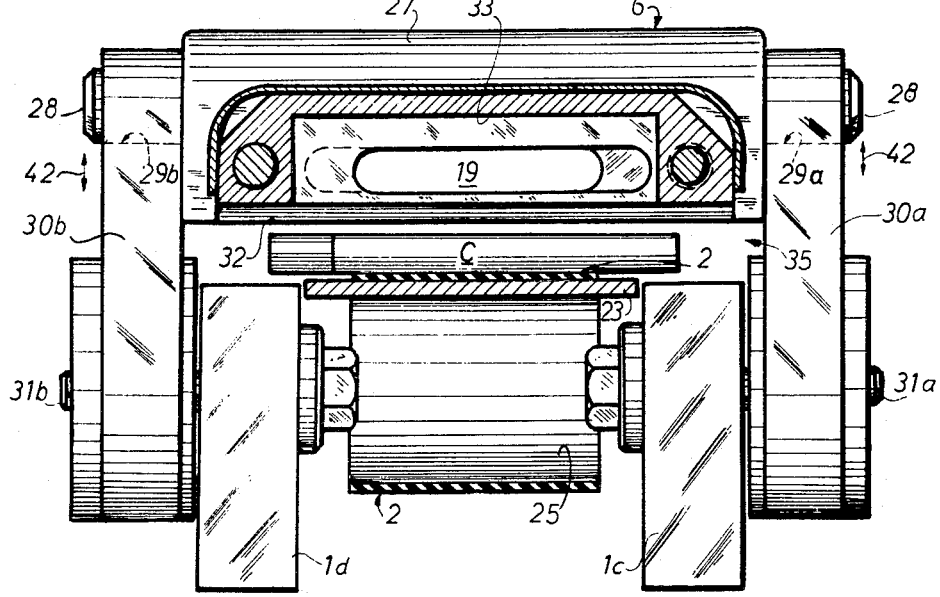
FIG. 4 is an enlarged transverse section as seen in the direction of arrows from the line IV—IV of FIG. 3.
Figure 3:
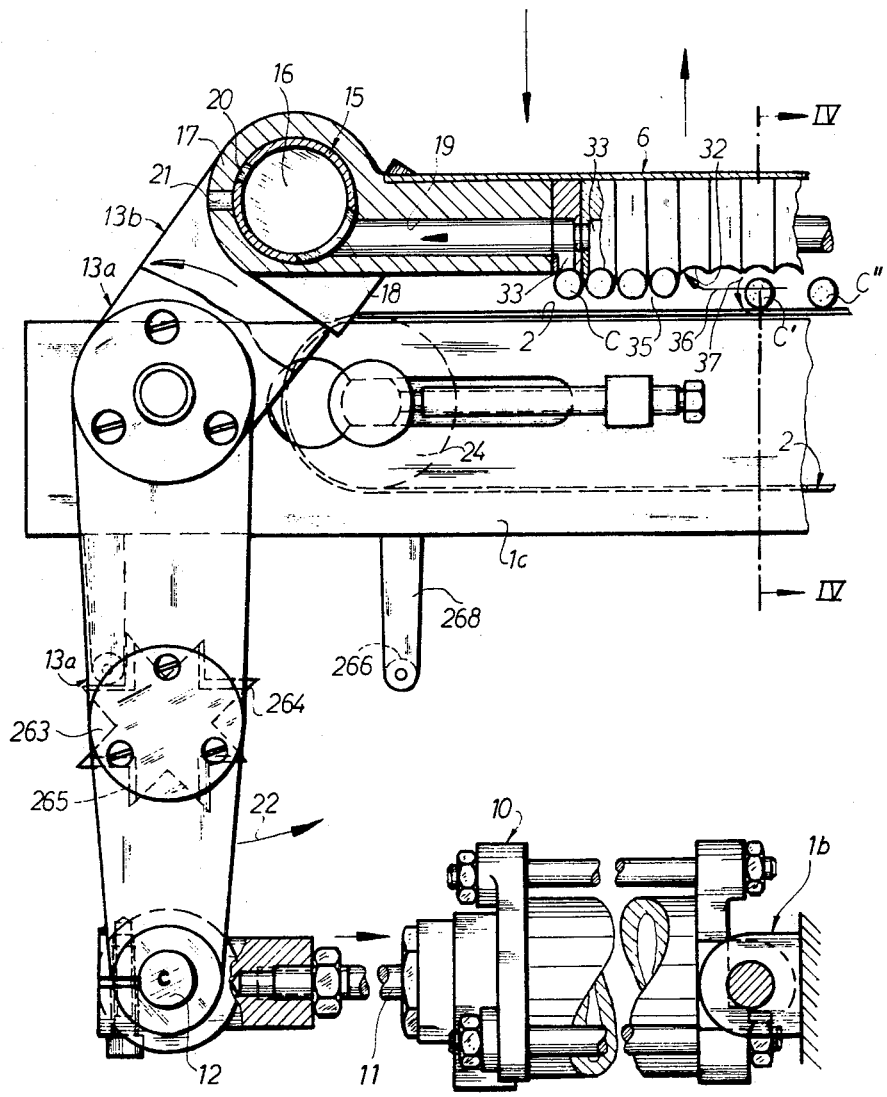
FIG. 3 is a greatly enlarged partly elevational and partly sectional view of the left-hand portion of the structure shown in FIG. 2.

The construction of the row forming pneumatic lifter 6 is shown in FIGS. 2 to 4. This lifter may be raised and lowered but remains parallel with itself so that it can descend toward or that it can move upwardly and away from the upper run of the belt 2. The means for reciprocating the lifter 6 comprises an air cylinder 10 which is pivotably secured to a frame member 1b, the latter forming part of the frame 1 shown in FIG. 1. The piston rod 11 of the cylinder 10 is coupled to a horizontal cross spindle 12 extending between the longer lower arms of two bell crank levers 13a, 13b. These levers are fulcrumed on horizontal pivot members 14a, 14b respectively mounted in elongated frame members or bars 1c, 1d. The shorter upper arms of the levers 13a, 13b support a transversely extending hollow tubular element in the form of a spindle 15 which defines a suction duct 16 through which air is drawn from the interior of the lifter 6. The spindle 15 may be provided with a bronze bearing sleeve or the like and is fixedly connected to the upper arms of the levers 13a, 13b. The lifter 6 comprises a tubular front end portion or sleeve 17 which is turnably mounted on the spindle 15 between the upper arms of the levers 13a, 13b so that the lifter is raised and lowered in response to a rocking of the levers about the pivot members 14a, 14b when the piston rod 11 is caused to reciprocate with respect to the cylinder 10.

The spindle 15 is formed with a cutout 18 which communicates with the duct 16 and with a longitudinally extending suction duct 19 provided in the interior of the lifter 6. The cutout 18 is wide enough to permit full communication between the ducts 16, 19 irrespective of the angular position of the levers 13a, 13b i.e., regardless of whether the lifter 6 is raised or lowered. This is of importance since, and as explained hereinabove, the spindle 15 is rigid with the levers and is angularly displaced in the sleeve 17 when the levers are rocked.

A port 20 provided in the spindle 15 substantially opposite the cutout 18 is sealed from a complementary port 21 in the sleeve 17 when the lifter 6 descends toward the upper run of the belt 2. However, when the arms 13a, 13b are rocked in an anticlockwise direction (arrow 22), the port 20 is moved into alignment with the port 21 as soon as the lifter 6 assumes its raised position.

The upper run of the belt 2 travels above and is supported by a bearing plate 23 which is secured to and which extends between the bars 1c, 1d. These bars support the shafts of two spaced reversing rollers 24, 25 for the belt 2.

The rear end portion of the lifter 6 assumes the form of a sleeve 27 which is traversed by a horizontal shaft 28 having end portions removably received in slots 29a, 29b respectively provided in the upper ends of two levers 30a, 30b which are pivotally secured to the bars 1c, 1d by horizontal pins 31a, 31b (see particularly FIG. 4). The levers 30a, 30b automatically turn about the pins 31a, 31b when the levers 13a, 13b are rocked by the piston rod 11 so that the lifter 6 is moved in parallelism with itself toward and away from the upper run of the belt 2.

The underside of the lifter 6 is provided with a series of equidistant holding means in the form of concave recesses or pockets 32 each of which may receive a cigarette C and the cigarettes received in the recesses 32 together form a row which is subsequently transferred into the tray 5. Each recess 32 communicates with a separate suction slot 33 opening into the suction duct 19 so that suction created in the duct 16 of the hollow spindle 15 is felt in each of the slots 33 and this suction causes the cigarettes C to adhere to and to be supported at the underside of the lifter 6 and to assume required positions in the respective recesses 32. The underside of the lifter 6, the upper sides of the bars 1c, 1d and the upper run of the belt 2 together define an elongated path or tunnel 35 through which the layer or series of cigarettes C advances from the roller 25 toward the roller 24 (see the arrow 36 in FIG. 3); and the air sucked through this tunnel and entering the slots 33 accelerates the cigarettes and causes them to roll along the upper run of the belt 2 (arrow 37 in FIG. 3) so as to advance at a speed which exceeds the forward speed of the constantly moving belt.

The intake end of the spindle 15 is connected to a flexible conduit 38 which leads to a fan 39 or a similar vacuum generating means mounted in a casing 40 shown in FIG. 1.

The lifter 6 operates as follows:

It is assumed that the cylinder 10 which is connected to a source of pressure fluid (see the conduit 41 in FIG. 2) has rocked the levers 13a, 13b in a clockwise direction, as viewed in FIGS. 2 and 3, whereby the lifter is caused to descend and moves into close proximity of the belt 2. The series or layer of cigarettes advancing in the elongated path along the upper run of the belt may but need not consist of cigarettes which are equidistant from each other since, and as shown in FIG. 1, the device mounted at the inspecting station 3 discards defective cigarettes into the receptacle 3b so that only such cigarettes which are ready for packing or storing can advance toward the lifter 6. As a rule, the cigarettes in the layer advancing in the elongated path along the upper run of the belt are unequally spaced because at least some cigarettes leaving the drum 4 are defective and are ejected at the inspecting station 3.

Since the ducts 16, 19 are free to communicate with each other in all angular positions of the spindle 15, the fan 39 draws air through each of the slots 33 and the suction is greatest in the first slot 33, i.e. in that slot which is nearest to the front sleeve 17. The suction decreases in a direction toward the rear sleeve 27 and, therefore, the cigarettes advancing in an elongated path along the upper run of the belt 2 are caused to pass through the tunnel 35 (arrow 36 in FIG. 3) at a speed which causes them to roll along the upper side of the belt (arrow 37). FIG. 3 shows that each of the first four recesses 32 at the underside of the lifter 6 already contains a cigarette C, i.e. the slots 33 opening into these first four recesses are sealed by the respective cigarettes which means that partial vacuum prevailing in the slot 33 opening into the fifth recess 32 is more pronounced (e.g. three times greater) than in the sixth, seventh, etc. slots 33. Consequently, the foremost cigarette C' still supported by the upper run of the belt 2 (see FIG. 3) will be compelled to enter the fifth recess 32 and to thereupon adhere to the underside of the lifter 6. The cigarette C' then seals the slot of the fifth recess 32 to bring about automatic increase in suction prevailing in the slot leading to the sixth recess 32 which latter is about to receive the cigarette C". The operation is then repeated until each recess 32 of the lifter 6 receives a cigarette. It has been found that the formation of rows requires very short periods of time, and that suction in the duct 19 and the forward speed of the belt 2 may be adjusted in a sense to make sure that the lifter 6 will form rows of cigarettes at the same speed at which the drum 4 of the cigarette making machine delivers cigarettes onto the belt 2 (e.g. about 2,500 cigarettes per minute).

The suction in the slot 33 leading to the foremost empty recess 32 may be so great that the foremost cigarette (e.g. the cigarette C' of FIG. 3) is lifted off the belt 2 before it reaches the respective recess.

The strength of the air current flowing through the tunnel 35 along the upper side of the belt 2 may be varied to regulate suction in the slots 33. As indicated by the arrows 42 in FIG. 4, the bars 1c, 1d may be adjusted in directions toward and away from the lifter 6 so as to close the sides of the tunnel 35 to a desired extent. If a lifting of the bars 1c, 1d would interfere with the forward movement of the cigarettes C, i.e. if the upper portions of the bars would be likely to engage the overhanging end portions of the cigarettes, each bar may be provided with a suitable cutout or the distance between the bars may be increased to exceed the length of a cigarette. It is equally possible to utilize pivotally mounted bars so that the bars may be moved upwardly and outwardly if it should become necessary to increase suction in the tunnel 35. All such modifications are so obvious that they will be readily understood without additional illustrations.

When the lifter 6 has collected a row of cigarettes, the cylinder 10 is actuated to retract the piston rod 11 and to rock the levers 13a, 13b in an anticlockwise direction (arrow 22) in order to move the lifter upwardly and away from the upper run of the belt 2. The row of cigarettes received in the recesses 32 is then ready for transfer into the tray 5 of FIG. 1. The manner in which a row of cigarettes may be transferred into the tray will be described hereinafter. While the lifter 6 is moved to and thereupon remains in its raised position, the cigarettes advancing along the upper run of the belt 2 are free to travel toward the front end of the lifter, i.e. toward the levers 13a, 13b. However, the speed at which the lifter is raised and at which the row of cigarettes received in the recesses 32 is transferred into the tray 5 is selected in such a way that the lifter returns to the position of FIG. 3 before the foremost cigarette can advance beyond the foremost recess 32 so that the next row of cigarettes can be formed without permitting any cigarettes to advance beyond the lifter.

The ports 20, 21 are aligned when the lifter 6 is raised whereby the suction prevailing in the duct 19 and in the slots 33 drops because the fan 39 can draw air through the ports 20, 21 and directly into the duct 16. Therefore, the cigarettes received in the recesses 32 adhere with a reduced force to the underside of the lifter 6 and may be readily transferred into the tray 5. As soon as the lifter descends, the ports 20, 21 are sealed from each other and the suction in the duct 19 rises so that the lifter may suck cigarettes off the upper run of the belt 2.

It will be noted that the ducts 16, 19 and the suction slots 33 together form channel means communicating with the vacuum generating device 39 and having intake ends opening into each recess 32 so as to suck cigarettes off the upper run of the belt 2 in the sequence in which the cigarettes advance through the tunnel 35. The cross-sectional area of the duct 19 preferably increases in a direction from the sleeve 27 toward the sleeve 17 in order to avoid or to reduce losses due to friction.

FIG. 5 illustrates a modified pneumatic lifter 50 which includes a stack of alternating lifting elements in the form of plates 51, 51a. The lower end faces of the plates 51, 51a together form a retaining surface 53 along which rows of cigarettes are formed when the lifter 50 descends toward the belt 2. The lower end face of each plate 51 is formed with a concave recess 54 which communicates with a suction slot 55 (see FIGS. 6 and 7) through which air is drawn in upward direction to suck a cigarette into the respective recess 54. The slots 55 of the plates 51 are defined by side walls 56, 57 (see FIGS. 8 and 9) which are respectively provided with slot-like openings or cutouts 59, 58. The upper portion of each plate 51 is formed with a pair of spaced bores 60, 61 which respectively receive clamping bolts 62, 63. As shown in FIG. 6, the openings 58, 59 are laterally offset with respect to each other so that only their central portions are in registry to form part of a continuous suction duct 64 which extends through the full length of the lifter 50.

The construction of the plates 51a is analogous to that of the plates 51 and their parts are identified by the same reference numerals each followed by the character a (see FIG. 10). The sole difference between the plates 51, 51a is that the openings 58a provided in the walls 57a of the plates 51a are laterally offset with respect to the openings 58 in the walls 57 of the plates 51. The same applies to the openings 59 and 59a. In other words, the plates 51a are identical with but are turned through 180 degrees with respect to the plates 51. The suction duct 64 extends through the entire stack of plates 51, 51a and leads to a suction conduit 65 which is located at the forward end of the lifter 50 and whose intake end is secured to the foremost plate 51a. It is preferred to provide the foremost plate 51a with a transversely extending rail 66 which arrests the foremost cigarette C when the lifter 50 is caused to descend toward the upper run of the belt 2. Thus, the distance between the retaining surface 53 and the belt 2 always exceeds the diameter of a cigarette but the distance between the arresting rail 66 and the belt is greater than the diameter of a cigarette only when the lifter 50 is raised.

The arresting rail 66 may perform two functions, namely: If the lifter 50 is mounted in the same way as the lifter 6 of FIGS. 1 to 4, the rail 66 arrests the foremost cigarette C and simultaneously aligns this cigarette with the recess 54a of the foremost plate 51a. The second cigarette C' is then automatically aligned with the recess 54 of the foremost plate 51 because the cigarette C prevents it from advancing beyond the foremost plate 51 and because the cigarette C then performs the function of the arresting plate 66 insofar as the cigarette C' is concerned. This applies only when the upper side of the belt 2 is smooth so that, under certain circumstances, the cigarettes advancing along the upper run of this belt may assume inclined positions in which their longitudinal directions are not perpendicular to the direction in which the belt 2 advances (arrow 67).

On the other hand, if the belt 2 is replaced by a belt 2a of the type shown in FIG. 11, i.e. by a belt whose upper side is provided with transversely extending holding means or pockets 2b, the rail 66 may be dispensed with because the cigarettes are then compelled to remain in the respective pockets 2b up to the time when they reach the respective recesses 54 or 54a. The belt 2a may consist of synthetic plastic material or it may be replaced by a chain provided with cradles as substitutes for the pockets 2b of FIG. 11.

The suction slots 55, 55a and the duct 64 together form channel means which are permanently connected to the vacuum generating device (conduit 65) and whose intake ends open into each of the holding means 54, 54a.

The lifter 50 operates as follows:
The cigarettes C, C' advance with the upper run of the belt 2 (arrow 67). The suction prevailing in the slot 55a of the foremost lifting plate 51a is greater than the suction in the slots 55, 55a at the upstream side of this foremost plate 51a, whereby the first cigarette C is compelled to advance all the way to the arresting rail 66 and is thereupon sucked into the first recess 54a to assume the position shown in FIG. 5. If this cigarette C was inclined with respect to the foremost recess 54a, the rail 66 takes care that the cigarette is aligned with the respective recess.

When the first cigarette C is received in the recess 54a of the foremost plate 51a, it seals the intake ends of the respective slot 55a whereby the suction in the slot 55 of the foremost lifting plate 51 increases and the second cigarette C' is automatically lifted into the first recess 54 (arrow 68). This procedure is then repeated until each lifting plate 51, 51a supports a cigarette, whereupon the row of cigarettes retained along the surface 53 is ready for transfer into the tray.

The purpose of the laterally offset openings 58, 59 and 58a, 59a is to reduce the cross-sectional area of the duct 64 in order to make sure that the suction prevailing in each unsealed slot 55 or 55a is sufficient to lift and to properly retain a cigarette. An important advantage of a lifter utilizing alternating plates 51, 51a is that the opening 58 of a plate 51 is in full registry with the opening 59a of the leading plate 51a and that the opening 59 of each plate 51 is in full registry with the opening 58a of the trailing plate 51a. Furthermore, the length of the lifter 50 may be changed at will merely by removing or by adding a desired number of plates 51 and/or 51a. This might become necessary if the lifter 50 is utilized to form rows of cigarettes for introduction into differently dimensioned trays, i.e. into trays which might accommodate rows containing say 50, 80, 100 or 150 cigarettes.

Another very important advantage of a composite lifter of the type shown in FIG. 5 will be readily understood by referring to FIG. 12 which illustrates a plate-like insert of spacer 51b. This spacer is formed with a cutout or slot 64b and with two spaced bores 60b, 61b. These bores may respectively receive the clamping bolts 62, 63 when the spacer 51b is inserted between a selected pair of lifting plates 51, 51a. The cutout 64b is then in registry with the overlapping portions of the adjacent openings 58, 59 and 58a, 59a and constitutes a portion of the suction duct 64.

Spacers 51b are necessary when the lifter 50 of FIG. 5 is utilized for collection of cigarettes preparatory to transfer of cigarette rows into boxes or packs rather than into trays of the type shown in FIG. 1. As a rule, a box made to accommodate 20 cigarettes contains three rows of cigarettes including two outer rows each of which contains seven cigarettes and a median row with six cigarettes. Now, if the lifter 50 of FIG. 5 is assembled in such a way that groups containing seven lifting plates 51, 51a are separated from each other by one or more spacers 51b, the lifter may be utilized in a packaging machine by collecting rows of seven cigarettes. The tray 5 at the transfer station T of FIG. 1 is then replaced by a series of boxes supported on tapered mandrels 71 so that the cigarettes adhering to the retaining surface 53 of the lifter 50 may be transferred directly into the boxes. The means 8 for shifting the lifter is then modified in such a way that the lifter is rocked back and forth in order to first deliver into each box a row containing seven cigarettes, to thereupon deliver into the partly filled boxes rows containing six cigarettes, and to finally deliver into each box a row containing seven cigarettes as will be described hereinafter in connection with FIGS. 42 and 43, whereby the plunger 135 will be suitably modified so as to remove a number of rows which may contain six or seven cigarettes. It will be necessary to lower the boxes consecutively on platform 9 until the last row of cigarettes for each box has been inserted. If desired, several rows of boxes may be placed one above the other. The number of spacers 51b is selected with a view to make sure that the distance between the adjacent rows of cigarettes equals the distance between the adjacent cigarette boxes.

Figure 13:
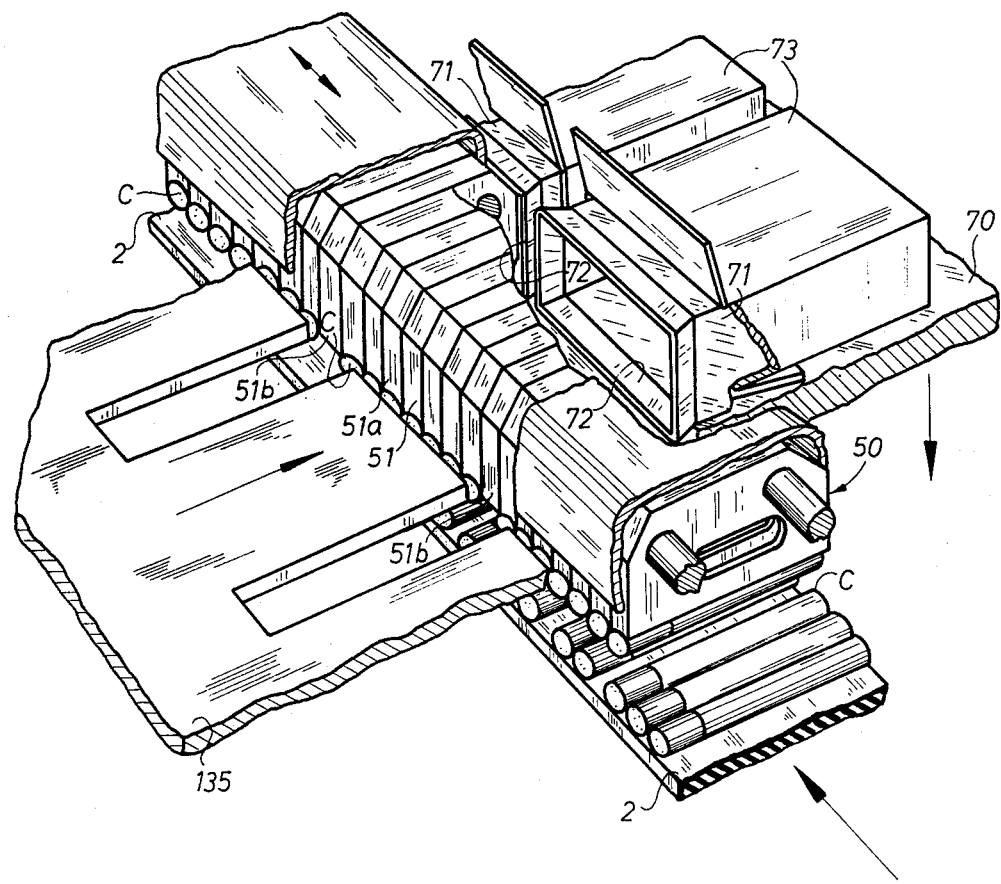
FIG. 13 is a fragmentary perspective view of a combined transfer and packaging station at which a pneumatic lifter of the type shown in FIG. 5 and embodying spacers of the type shown in FIG. 12 is utilized to collect rows of elongated articles for immediate transfer into a plurality of cigarette packs.

The just described modification of our invention is illustrated schematically in FIG. 13 which shows a platform 70 provided with tapered mandrels 71 having tapered portions 72. The boxes 73 are disposed around the mandrels 71 and the lifter 50 comprises spacers 51b whose thickness corresponds to the distance between a pair of adjacent mandrels 71. The boxes 73 are deposited onto and are removed from the platform 70 in rhythm with the operation of the lifter 50 by means of a mechanism whose construction forms no part of this invention.

It has been found in actual use of the lifter that suction prevailing in the slot 55a of the foremost plate 51a before this plate receives a cigarette C should be about three times stronger than the suction prevailing in the foremost plate 51, that suction prevailing in the foremost plate 51 (after the foremost plate 51a has received and holds a cigarette) should be about three times stronger than the suction prevailing in the second plate 51a, and so on. This can be readily achieved by proper dimensioning of the channel means consisting of the suction duct 64, of the openings 58, 59, 58a, 59a and of the suction slots 55, 55a.

It was also found that the cross-sectional area of the suction duct 64 need not exceed the combined cross-sectional area of the two suction slots 55 or 55a.

If each row should contain a very large number of cigarettes, two or more lifters 50 may be arranged in series in the longitudinal direction of the conveyor. For example, each row may contain as many as 150 cigarettes.

In order to avoid or to reduce losses in suction force due to friction of air with the walls bounding the duct 64, the cross-sectional area of this duct may increase in a direction from its intake toward its discharge end, i.e. the cross-section of the duct 64 may be greatest in the region of the foremost lifting plates 51, 51a. In the embodiment of FIGS. 5 to 10, the width of the duct 64 is less than the length of a slot 55 or 55a.

FIGS. 14 to 16 illustrate a modified lifting plate 75 which is again provided with a concave recess 76 and with an upwardly extending suction slot 77 opening into the recess 76 and drawing air into a duct 82 defined by fully overlapping openings 80, 81 respectively provided in the side walls 78, 79. The plate 75 is formed with two spaced bores 83, 84 for clamping bolts of the type shown in FIG. 5. As illustrated in FIG. 15, the recess 76 actually consists of two sections which are separated by the intake end of the slot 77. When a series of plates 75 is assembled on two clamping bolts to form a pneumatic lifter, the cigarettes retained in the recesses 76 of stacked plates 75 may but need not abut against each other, i.e. the lower edge portions of the side walls 78, 79 may constitute narrow partitions between the adjacent cigarettes.

FIGS. 17 to 19 show a different lifting plate 85 which is provided with two spaced bores 86, 87 and which is formed with an open slot or cutout 88 replacing the openings 58–59, 58a–59a or 80–81 of the previously described lifting plates. When a series of plates 85 is assembled on two clamping bolts to form a pneumatic lifter, the cutouts 88 form an elongated channel or duct which is connected to a vacuum generating device. The recesses 89, 89a in the underside of the plate 85 are fully separated from each other because this plate does not have side walls such as would correspond to the side walls 78, 79 of the plate 75 shown in FIGS. 14 to 16. Therefore, the thickness of a lifting plate 85 should not exceed and may be slightly less than the diameter of a cigarette because, when the recesses 89, 89a of adjacent plates 85 assembled into a pneumatic lifter receive a row of cigarettes, the cigarettes must actually form a barrier which prevents peneration of air between the adjacent cigarettes if the lifter utilizing such plates is to be effective. In the embodiment of FIGS. 14 to 16, the lower edge portions of the side walls 78, 79 cooperate with the cigarettes to seal the suction slots 77 of all such lifting plates 75 whose recesses 76 already accommodate a cigarette.

In the embodiments of FIGS. 14 to 16 and 17 to 19, the width of the suction duct equals the length of suction slots in the individual lifting plates.

Figure 20:
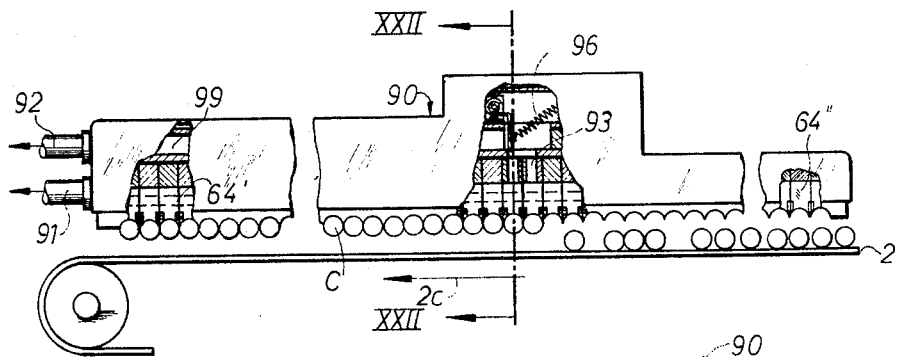
FIG. 20 is a side elevational view of a different pneumatic lifter which is provided with two suction conduits.
Figure 21:
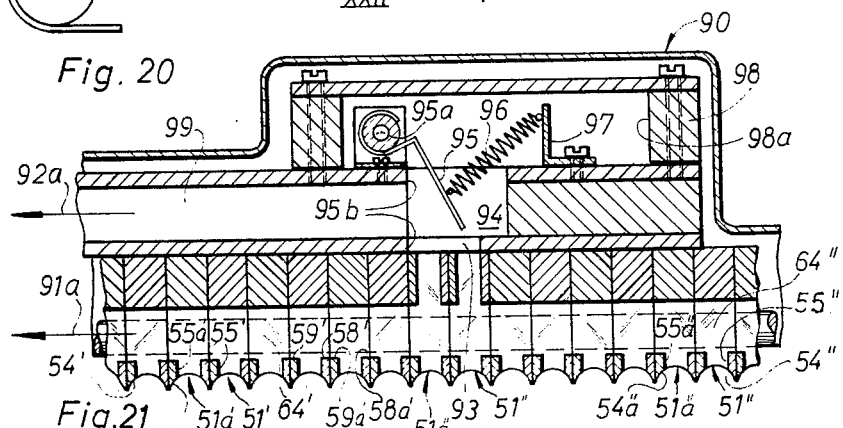
FIG. 21 is a greatly enlarged longitudinal section through the central portion of the lifter shown in FIG. 20.
Figure 22:
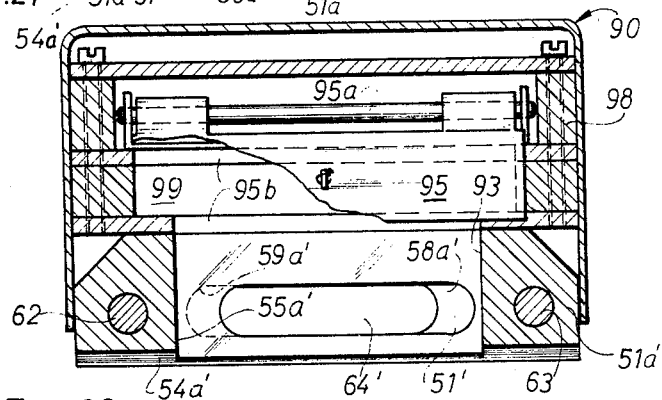
FIG. 22 is a greatly enlarged transverse vertical section as seen in the direction of arrows from the line XXII—XXII of FIG. 20.

Referring to FIGS. 20 to 22, there is shown a pneumatic lifter 90 which constitutes a further modification of the lifter 50. The lifter 90 is assembled of two groups of lifting plates including a front group consisting of plates 51′, 51a′ and a rear group consisting of plates 51″, 51a″. The duct 64′, defined by the partially overlapping openings 58′, 59′ and 58a′, 59a′ of the plates 51′, 51a′ communicates with a first suction conduit 91 leading to a vacuum generating device such as the fan 39 shown in FIG. 1. The discharge end of the duct 64″ defined by the partially overlapping openings of the plates 51″, 51a″ communicates with an upwardly opening port 93 provided in the foremost plates 51″, 51a″. The port 93 communicates with a chamber 94 provided in the lifter 90 above the port 93, and the chamber 94 may communicate with a connecting duct 99 which extends above the upper ends of the plates 51′, 51a′ and leads to the intake end of a second suction conduit 92 which is also connected to the vacuum generating device. The plates 51′, 51a′, 51″, 51a″ are assembled on two parallel clamping bolts 62, 63. The chamber 94 communicates with a compartment 98a which is formed in a turret-like upward extension 98 of the lifter 90 and which accommodates a valve adapted to selectively connect the duct 64" with the duct 99. This valve comprises a flap 95 whose upper end portion is turnably mounted on a transversely extending pintle 95a and which is permanently biased by a resilient element in the form of an expandible helical spring 96 which is mounted on a bracket 97 provided in the compartment 98a. The lower edge portion of the flap 95 normally abuts against a stop 95b.

The lifter 90 of FIGS. 20 to 22 is utilized when the rows of cigarettes C received in the recesses 54', 54a', 54", 54a" of the lifting plates are very long so that suction created by the fan connected with the conduit 91 is insufficient to lift cigarettes into the recesses of the plates 51", 51a" located in the rear portion of the lifter 90. The air drawn through the ducts 64', 99 flows in directions indicated by the arrows 91a, 92a. The spring 96 tends to open the flap 95 and to counteract subatmospheric pressure prevailing in the connecting duct 90 which tends to maintain the flap 95 in abutment with the stop 95b and to thereby seal the duct 99 from the duct 64".

The lifter 90 operates as follows:

At the time the lifter starts to collect cigarettes C from the advancing belt 2, the flap 95 seals the ducts 64", 99 from each other (FIG. 21) because the spring 96 is too weak to move the flap away from the stop 95b as long as the pressure prevailing in the chamber 94 and in the compartment 98a exceeds substantially the pressure prevailing in the duct 99. The suction created by the vacuum generating device connected to the lower conduit 91 is comparatively weak in the region of the port 93 when the lifter 90 begins to collect cigarettes into the recesses 54', 54a' of the plates 51', 51a'. However, as the length of the row of cigarettes C increases, the cigarettes retained by the plates 51', 51a" consecutively seal the slots 55', 55a' so that the suction created by the conduit 91 is the port 93 and in the chamber 94 increases at the same rate at which the length of the row of cigarettes formed along the duct 64' increases whereby, at a time before the row of cigarettes reaches the length shown in FIG. 20, i.e. before each plate in the front group of plates 51', 51a' can receive a cigarette, the pressure prevailing in the chamber 94 drops sufficiently to permit opening of the flap 95 under the bias of the spring 96 (FIG. 20). The duct 64" now communicates with the duct 99, and the suction prevailing in the slots 55", 55a" of the plates 51", 51a" is strong enough to permit continued formation of a row of cigarettes which finally contains as many cigarettes as there are plates in the lifter 90. When the row of cigarettes is transferred into a tray or into another storing device, suction in the chamber 94 drops automatically so that suction prevailing in the duct 99 causes the flap 95 to return to its closed position against the bias of the spring 96. It will be readily understood than an exceptionally long pneumatic lifter may be provided with three or more suction conduits and with an equal number of valves 95, 96 to make sure that suction prevailing in the slots of the lifting plates at the trailing end of the lifter is strong enough to raise the cigarettes off the upper run of the belt 2. This belt advances in the direction indicated by the arrow 2c.

Referring to FIGS. 23 to 26, there is shown a pneumatic lifter 100 which may be utilized as a substitute for the lifters 6, 50 and 90 respectively shown in FIGS. 2, 5 and 20. The lifter 100 is disposed above the upper run of an endless conveyer belt 2d and is adjacent to the discharge end of this belt immediately upstream of the reversing roller 24. As shown in FIGS. 23 and 24, the lifter comprises a rectangular housing 101 and a roof-like cover 102 which is secured to the housing by bolts 103. The underside 101a of the housing 101 is formed with transversely extending concave recesses or pockets 104 each of which may accommodate a filterless cigarette C. It will be noted that the width of the belt 2d equals and that the length of the recesses 104 actually exceeds the length of a cigarette. Of course, if the lifter 100 is utilized for forming rows of filter tip cigarettes, the longitudinal ends of each cigarette overhang the lateral edge portions of the belt and may extend beyond the ends of the recesses 104. The number of recesses 104 corresponds to the number of cigarettes in the rows of cigarettes which may be formed by the lifter 100.

Each recess 104 communicates with the intake end of an upwardly extending slot 105 through which the suction operates to attract and to retain a cigarette C. A concavo-convex sensing element or feeler 106 is disposed at the intake end of each slot 105, and each of these feelers is formed with apertures or perforations 107 which may be arranged in one or more rows extending in the longitudinal direction of the respective recess 104. The interior of the housing 101 defines a series of upwardly opening suction chambers 108 each of which communicates with one of the slots 105. These chambers are separated from each other by transversely extending vertical partitions 109.

The foremost suction chamber 108' (i.e. that which is nearest to the reversing roller 24) is in permanent communication with a suction duct 110 defined by the cover 102 and communicating with the intake end of a suction conduit 111 leading to a vacuum generating device such as the fan 39 of FIG. 1. The upper ends of the remaining suction chambers 108 are normally sealed by valve members in the form of elastic panels or flaps 112. One longitudinal end portion 112a of each flap 112 is secured to one side wall of the housing 101 by screws 113. The other end portion of each flap is inclined with respect to the longitudinal direction of the respective recess 104 and forms a projection 112b which extends above and partially overlaps the next suction chamber 108 which is located downstream of the respective flap 112 (see FIG. 26). The projections 112b are normally engaged and retained by shoulders 114c defined by pallets or hooks 114b provided at the free ends of upwardly extending arms 114a forming part of bell crank levers 114 one of which is mounted in each suction chamber 108. The levers 114 are rockable about a horizontal pin 115 which extends through the partitions 109 and which is parallel with the longitudinal extension of the lifter 100. The shorter lower arm 114d of each lever 114 is connected to one longitudinal end of and supports the feeler 106 in the respective recess 104. When the pallets 114b engage the respective projections 112b, the free longitudinal ends of the feelers 106 may descend below the underside 101a of the housing 101.

A rail 116 mounted in the duct 110 and extending in the longitudinal direction of the lifter 100 is utilized as a means for returning the projections 112b into engagement with the respective pallets 114b after a row of cigarettes C is transferred from the recesses 104. The rail 116 normally assumes the position of FIG. 24 or 25 in which it is spaced from the upper ends of the chambers 108, but is movable downwardly (arrow 117) by suitable mechanical or otherwise constructed depressing means. As will be described in connection with FIGS. 27 to 29 which illustrate a slightly modified lifter 125, the rail 116 may be depressed by an electromagnetic device 126 and is normally biased by a spring or the like to assume the position corresponding to that shown in FIG. 24 or 25. The purpose of the valve members 112 and of the levers 114 is to consecutively connect the chambers 108 with the duct 110 so that the cigarettes advanced by the upper run of the belt 2d may enter consecutive recesses 104 beginning with the recess communicating with the foremost chamber 108' and ending with the chamber at the rear end of the lifter 100. The manner in which the levers 114 release the respective valve members 112 will be described in connection with FIGS. 27 to 29.

The lifter 125 of FIGS. 27 to 29 comprises an inverted U-shaped cover 127, and the suction conduit 128 is connected to the front end rather than to the central portion of the cover 127. The housing 101 of the lifter 125 is identical with the housing of the lifter 100. The lifter 125 is located above the upper run of an endless belt 2e and it will be noted that the belt 2e advances in a direction counter to that of the belt 2d in FIG. 23, i.e. the reversing roller 24 is located at the right-hand end of the belt, as viewed in FIG. 29.

The cover 127 is articulately supported by two levers 129, 129a which are suspended in frame members 1e one of which is shown in FIG. 27. The levers 129, 129a are pivotable about horizontal pins 130, 130a. By swinging about the pins 130, 130a, the lifter 125 may be moved closer to or away from the upper run of the belt 2e which latter advances a layer of cigarettes C. The rows of cigarettes formed by the lifter 125 are transferred into a tray 131 which rests on a platform 132. This platform is provided with a vertical rack 133 which meshes with a pinion 134 mounted in the frame of the apparatus and adapted to intermittently advance the platform so as to move the tray 131 into requisite position for reception of a row of cigarettes momentarily held in the recesses 104 of the lifter 125.

In order that the operation of the lifter 125 will be more readily understood, we will now describe one form of an arrangement which transfers rows of cigarettes C from the recesses 104 into the tray 131 even though the transferring arrangement and its modifications will be treated under a separate heading. The transferring arrangement of FIGS. 27 to 29 comprises a plunger 135 which is secured to or which forms part of a pusher 136, the latter comprising a pair of cylindrical sleeves 138 which are slidable along horizontal rods 137 fixed to a frame member 1f and parallel with the cigarettes C. The pusher 136 is biased toward the lifter 125 by a pair of helical springs 139 which are respectively secured to the sleeves 138 and to stationary brackets 140 forming part of the frame of the apparatus in which the lifter 125 is used. A cable 141 is trained around pulleys 142, 143, 144 (see FIG. 29) and has one of its ends connected to the pusher 136 so as to move the latter against the bias of the springs 139. The other end of the cable 141 is connected to a control cylinder 145 whose feed pipe 146 embodies an electromagnetic control device 147 operated by a switch 148 which is actuated by the lifter 125 and which is connected to the control device 147 by conductors 149.

The plunger 135 carries a movable supporting means in the form of a blade 150 which extends toward the lifter 125 and which supports the trailing ends of the cigarettes during transfer of a row of cigarettes from the recesses 104 of the housing 101 into the tray 131. A cam 151 mounted on the pusher 136 is adapted to trip a switch 152 which is connected in the circuit of the aforementioned depressing device 126 for the rail 116. The distance between the stationary switch 152 and the movable cam 151 is selected in such a way that the switch is actuated at a time when the plunger 135 has transferred a row of cigarettes into the tray 131.

The transferring arrangement of FIGS. 27 to 29 further comprises a second supporting means in the form of a rail 153 which is adapted to be raised and lowered in rhythm with the operation of the apparatus and which is located between the open side of the tray 131 and the belt 2e. The upper end of the rail 153 is provided with transversely extending depressions or grooves 154 whose number corresponds to the number of recesses 104 and each of which may support a cigarette C during transfer of a row of cigarettes from the recesses 104 into the tray 131. The rail 153 is articulately supported by two pairs of levers 155, 156 which are pivotable about horizontal pins mounted in the respective brackets 140. The levers 155 comprise extensions 157 which project rearwardly beyond the respective brackets 140 and whose free ends carry rollers 158. Control cams 159 fixed to the sleeves 138 engage the rollers 158 to bring about upward and downward movements of the rail 153 when the pusher 136 is caused to move along the rods 137 in directions indicated by the double-headed arrow 160.

If the tray 131 is placed sufficiently close to the lifter 125, the rail 153 may be omitted. The cigarettes held by the lifter must be moved about halfway out of their respective recesses 104 before the suction prevailing in the chambers 108 may be reduced by admission of secondary air (see the ports 20, 21 in FIG. 3) so that the cigarettes are no longer held in the recesses. If, at the time the suction is reduced, the leading ends of the cigarettes are already advanced into the interior of the tray 131, the rail 153 may be omitted or arrested because the leading ends of the cigarettes may be supported by the bottom of the tray 131 or by the uppermost row of cigarettes already contained in the tray.

The structure shown in FIGS. 27 to 29 is operated as follows:

When the first cigarette advancing along the upper run of the belt 2e reaches the foremost suction chamber 108' (see FIG. 26) of the housing 101 forming part of the lifter 125, it is sucked off the belt 2e and is retained in the foremost recess 104. The suction in the foremost chamber 108' is very strong but the suction in the first chamber 108 is zero because the upper end of the first chamber 108 is closed by the first valve member 112 (see FIG. 26). However, as the leading cigarette C enters the corresponding recess 104, it pivots the associated feeler 106 and thereby rocks the respective lever 114 about the pin 115 so that the pallet 114b of this lever releases the projection 112b of the valve member 112 which covers the upper end of the first chamber 108. The inherent resiliency of the material of which the valve members consist causes the first valve member 112 to move its projection 112b upwardly and into abutment with the rail 116 so that the first valve member assumes the full-line position 112x of FIG. 25. This means that the first chamber 108 is now free to communicate with the duct 110 and with the suction conduit 111 whereby the suction prevailing in this chamber sucks the second cigarette into the second recess 104 to thereby pivot the respective feeler 106 which rocks the associated lever 114 and thereby releases the projection 112b of the valve member 112 which normally seals the upper end of the second chamber 108. The suction now prevailing in the second chamber 108 attracts the third cigarette C which again pivots the respective feeler 106 to thereby release the valve member 112 which covers the upper end of the third chamber 108, and the operation is then repeated in the same manner until each of the recesses 104 receives a cigarette so that the underside of the housing 101 supports a row of cigarettes containing as many cigarettes as there are recesses 104. The sealing position 112o of the valve member 112 located above the first chamber 108 is indicated in FIG. 25 by phantom lines.

It will be noted that lifter 125 is adapted to form a row of equally spaced cigarettes regardless of the spacing of cigarettes on the upper run of the belt 2e because, if the spacing between the cigarettes advancing with the belt 2e is irregular, the suction prevailing in the chamber associated with the foremost empty recess 104 remains unchanged until a cigarette reaches this empty recess. Therefore, the gaps formed in the layer of cigarettes on the upper run of the belt 2e by the inspecting device at the station 3 of FIG. 1 cannot affect the formation of rows at the underside of the housing 101.

When the last recess 104 receives a cigarette from the belt 2e, a series of operations is initiated by a microswitch 161 which is shown in FIG. 26 and which is tripped by the pallet 112b of the last bell crank lever 114, i.e. that lever which controls the valve member 112 normally sealing the upper end of the last suction chamber 108. This microswitch starts a reversible motor 162 which is operatively connected with the levers 129, 129a and which rocks these levers in directions indicated by the arrows 163 in order to raise the lifter above and away from the belt 2e by swinging the lifter in the direction of forward movement of the belt (i.e. toward the reversing roller 24 of FIG. 29). Consequently, the layer of cigarettes supported by the belt 2e is free to advance toward the foremost chamber 108' in the housing 101 because the distance between the row of cigarettes retained in the recesses 104 and the upper side of the belt exceeds the diameter of a cigarette. When moved to its raised position, the lifter 125 trips the switch 148 (see FIG. 29) which in turn actuates the electromagnetic control device 147 and the latter permits escape of compressed fluid from the control cylinder 145. Therefore, the piston rod 145a of the piston received in the control cylinder 145 ceases to exert a pull on the cable 141 and the springs 139 are free to advance the pusher 136 toward the lifter 125. The pusher 136 moves the plunger 135 and the blade 150 toward the row of cigarettes retained in the recesses 104 of the raised lifter 125, whereby the plunger 135 begins to advance the cigarettes toward and into the grooves 154 of the rail 153. The purpose of the blade 150 is to support the trailing ends of the cigarettes at the time the suction acting through the perforations 107 of the feeler 106 is insufficient to maintain the cigarettes in raised position while the cigarettes move toward and onto the rail 153. The leading ends of the cigarettes advanced by the plunger 135 onto and along the rail 153 descend by gravity onto the uppermost row of cigarettes $C_1$ already contained in the tray 131. The structure shown in FIGS. 27 to 29 is not provided with an assembly which staggers consecutively formed rows of cigarettes with respect to each other so that the cigarettes about to be deposited on the uppermost row of cigarettes $C_1$ (see FIG. 28) must find their own way and come to rest in gaps defined by the cigarettes $C_1$. If desired, the rail 153 may assist such desirable deposition of cigarettes by moving back and forth in the longitudinal direction of the belt 2e through distances equal to one-half diameter of a cigarette. Once the row of cigarettes C about to be deposited on the cigarettes $C_1$ reaches the position of FIG. 28, the cams 159 engage the rollers 158 and pivot the levers 155, 156 in order to lower the rail 153 and to permit the blade 150 and the front end face 135a of the plunger 135 to move the cigarette C all the way into abutment with the side wall 131b of the tray 131.

When the pusher 136 performs a forward stroke in order to transfer a row of cigarettes C into the tray 131, the cam 151 advances toward and trips the switch 152 at a time the cigarettes C are already deposited in the tray. The switch 152 sends an impulse to the depressing device 126 which acts on the rail 116 and causes the latter to return the projections 112b of all valve members 112 into engagement with the respective levers 114 so that the upper ends of all suction chambers 108 are now sealed from the duct 110. The foremost chamber 108' continues to communicate with the duct 110 so as to enable the associated recess 104 to pick up the first cigarette from the layer of cigarettes advancing along the upper run of the belt 2e. The motor 162 (FIG. 26) is connected with a time-lag relay 164 which reverses this motor at the time the row of cigarettes C is deposited in the tray 131, whereby the motor rocks the levers 129, 129a anticlockwise, as viewed in FIG. 29, and lowers the lifter 125 toward the belt 2e. As the lifter begins to descend, it releases the switch 148 which latter, through the conductors 149, transmits an impulse to the control device 147 so that the control device admits pressure fluid to the cylinder 145 in order to retract the piston rod 145a and to pull the cable 141 in a sense to return the pusher 136 to the retracted or idle position of FIG. 29. The movements of the lifter 125, of the pusher 136 and of the belt 2e are synchronized in such a way that the foremost cigarette on the upper run of the belt reaches the foremost recess 104 at the time the lifter is already returned to its operative position in close proximity of the belt. The operation is then repeated in the above described manner, i.e. the lifter collects a new row of cigarettes and the plunger 135 thereupon transfers the newly formed row onto the uppermost row of cigarettes C in the tray 131. After each transfer, the pinion 134 is turned (arrow 165 in FIG. 28) through an angle of such magnitude that the platform 132 descends (arrow 166) through a distance equal or nearly equal to the diameter of a cigarette whereby, when the lifter 125 again assumes the raised position of FIG. 28, the tray 131 is in proper position for reception of the newly formed row of cigarettes.

It will be noted that the structure shown in FIGS. 27 to 29 embodies a belt 2e whose width is less than the length of a cigarette and that the cigarettes advanced by this belt are filter tip cigarettes. Also, the tray 131 is assumed to be of the open type because the cigarettes will be deposited sideways. The filter tips F are adjacent to the side wall 131b because, if the tray 131 is thereupon transferred to a packaging machine, the cigarettes are packed in such a way that the filter tips F are at the open ends of the boxes.

FIGS. 30 to 34 illustrate a pneumatic lifter 170 which includes a housing 171 adapted to be raised and lowered with respect to a belt 2f. The underside 172 of the housing 171 is formed with transversely extending holding means in the form of recesses or pockets 173 whose length is somewhat less than the length of a filter tip cigarette C (FIG. 31), and the overall length of the housing 171 equals or exceeds the length of a row of cigarettes which is to be formed by the lifter 170. The exact width of the housing 171 (i.e. the length of the recesses 173) depends on the suction force necessary to lift the cigarettes from the belt 2f and to retain the cigarettes during transfer into a tray or another storing device.

Each recess 173 communicates with a suction slot 174 and the adjacent slots 174 are separated from each other by transversely extending vertical partitions 175. The partitions 175 extend all the way between the side walls 171a, 171b of the housing 171 and are intersected by a longitudinally extending partition 176 so that the partitions 175, 176 and the side wall 171b define between themselves a series of upwardly opening compartments 177, one for each slot 174 and each accommodating the upper arm 178a of a bell crank lever 178. The upper portion of each slot 174 slopes toward the next slot, and the inclination of these upper portions is such that the upper end face 175a of each transverse partition 175 is located above the lower end face 175d of an adjacent partition. As shown in FIG. 30, each partition 175 comprises a vertically extending lower portion 175b and an inclined upper portion 175c, the latter terminating at the respective end face 175a.

The upper end of each slot 174 is normally sealed by a resilient valve member on flap 179 whose underside engages two adjacent upper end faces 175a. Each valve member 179 comprises a resilient leaf 180, an elongated aluminum strip 181, and two shorter aluminum strips 182 of suitable size. The strips 181 serve as a means for sealing the upper ends of the respective slots 174, and the pairwise arranged strips 182 serve as clamp supports for fastening the leaves 180 to the side wall 171a of the housing 171.

The free end of each valve member 179 carries a downwardly extending stop pin 183 whose lower end carries an inverted substantially conical head 184 defining an upwardly facing annular shoulder which may be engaged by the pallet 178b of the respective lever 178. The stop pins 183 project into the compartments 177.

The levers 178 are rockable about a horizontal pin 185 which extends in the longitudinal direction of the housing 171 and traverses the lower portions 175b of the partitions 175 at a point adjacent to the side wall 171b. The extent to which the levers 178 may be rocked is limited by a stop rod 186 which traverses the upper portions 175c of the partitions 175 and which is located above and is parallel with the pin 185.

The lower arms 178c of the levers 178 extend into the respective slots 174 so that their free ends normally project into the recesses 173 (see FIG. 31) if the upper arms 178a abut against the stop rod 186.

The right-hand ends of the strips 181, as viewed in FIG. 32, are fastened to the leaves 180 by means of rivets 187 which are outwardly adjacent to the stop pins 183. The housing 171 carries a cover or hood 188 which accommodates a longitudinally extending rail 189. The ends of this rail are fastened to disks 190 (one shown in FIG. 34) so that the rail is off center, i.e. that one side face of the rail is located in or adjacent to the axis of the shaft 191 on which the disks 190 are mounted. The disk 190 may turn the rail 189 between a position of rest (FIGS. 31 and 34) and an operative position (FIG. 32).

The rail 189 serves as a means for moving the pins 183 into engagement with the respective pallets 178b and for thereby closing the upper ends of the slots 174. To that end, the rail 189 is formed with an internal space 192 which accommodates a series of reciprocable pins 193. These pins are under the bias of springs 194 and each thereof is provided with a flange 195 against which the respective spring acts to normally expel the front end portion of the pin from the space 192.

At least one of the disks 190 is provided with a small lug 196 for one end of a helical spring 197. The other end of the spring 197 is secured to the lifter 170. The purpose of the spring 197 is to turn the disks 190 in an anticlockwise direction, as viewed in FIG. 34, so as to turn the rail 189 and to thereby move the pins 193 into engagement with the respective valve members 179. The rail 189 normally remains in the position of FIG. 32 and is turnable into the idle position of FIG. 30, 31 or 34 by a tension device shown in FIG. 34 and including a flexible element or chain 198 which may turn the disks 190 against the bias of the spring 197. One end of the chain 198 is secured to the disk 190 of FIG. 34 and the other end of this chain is secured to a piston rod 199 extending into a cylinder 200 and secured to a reciprocable piston 201. The chain passes about a sprocket 202 which is rotatably supported by the lifter 170. As soon as the lifter is ready to collect a row of cigarettes C, the conduit 203 connected to the cylinder 200 admits pressure fluid in order to turn the disks 190 in a clockwise direction, as viewed in FIG. 34, whereby the disks turn the rail 189 against the bias of the spring 197 and move the pins 193 away from the respective valve members 179 so that the upper ends of the slots 174 may communicate with the elongated duct 204 formed by the cover 188 which latter is connected to a suction conduit in the same manner as described in connection with FIG. 23 or 27. The cylinder 200 may be connected to a source of compressed air or another pressurized fluid (not shown). The conduit 203 contains a suitable valve (not shown) which may connect the internal space of the cylinder with the atmosphere so that the spring 197 may return the rail 189 to the operative position of FIG. 32 at the time the row of cigarettes assembled in the recesses 173 is already transferred into a tray or at the time the row of cigarettes is supported by means such as the blade 150 and the rail 153 of FIG. 28.

The lifter 170 operates as follows:

Cigarettes C are advanced along the upper run of the belt 2f in the direction indicated by the arrow 205. All the slots 174 excepting the foremost slot are sealed from the suction duct 204 by the respective valve members 179 but the rail 189 is in the inoperative position shown in FIG. 30. As soon as the foremost recess 173 receives a cigarette C, the cigarette engages the lower arm 178c of the respective lever 178 and disengages the pallet 178b on the respective upper arm 178a from the associated head 184 so that the valve member 179 sealing the upper end of the second slot 174 is free to move to its open position (FIG. 33) and to connect the second slot with the duct 204. The recess 173 at the lower end of the second slot now receives a cigarette which trips the lower arm 178c of the associated lever 178, and the operation is then repeated in the same way until the last recess receives a cigarette so that the formation of a row of cigarettes along the underside 172 of the housing 171 is completed. The aforementioned valve in the conduit 203 of the cylinder 200 may be connected with the last slot 174 so as to automatically shut off the flow of pressure fluid into the cylinder and to permit the springs 197 to turn the rail 189 to the operative position of FIG. 32 as soon as the duct 204 is free to communicate with the last slot 174.

The pneumatic lifter 210 of FIGS. 35 to 37 is located above and is movable toward and away from the upper run of an endless belt 2g which advances in the direction indicated by the arrow 236 to move a layer of cigarettes C into requisite position so that the cigarettes may form a row along the underside 212 of a base 233, the latter forming part of a housing 211. The underside 212 of the base 233 is formed with a series of transversely extending recesses or pockets 213 each of which may accommodate a cigarette. The overall length of the base 233 exceeds slightly the length of a row of cigarettes, and the length of a recess 213 is somewhat less than but may be equal to the length of a cigarette. As a rule, the length of the recesses 213 depends on the magnitude of suction necessary to rapidly lift and to properly retain the cigarettes in rhythm with the movement of the belt 2g and with the operation of the transferring assembly which latter is not shown in FIGS. 35 to 37.

Each recess 213 communicates with the intake end of an upwardly extending suction slot 214. These slots terminate in the upper side of the base 233 and are separated from each other by specially constructed pivotable inverted L-shaped partitions 215. Each partition comprises a plate-like main body portion whose upper edge portion 216 is connected to or integral with a substantially horizontal cover member 217.

The lower edge portions 218 of the partitions 215 are pivotably received in transversely extending bearing grooves 219 provided in the upper side of the base 233 intermediate each pair of adjacent suction slots 214. It will be noted that the lower edge portions 218 and the grooves 219 constitute knife edge bearings for the partitions so that each partition may be pivoted between the full-line position 215 and the phantom-line position 215' of FIG. 37. The means for permanently biasing each partition into the one or the other of its end positions comprises a series of compressed helical springs 220 each of which is connected to the respective cover member 217 by a spring holder 221. The upper ends of the springs 220 are supported by spring holders 223 which are mounted on an elongated rail 222. The ends of this rail are mounted in the end walls 231, 232 of the housing 211.

FIG. 37 illustrates in greater detail the construction and mounting of the spring holders 221, 223. Each lower spring holder 221 comprises a substantially hemispherical head which is secured to the upper side of the respective cover member 217 and which is received in a concave socket member 224 provided with an upwardly extending stud 225 received in the lower end portion of the respective spring 220. Each upper spring holder 223 comprises a spherical head 227 which is received in a concave socket 226 provided in the underside of the rail 222. The head 227 carries a downwardly extending stud 228 which is received in the upper end portion of the respective spring 220.

When the suction slots 214 are sealed from the vacuum generating device (not shown), the longitudinal axes 229 of the springs 220 are located at one side of the lines 230 connecting the centers of the heads 227 with the respective grooves 219 so that the respective partitions 215 assume positions corresponding to the full-line position of the partition shown in FIG. 37 or to the position of the left-hand group of partitions shown in FIG. 35. The angles enclosed by the lines 229, 230 are rather small, i.e. each partition must pivot through a small angle in order to move the respective spring 220 into a dead-center position in which the line 229 coincides with the line 230.

The rear end wall 232 of the housing 211 is secured to the base 233 by bolts 232a which extend through elongated apertures 232b (see FIG. 37). Thus, the wall 232 may be adjusted in directions toward and away from the front end wall 231 in order to change the inclination of the partitions 215 in a position in which these partitions seal the respective suction slots 214 from a suction duct 247 defined by the housing 211 above the cover members 217. The extent to which the rear end wall 232 may be adjusted depends on the length of the apertures 232b. If desired, the front end wall 231 may be secured to the base 233 in similar fashion.

Immediately adjacent to the foremost recess 213, the base 233 is formed with a downwardly extending stop 234 whose underside 235 is located at a level below the underside 212. When the lifter 210 assumes the position of FIG. 35, the distance between the underside 235 of the stop 234 and the upper side of the belt 2g is less than the diameter of a cigarette C so that the stop automatically adjusts the position of the foremost cigarette in order to make sure that this cigarette is properly aligned with and may be sucked into the foremost recess 213. It will be readily understood that the integral stop 234 of the lifter 210 shown in FIGS. 35 to 37 may be replaced by a stop which is detachably secured to the underside 212 of the base 233. If the lifter 210 is out of order or if, for certain reasons, the cigarettes should pass below the lifter with the suction cut off so that they may be collected by hand at the downstream side of the base 233, the lifter 210 is raised sufficiently to increase the distance between the underside 235 and the belt 2g in order to permit unhindered advance of cigarettes beneath the stop 234.

The foremost slot 214' is free to communicate with the suction duct 247 because the front end wall 231 carries an inwardly extending distance plate 237 which limits the extent to which the foremost partition 215a may be tilted in its groove 219. Therefore, a passageway 238 remains between the front end wall 231 and the foremost partition 215a, and this passageway is in permanent communication with the suction duct 247. The pressure prevailing in the space 248 above the foremost slot 214' is much higher than the pressure prevailing in the passageway 238 so that the foremost partition 215a is automatically pivoted into abutment with the distance plate 238.

The main body portion of each partition (excepting the partition 215a) is provided with one or more spacer elements or stops 240 which abut against the adjacent cover members 217 when the partitions are tilted in a direction to the right, as viewed in FIG. 37, so that a narrow slit 241 remains between each cover member 217 and the adjacent partition. The purpose of the slits 241 is to provide restricted passages between the respective suction slots and the suction duct 247, and the cross-sectional area of each slit 241 is sufficient to make sure that the suction prevailing in the respective suction slot is sufficient to properly retain a cigarette in the associated recess 213. It will be noted that the spacer elements 240 are not engaged by the adjacent cover members 217 when the partitions are pivoted in a direction to the left, as viewed in FIG. 37, which means that the slits 241 are then eliminated because each cover member 217 is now in full-length sealing abutment with the front side of the main body portion forming part of the adjacent partition.

The means for tilting the partitions into their starting or sealing positions (corresponding to the full-line position of the partition 215 shown in FIG. 37) comprises a pin 242 which is adapted to engage the front side of the foremost partition 215a and which is reciprocable by a solenoid 243 mounted on the front end wall 231. The solenoid 243 is connected in the circuit of an electric switch 244 which is mounted at the front end of the base 233 and whose actuating member 249 extends laterally beyond the base 233. This actuating member may be depressed by the plunger of a transferring assembly at the time the row of cigarettes C retained in the recesses 213 is being transferred into a tray or into another type of storing device. For example, the actuating member 249 may be depressed by the plunger 235 of the transferring assembly shown in FIG. 27. When the actuating member 249 is depressed, the switch 244 energizes the solenoid 243 and the latter moves the pin 242 in a direction (arrow 245 in FIG. 35) to pivot the partitions to the positions occupied by the group of partitions in the left-hand portion of FIG. 35 in which the spacer elements 240 are not engaged by the cover members 217 and the slits 241 are eliminated. When the plunger of the transferring assembly releases the actuating member 249, the pin 242 is retracted but all partitions excepting the partition 215a remain in positions in which they seal the respective suction slots from the suction duct 247. The foremost partition 215a automatically returns into abutment with the distance plate 237 owing to the difference in pressures prevailing in the passageway 238 and in the space 248.

The lifter 210 operates as follows:

At the time the recesses 213 are about to receive a row of cigarettes C, all partitions save for the foremost partition 215a assume positions corresponding to the full-line position of the partition 215 shown in FIG. 37, i.e. the cover members 217 sealingly engage the main body portions of the adjacent partitions without engaging the spacer elements 240. The rearmost partition 215 (which is shown in FIG. 37) abuts against the inner side of the rear end wall 232. The cigarettes advance in the direction indicated by the arrow 236 and, since the space 248 above the foremost slot 214' is free to communicate with the suction duct 247, the first cigarette C is sucked up into the foremost recess 213. If the first cigarette is inclined with respect to the recesses 213, it is automatically aligned by the stop 234 and, once received in its recess, the first cigarette then acts as a stop for the second cigarette, and so on.

When the foremost recess 213 receives and retains a cigarette, the cigarette seals the intake end of the foremost slot 214' so that this slot is nearly or fully sealed from the atmosphere. Consequently, the pressure in this slot 214' and in the space 248 drops considerably while the second slot 214" continues to communicate with the atmosphere so that the pressure in the space 248a above the second slot 214" is much higher than the pressure prevailing in the space 248. Owing to such difference in pressures prevailing in the spaces 248, 248a, the second partition 215b is caused to pivot against the foremost partition 215a and its spacer elements 240 abut against the cover member 217 of the foremost partition to define a slit 241 whose width is selected with a view to make sure that the suction prevailing in the space 248 and in the slot 214' is sufficient to retain a lifted cigarette in the foremost recess 213. Also, the suction in the second space 248a is not increased because this space is in full communication with the duct 247 so that the second cigarette is automatically sucked into the second recess 213. The procedure is then repeated in the above described manner, i.e., the difference in pressures prevailing in the space 248b and in the space above the third slot 214 causes the third partition 215 to pivot against the partition 215b and to form with the second partition a slit 241 in order to retain the second cigarette in the second recess, the suction created in the third slot 214 causes the third cigarette to rise into the third recess 213, and so on. The direction in which the cigarettes are lifted into the respective recesses 213 is indicated by arrows 246.

When the second partition 215b is caused to pivot to the position of FIG. 35, the suction prevailing in the space 248 must overcome the bias of the respective spring 220 which latter tends to maintain the partition 215b in abutment with the third partition. However, a soon as the partition 215b reaches and moves beyond a dead-center position in which the axis 229 of its spring 220 coincides with the line 230, the spring 220 actually assists further pivotal movement of the partition 215b into abutment with the cover member 217 of the foremost partition 215a. The directions in which the partitions may be pivoted under and against the bias of the springs 220 are indicated in FIG. 37 by the double-headed arrow 239.

It will be noted that the partitions 215, 215a, 215b and the springs 220 together constitute valve means for selectively connecting or sealing the suction slots 214, 214', 214" from the suction duct 247 in order to consecutively lift cigarettes with considerable suction and to thereupon maintain only such suction as is necessary to retain the cigarettes in the respective recesses 213. The lateral edge portions of the partitions are slidable between a pair of parallel side walls 250, 251 forming part of the housing 211, and these side walls are bolted to the base 233.

Of course, the lifter of our invention may be utilized for forming rows of articles of polygonal cross section merely by changing the configuration of the recesses. For example, the lifter 210 may be provided with recesses 213 of polygonal shape if it is utilized as a means for forming rows of cigars or cigarettes of square or rectangular cross-sectional contour. Also, the lifter 210 may be utilized as a means for forming rows of articles whose diameter is less than the distance between the centers of two adjacent recesses because each article is automatically retained in the bottom zone of its respective recess so that smaller-diameter articles retained along the underside 212 of the base 233 will be slightly spaced but will be equidistant from each other.

The lifter 210 may be furnished with two or more bases 233 each of which is then provided with differently configurated or dimensioned recesses so that the lifter may be utilized as a means for forming rows of differently configurated articles.

*The shifting assembly*

FIGS. 38 to 43 illustrate a shifting assembly which is utilized for staggering rows of cigarettes C consecutively formed by the pneumatic lifter 6 of FIGS. 1 to 4 so that a newly formed row of cigarettes is automatically deposited in the gaps 260 defined by the uppermost row of cigarettes already received in a tray 5. The manner in which superimposed rows of cigarettes are stacked in a tray 5 is shown in FIG. 44.

The lifter shown in FIGS. 38 to 43 is identical with the lifter 6 of FIGS. 1 to 4. Its holding means in the form of recesses or pockets 32 communicate with upwardly extending slots corresponding to the slots 33 shown in FIG. 4, and each of these slots communicates with the suction duct 16 in the hollow spindle 15 through which air is being drawn in the direction indicated by the arrow 261.

Figure 38:
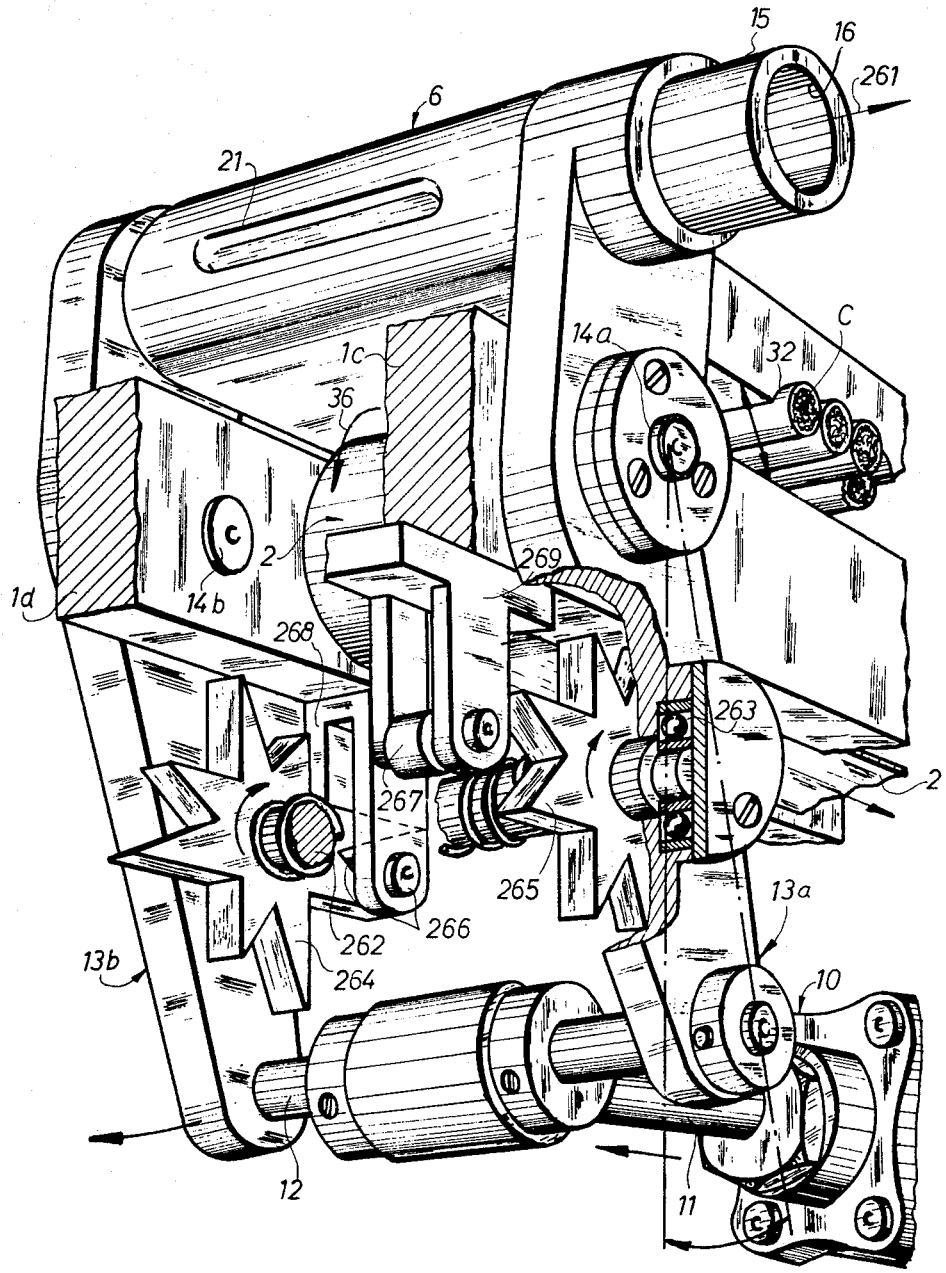
FIG. 38 is a perspective view of a shifting assembly which is utilized for staggering superimposed rows of elongated articles through distances equal to one-half diameter of an article, this shifting assembly being associated with a pneumatic lifter of the type shown in FIGS. 1 to 4.

The lower arms of the levers 13a, 13b support a shaft 262 whose ends are mounted in suitable antifriction bearings 263 (only one shown in FIG. 38). This shaft is located between the cross spindle 12 and the pivot members 14a, 14b and carries two specially configurated toothed wheels 264, 265. The teeth of the wheel 264 are not uniform whereas the wheel 265 comprises a series of uniform teeth. Thus, the spaces between the teeth of the wheel 264 are of different depth. The teeth of the wheels 264, 265 respectively cooperate with stop rollers 266, 267 which are mounted on brackets 268, 269, the latter secured to and extending downwardly from the frame members 1d, 1c, respectively.

The transferring arrangement associated with the lifter 6 of FIGS. 38 to 43 comprises a plunger 135 and a supporting blade 150 of the type shown in FIGS. 27 to 29. The thickness of the plunger 135 equals or approximates one-half diameter of a cigarette C. It will be noted (see FIG. 4) that the lifter 6 comprises a stack of lifting plates similar to the plates 51', 51a' shown in FIG. 22.

Figure 39:
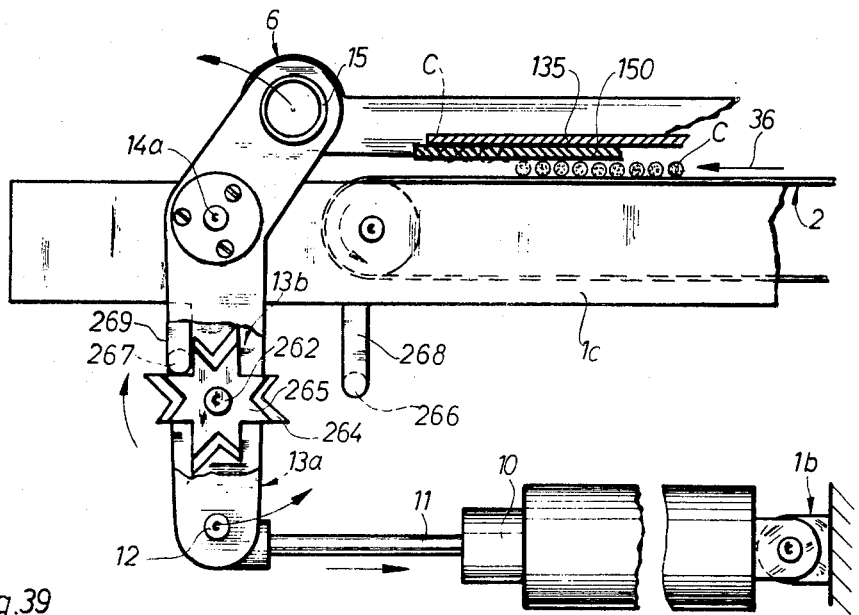
FIG. 39 is a side elevational view of the shifting assembly in a position in which it permits the lifter to descend toward and to collect articles from the upper run of an endless belt.

The shifting assembly of FIGS. 38 to 43 operates as follows:

The belt 2 advances the cigarettes in the direction indicated by the arrow 36 so that the layer of slightly spaced cigarettes moves beneath and toward the forward end of the lifter 6. The lifter is assumed to be in its lowered position in which the recesses 32 are adjacent to the upper side of the belt 2. Such movement of the lifter is brought about by the pneumatic cylinder 10 which transmits motion to the cross spindle 12 through a piston rod 11 in a manner as described in connection with FIGS. 2 to 4. When the lifter 6 is lowered toward the upper run of the belt 2, the levers 13a, 13b assume positions illustrated in FIG. 39, i.e. the piston rod 11 was expelled from the cylinder 10 and has turned the lower arms of the levers 13a, 13b in an anticlockwise direction. In the position of FIG. 39, the lifter 6 collects a row of cigarettes C each of which is retained in one of the recesses 32. The cylinder 10 is thereupon actuated in a sense to withdraw the piston rod 11 and to rock the levers 13a, 13b to the position of FIG. 40 in which the lifter is raised above and away from the upper run of the belt 2 so as to move the row of cigarettes retained in the recesses 32 into alignment with the plunger 135. When the levers 13a, 13b are rocked from the position of FIG. 39 to the position of FIG. 40, the shaft 262 moves the wheel 264 against the roller 266 so that the roller 266 enters one of the deeper spaces between the teeth of this wheel and permits the lifter 6 to assume an extreme left-hand position in which the piston rod 11 is fully retracted into the cylinder 10. In other words, the axis of the shaft 262 is now very close to the axis of the roller 266 because the latter has entered a deeper tooth space of the wheel 264.

In the next step, the plunger 135 is caused to move against the row of cigarettes retained in the recesses 32 and, in cooperation with the supporting blade 150, transfers the row of cigarettes into the tray 5 in a manner as described in connection with FIGS. 27 to 29. When in the above-described extreme left-hand position, the lifter 6 cooperates with the plunger 135 to transfer and deposit the row of cigarettes Cb into the tray 5 as shown in FIG. 44.

The cylinder 10 is then operated in a sense to expel the piston rod 11 and to rock the levers 13a, 13b back to the position shown in FIG. 39. During such lowering of the lifter 6, the wheel 265 moves into engagement with and is turned by the cooperating stop roller 267 so as to turn the wheel 264 because the wheels 264, 265 are keyed or otherwise non-rotatably secured to the shaft 262. When the roller 267 is fully received in a space defined by the uniform teeth of the wheel 265, the forward stroke of the piston rod 11 is completed and the lifter 6 is now in a position in which it may collect a second row of cigarettes C. The angular displacement of the shaft 262 during engagement of the roller 267 with the wheel 265 is such that a shallower tooth space of the wheel 264 is now aligned with the stop roller 266 so that, when the cylinder 10 is operated to raise the lifter into alignment with the plunger 135, the roller 266 enters a shallower tooth space of the wheel 264 and arrests the arms 13a, 13b in a position (FIG. 41) in which the lifter 6 is located slightly to the right with respect to the position of FIG. 40. The difference between the positions assumed by the lifter 6 in FIGS. 40 and 41 equals one-half diameter of a cigarette C so that, when the plunger 135 thereupon transfers the next row of cigarettes Ca onto the cigarettes Cb in the tray 5 of FIG. 44, the leftmost cigarette is caught by the plunger and the cigarettes Ca are automatically deposited in the gaps 260 defined by the cigarettes Cb. Of course, it is assumed that the tray 5 was caused to descend through a distance somewhat less than the diameter of a cigarette while the lifter 6 has collected the row of cigarettes Ca.

Figure 40:
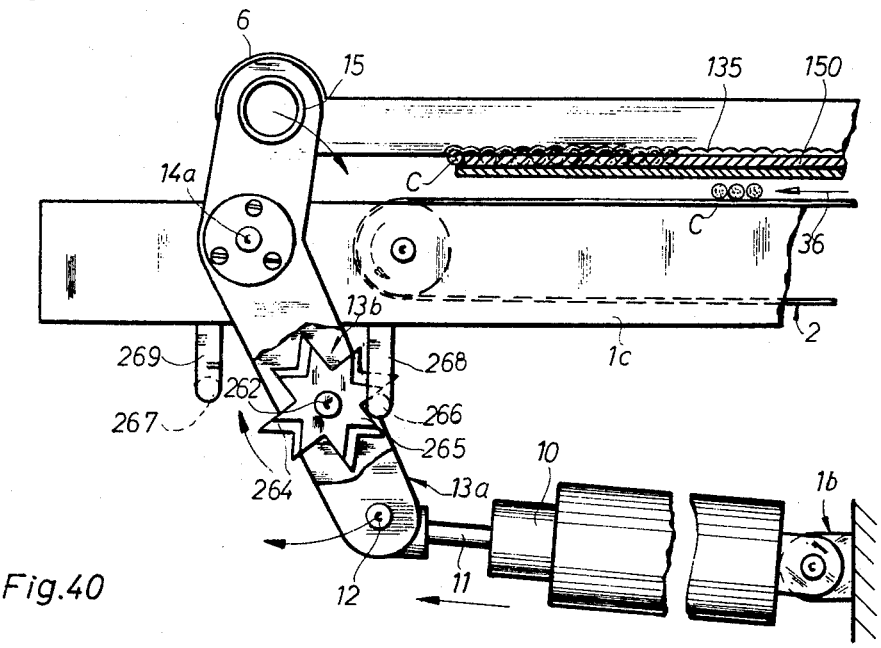
FIG. 40 illustrates the shifting assembly in a position in which it maintains the lifter in an extreme left-hand position.

The operation is then continued in the same way, i.e., the piston rod 11 is expelled after the row of cigarettes Ca is deposited on the cigarettes Cb so that the stationary roller 267 again turns the wheel 265 in order to align a deeper groove of the wheel 264 with the roller 266 whereby, at the time the lifter 6 is raised to move a third row of cigarettes Cc into alignment with the plunger 135, the lifter is again permitted to assume its extreme left-hand position of FIG. 40 in which the cigarettes Cc are deposited into gaps defined by the cigarettes Ca, and so forth.

Figure 48:
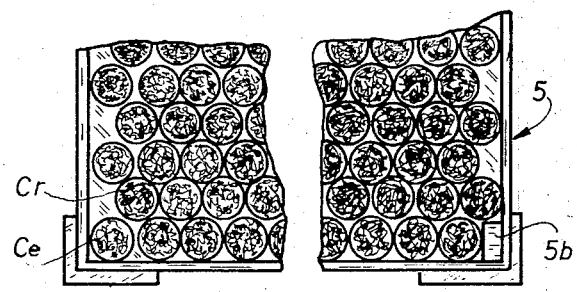
FIG. 48 is a fragmentary front elevational view of a storing device which receives rows of articles from the mechanical lifter of FIGS. 45 and 46.

FIGS. 42 and 43 illustrate this feature of the shifting assembly shown in FIGS. 38 to 41. When the lifter 6 assumes the left-hand end position of FIG. 40, the left hand edge portion of the plunger 135 cannot engage the leftmost cigarette C so that this cigarette remains in the respective recess 32. However, the right-hand edge portion of the plunger 135 always transfers the rightmost cigarette so that this cigarette assumes the position occupied in FIG. 44 by the cigarette Ca'. In the position of the lifter which is shown in FIG. 43 and which corresponds to the position of FIG. 41, the plunger 135 transfers the leftmost cigarette C and deposits it in the tray 5 of FIG. 44 in the position occupied by the leftmost cigarette of the row Ca. Thus, the plunger 135 delivers into the tray 5, rows which contain alternating odd and even numbers of cigarettes. If desired, all the rows may contain the same number of cigarettes deposited in quincunx form provided the width of the plunger 135 is reduced by one-half of the diameter of a cigarette. Thus, the leftmost cigarettes and the rightmost cigarettes are left alternatively on the lifter 6 to be deposited in the form as shown in FIG. 48.

Figure 45:
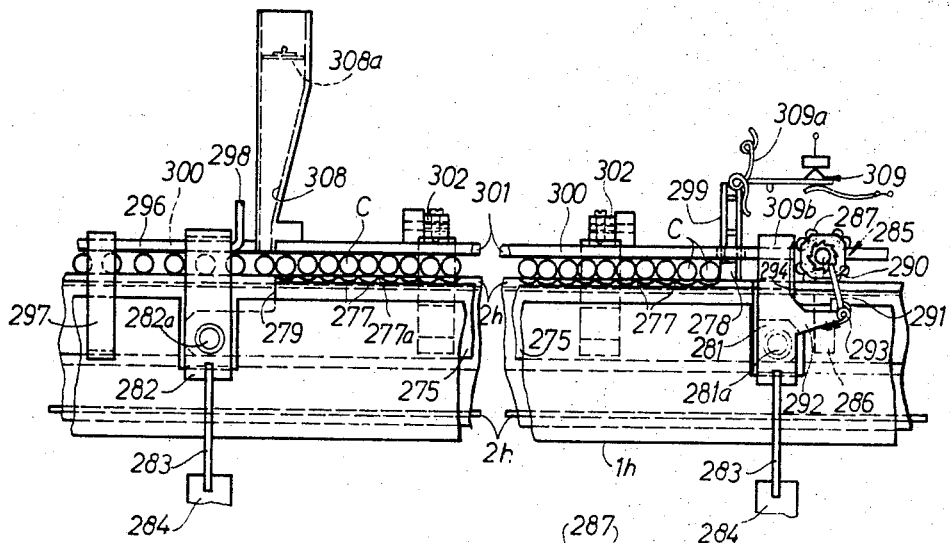
FIG. 45 is a fragmentary side elevational view of a different shifting assembly which is utilized for transferring rows of articles assembled by a mechanical lifter.
Figure 46:
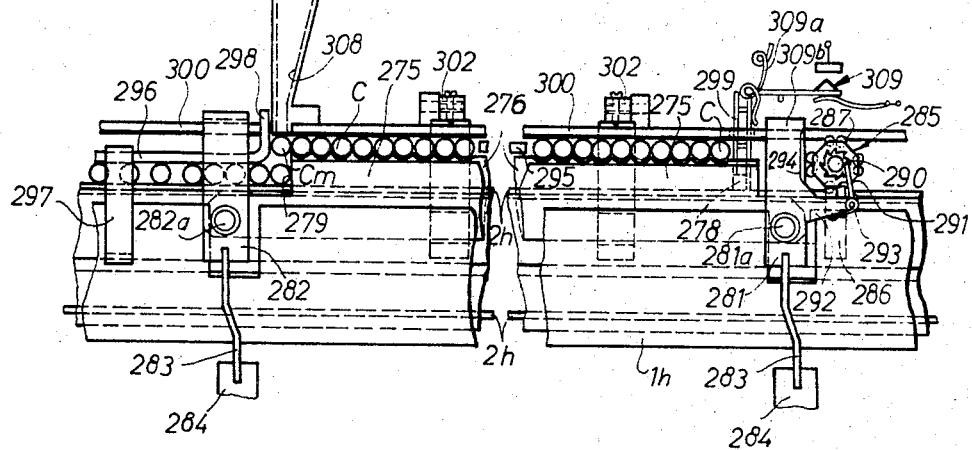
FIG. 46 illustrates the shifting assembly of FIG. 45 in a different position.

FIGS. 45 and 46 illustrate a mechanical lifter which comprises two spaced elongated lifting rails or bars 275, 276, and a shifting assembly for staggering the rows of cigarettes C collected in holding means here shown as spacer elements 277a, with transversely extending parallel recesses or pockets 277 provided in the upper end faces of the rails 275, 276. The rails 275, 276 are outwardly adjacent to the lateral edge portions of the upper run of a conveyer belt 2h and, in the lowered position of FIG. 45, the recesses 277 are located at a level below the layer of cigarettes C supported by the upper run of the belt 2h. It is assumed that the end portions of the cigarettes extend beyond the lateral edge portions of the belt in the same manner as shown in FIG. 4 and that the rails 275, 276 are located below the end portions of the cigarettes. As shown in the left-hand portion of FIG. 45 or 46, the cigarettes advancing toward the rails 275, 276 are normally spaced from each other and their spacing may but need not be regular.

Adjacent to the foremost pair of recesses 277 in the rails 275, 276, there is provided a switch stop member 278 which extends transversely across the upper run of the belt 2h and which arrests the foremost cigarette C in order to form a row of cigarettes the predetermined pressure of which actuates the stop switch member 278 thereby electrically controlling the lifting of the row by the rails 275, 276 preparatory to a transferring step in which the row of cigarettes is deposited in a tray or another storing device.

Upstream of the member 278, there is provided a second stop member in the form of a shoulder 279, and the mutual distance between the stop members 278, 279 equals or is less than the length of a row of cigarettes which is formed in the assembly of FIGS. 45 and 46. The cigarettes piling up upstream of the stop member 278 form a row which ultimately reaches and which may even extend beyond the stop member 279 (see FIG. 46).

In the illustrated embodiment, the stop member 279 is defined by the rear end faces of the lifter rails 275, 276 but it is equally possible to provide a separate rod, bar or strip which replaces the member 279 and which is detachably or permanently secured to the rails. When the rails 275, 276 are lifted and assume the position of FIG. 46, the stop member 279 prevents the cigarettes from entering the collecting station.

The rails 275, 276 are mounted on spaced pillars 281, 282 by means of rods 281a, 282a, which are movable up and down by reciprocating means 284. For example, the length of strokes performed by the pillars 281, 282 may be in the range of 10 mm. to make sure that the row of cigarettes formed along the upper run of the belt 2h and extending from the stop member 278 to the stop member 279 may be lifted sufficiently for unimpeded transfer into a storing device. The lower ends of the pillars 281, 282 are fastened to resiliently deformable carriers in the form of leaf springs 283 which are mounted on reciprocating means 284 of any known design. The resiliency of the springs 283 is sufficient to permit longitudinal displacements of the rails 275, 276 through distances equal to one-half diameter of a cigarette C. The actual shifting means for the rails 275, 276 comprises a specially constructed cam 285 of octagonal shape which is turnably mounted at the upper end of a bracket 286. The lower end of this bracket is secured to a frame member 1h. Each corner of the octagonal cam carries a roller 287 and the arrangement is such that the rollers 287 are disposed in pairs each of which includes two closely adjacent rollers. Consequently, the distance of the line connecting the axes of any pair of closely adjacent rollers 287 from the center of the cam 285 is greater than the distance between the center of the cam and the shortest line connecting the axes of the further adjacent rollers. This is shown in FIG. 47 wherein the distance 288 exceeds the distance 289 by one-half diameter of a cigarette C.

Fixedly attached to the cam 285 is a ratchet wheel 290 which cooperates with a pawl 291, the latter mounted on a forwardly extending arm 292 forming part of the pillar 281 and biased by a torsion spring 293 so as to remain in engagement with the ratchet wheel 290. The front end face 294 of the pillar 281 constitutes a guide surface for the cam 286 and always engages two rollers 287. The end face 294 is located in a vertical plane and is always parallel with a line connecting the axes of the rollers 287 which momentarily engage the pillar 281.

The lifter rails 275, 276 are adapted to cooperate with a transferring arrangement including a horizontally reciprocable plunger 295 a portion of which is shown in FIG. 46 at the level of cigarettes C and whose function is to move the cigarettes in the longitudinal direction of the aligned recesses 277 so as to deliver the row of cigarettes into a storing device. When the reciprocating means 284 is actuated in a direction to lift the rails 275, 276, these rails engage the respective end portions of the cigarettes and lift the entire row of cigarettes off the upper run of the belt 2h so that each cigarette rests in a pair or transversely aligned recesses 277. The row of cigarettes supported by the rails 275, 276 is now aligned with the plunger 295 and the latter is caused to perform a forward stroke so as to deliver the cigarettes into a storing device. The length of the plunger 295, as viewed in the longitudinal direction of the belt 2h, preferably exceeds the distance between the stop members 278, 279 for the purpose to be described in connection with FIG. 48. When the row of cigarettes extending between the stop members 278, 279 is lifted from the position of FIG. 45 to the position of FIG. 46, the foremost cigarette C advances along an upwardly extending barrier 299 of the forward stop member 278. As the pillar 281 moves upwardly, it entrains the pawl 291 which turns the cam 285 in an anticlockwise direction, as viewed in FIGS. 45 to 47, so that the distance between the front face 294 and the center of the cam now equals the length of the line 288 shown in FIG. 47 which means that the rails 275, 276 are lifted and that each thereof simultaneously assumes an extreme left-hand position. When the rails thereupon descend to the level of FIG. 45, the pawl 291 merely rides over the teeth of the ratchet wheel 290 without rotating the cam 285 so that the angular position of this cam remains unchanged, i.e., it corresponds to the position shown in FIG. 46. However, when the rails 275, 276 are lifted for a second time, the pawl 291 turns the cam 285 through an angle necessary to move the cam to the position of FIG. 45 in which the distance between the front end face 294 of the pillar 281 and the center of the cam equals the length of the line 289 shown in FIG. 47. The rails 275, 276 are now raised and each thereof simultaneously assumes an extreme right-hand position. The shifting of the rails is then repeated in response to intermittent turning of the cam 285 whenever the pillar 281 moves in upward direction.

Figure 47:
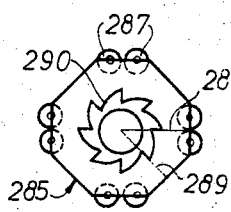
FIG. 47 is an enlarged side elevational view of a cam which forms part of the shifting assembly shown in FIGS. 45 and 46.

The assembly of FIGS. 45 and 47 further comprises a pair of horizontal guide rods 296 which are located at a level above the cigarettes supported by the belt 2h and which are fixed to an upwardly extending bracket 297 carried by the frame member 1h. The forward ends of the rods 296 are bent upwardly and form a barrier 298 whose distance from the barrier 299 equals the maximum possible length of a row of cigarettes collected on the rails 275, 276. Of course, the plunger 295 is reciprocable with requisite degree of side clearance between the barriers 298, 299. It will be noted that the rear pillar 282 is reciprocable toward and away from the barrier 298.

The pillars 281, 282 support a cover plate 300 which is located above the recesses 277 and which compels the cigarettes entering the tunnel above the upper run of the belt 2h to form a single row. Rearwardly of the cover plate 300, as viewed in FIGS. 45 and 46, the pillars 281, 282 support a guide plate 301 which assists the plunger 295 in transferring a row of cigarettes into the storing device. The guide plate 301 is also disposed at a level above the row of cigarettes on the belt 2h and this guide plate is lifted with the rails 275, 276 and carried by hinges 302 so that its position with respect to the rails remains unchanged at all times.

If the row of cigarettes to be raised by the rails 275, 276 should consist of spaced cigarettes or of several spaced groups of cigarettes (i.e., of groups comprising seven cigarettes as shown in FIG. 13), the lifter rails 275, 276 may be provided with the appropriate spacer elements 277a which permit the rails 275, 276 to lift the cigarettes which provide the required spacing and therefore the cigarettes may not be in direct contact with each other.

Figure 49:
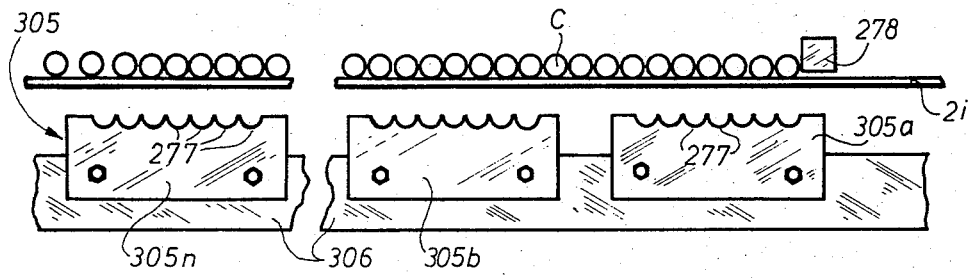
FIG. 49 is a fragmentary side elevational view of a modified mechanical lifter which is utilized for forming rows of cigarettes consisting of several groups.

FIG. 49 illustrates a slight modification of the structure shown in FIGS. 45 and 46. Each lifter rail 305 consists of several spaced sections 305a, 305b ... 305n which are bolted to a supporting bar 306. The sections 305a, 305b ... 305n are provided with predetermined numbers of recesses 277 so that each thereof may lift a corresponding number of cigarettes off the upper run of a belt 2i. A lifter utilizing two rails 305 is especially suited for use in connection with an assembly which transfers cigarettes directly into boxes 73 of the type shown in FIG. 13.

The assembly shown in FIGS. 45 and 46 further comprises a suction duct 308 which accommodates a butterfly valve 308a and whose upper end is connected to a suitable vacuum generating device, not shown.

The purpose of the duct 308 is to lift a single cigarette as the leftmost cigarette C of each row. Thus, when the rails 275, 276 are raised and assume their extreme left-hand positions of FIG. 46, the row of cigarettes that is delivered by the pusher 295 is deposited in the leftmost position in the tray 5 as shown at Ce in FIG. 48. During the next upward stroke of the rails 275, 276 the cam 285 permits the springs 283 to swing the rails 275, 276 to the rightmost position. The row of cigarettes delivered by the pusher 295 is now deposited in the rightmost position in the tray 5 as shown at Cr in FIG. 48, and so on alternately. To avoid spreading of the lowermost layer a block 5b may be placed in a suitable corner of the tray 5.

Where in the manufacture of cigarettes the products are very sensitive, e.g. due to short cut tobacco, low density, friction sensitive paper, the pneumatic lifter may be selected instead of the mechanically operated lifter. The advantage of the pneumatic lifter is that it forms rows of articles without generating friction between the articles and the conveyer. Thus, while the lifter 6 sucks cigarettes from the moving belt, the rails 275, 276 must raise a row of cigarettes which is held against movement with the belt 2h by the stop member 278 so that at least some friction develops between the belt and the cigarettes piling up upstream of the member 278 when the rails 275, 276 are in positions shown in FIG. 45. Of course, the belt may be moved intermittently but such intermittent operation results in reduced output of the apparatus.

Figure 56:
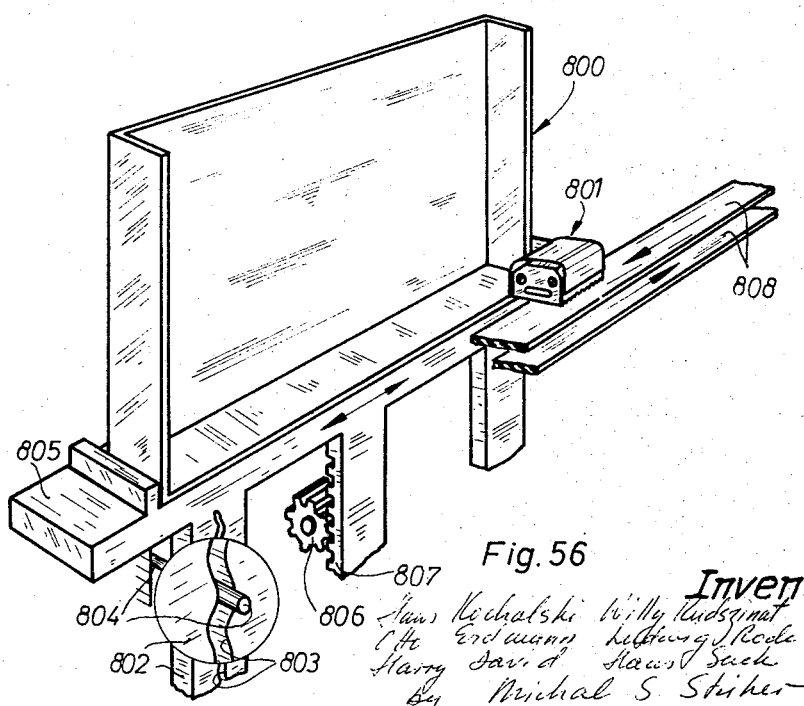
FIG. 56 shows the shifting assembly comprising means for reciprocating the storing device.

FIG. 56 illustrates a further modification of our invention wherein the shifting assembly comprises means for reciprocating a tray 800 with respect to a stationary lifter 801. This reciprocating means comprises a cam 802 defining a meandering or undulate cam slot 803 which receives a fixed follower pin or roller 804. The cam 802 is secured to a platform 805 which may be lifted or lowered by a pinion 806 which meshes with a rack 807 so that the tray 800 is compelled to move back and forth in the longitudinal direction of the conveyer belt 808 and to alternately assume extreme left-hand and right-hand positons in which it receives consecutive rows of cigarettes from the lifter 801 whereby a new row of cigarettes is automatically deposited in gaps defined by the uppermost row of cigarettes already contained in the tray. Of course, the shifting assembly of FIG. 56 may be modified by securing the follower 804 to the platform 805 and by fixing the cam 802 to the frame of the apparatus.

*The transferring arrangement*

Figure 50:
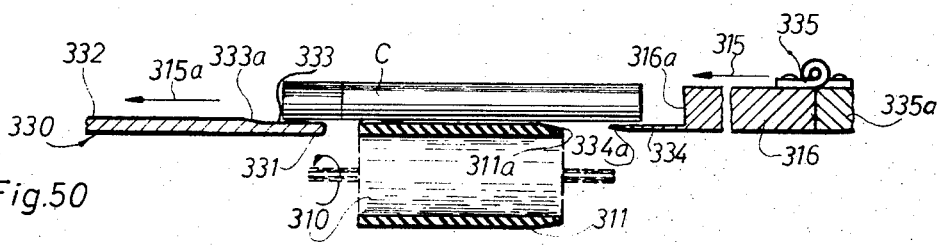
FIG. 50 is a somewhat schematic transverse sectional view of an arrangement which is utilized for transferring a row of group of coplanar parallel elongated stick-shaped articles from the endless belt of a conveyer onto and beyond a stationary supporting surface, the arrangement being shown in its starting or inactive position.
Figure 51:
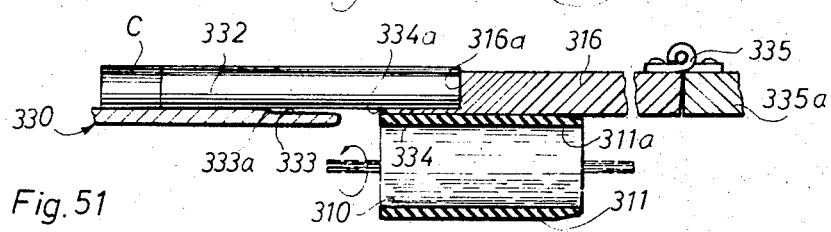
FIG. 51 illustrates the arrangement of FIG. 50 in an intermediate position in which the row of articles is partially transferred onto the supporting surface.

FIGS. 50 and 51 illustrate a transfer station including an arrangement which is utilized for lifting a row of filter tip cigarettes C above and away from the upper run of an endless belt 311 and for thereupon transferring the cigarettes onto and beyond the supporting surface 332 of a stationary supporting member 330. The belt 311 forms part of a conveyer and is trained around reversing rollers 310 (only one shown in FIGS. 50 and 51). The row of cigarettes C is supported by and advances with the upper run of the belt 311 in such a manner that the end portions of each cigarette extend beyond the lateral edge portions of the belt. For example, the belt 311 may move a layer of cigarettes from the drum 4 of FIG. 1.

Before being transferred onto the supporting surface 332, the row of cigarettes C is lifted above and away from the upper run of the belt 311 and, to that end, the arrangement of FIGS. 50 and 51 comprises a combined supporting and lifting means in the form of a reciprocable blade 334 which is located at a level immediately below the row of cigarettes C and which is rigidly secured to or is integral with a transferring means in the form of a pusher plate or plunger 316, the latter having a front end face 316a which may engage the right-hand ends of the cigarettes C in order to move the cigarettes in the longitudinal direction thereof, that is, at right angles to the direction in which the belt 311 advances.

The surface 332 of the supporting member 330 is located at a level slightly above the upper run of the belt 311, and the member 330 comprises a rightward extension or ledge 331 whose upper side 333 is located at a level slightly below the level of the surface 332 and also below the level of the upper run of the belt 311. Thus, the left-hand end portions of the cigarettes C may be advanced above the ledge 331 without coming into contact with the upper side 333. When the plunger 316 is moved in the direction indicated in FIG. 50 by the arrow 315, the upwardly bevelled or splayed edge portion 334a of the blade 334 is caused to move toward the belt 311 and slides along the downwardly bevelled lateral edge portion 311a of this belt so as to permit the blade 334 to enter between the upper run of the belt and the row of cigarettes C in order to lift the cigarettes from the belt. As the leftward movement of the plunger 316 continues, the end face 316a comes into abutment with the cigarettes C and moves each cigarette in the longitudinal direction thereof so that the left-hand end portions of the cigarettes slide along the upwardly sloping intermediate portion 333a of the supporting member 330 and are caused to advance in the direction indicated by the arrow 315a so as to come to rest on the surface 332.

In order to make sure that the edge portion 334a of the blade 334 may slide along the edge portion 311a of the belt 311, the blade 334 and the plunger 316 are preferably pivotable about a horizontal axis defined by the pintle of a hinge 335 which connects the plunger to a reciprocable holder 335a. The latter may be reciprocated by one or more pneumatic cylinders or the like (not shown), e.g. by the cylinder 145 of FIG. 29.

It will be noted that the arrangement of FIGS. 50 and 51 comprises a stationary lifting means 333a, a movable lifting means 334, and a moving or transferring means 316, these three means cooperating to move the row of cigarettes C onto the surface 332 of the supporting member 330. Of course, the ledge 331 and the stationary lifting means 333a need not be integral with the supporting member 330. During transfer, the friction between the cigarettes C and the belt 311 is reduced to a negligible value because the stationary lifting means 333a is immediately adjacent to the left-hand ends of the cigarettes and because the cigarettes are moved in directions indicated by the arrows 315, 315a only after the entire row of cigarettes is actually lifted above the belt 311. It should be noted (FIG. 50), that the upper side of the blade 334 need not engage the cigarettes before the plunger 316 is pivoted about the hinge 335 by engagement between the edge portions 311a, 334a.

The apparatus of FIGS. 50 and 51 utilizes a purely mechanical lifting means 334, 333a which replaced the pneumatic lifter 6 of FIG. 1 or the combined mechanical and pneumatic lifting means of FIGS. 45 and 46.

Figure 52:
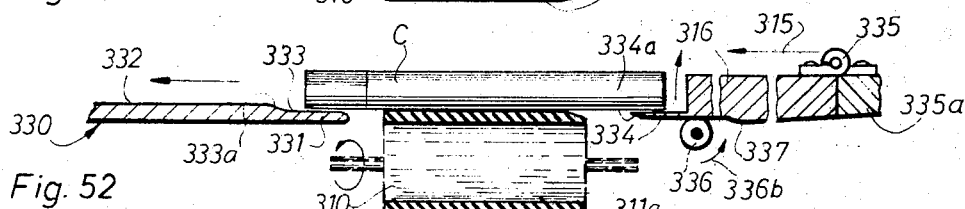
FIG. 52 is a transverse sectional view of a slightly modified arrangement in idle position in which a row of articles is still supported by the conveyer.
Figure 53:
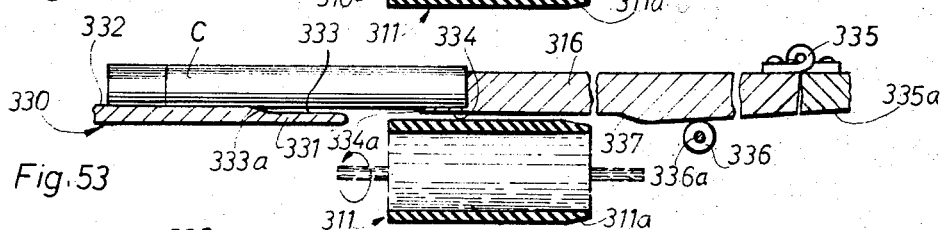
FIG. 53 illustrates the arrangement of FIG. 52 in an intermediate position in which the articles are already lifted off the conveyer and are caused to slide onto the supporting surface.

FIGS. 52 and 53 illustrate a slightly modified arrangement which differentiates from the arrangement of FIGS. 50 and 51 in that the blade 334 need not engage the belt 311 but may be pivoted into engagement with the cigarettes C even before it reaches the lateral edge portion 311a. The underside of the plunger 316 is provided with a cam lobe 337 cooperating with a roller 336 which is turnable about a horizontal shaft 336a located between the cam 337 and the belt 311. The underside of the blade 334 travels along and rotates the roller 336 in the direction indicated by the arrow 336b as soon as the plunger 316 starts to advance in the direction indicated by the arrow 315. Immediately before the edge portion 334a reaches the edge portion 311a, the cam lobe 337 engages the roller 336 and pivots the plunger 316 about the hinge 335 so as to lift the blade 334 and to thereby lift the right-hand end portions of the cigarettes C off the belt 311. In this embodiment, the provision of downwardly bevelled lateral edge portion 311a on the belt 311 is purely a precautionary measure. The cam 337 slopes gradually toward the hinge 335 so as to hold the blade 334 and the plunger 316 above the upper run of the belt 311 while the row of cigarettes C is being transferred onto the surface 332. The rise and fall of the blade 334 are synchronized with the forward and rearward strokes of the reciprocable holder 335a.

Figure 54:
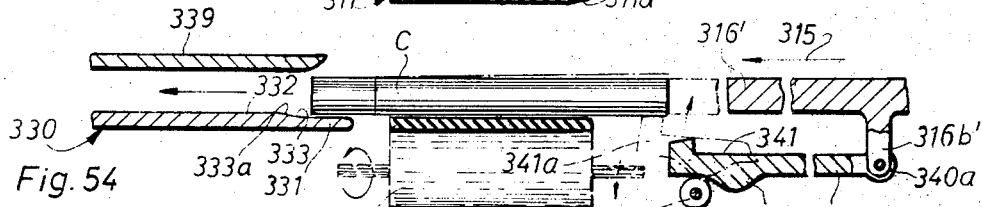
FIG. 54 is a transverse section through a different arrangement utilizing a reciprocable lifting element which is pivotable with respect to a plunger and which advances the articles through a tunnel in which the articles are held against tilting.
Figure 55:
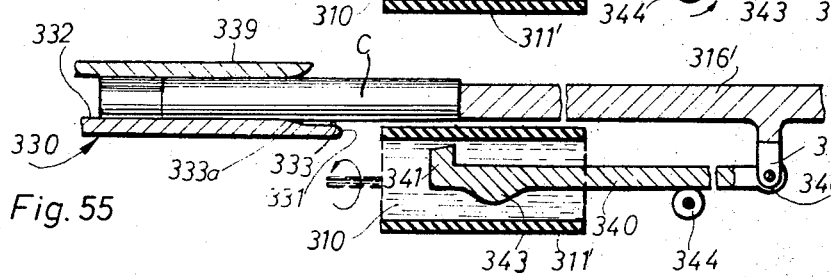
FIG. 55 illustrates the arrangement of FIG. 54 in an intermediate position in which the articles are partially transferred into the tunnel.

The arrangement of FIGS. 54 and 55 utilizes a movable lifting means in the form of a swingable blade or flap 340 which is pivotally secured to a modified plunger 316' by means of a horizontal pin 340a, the latter mounted in a bifurcated bracket 316b' forming part of and extending downwardly from the plunger 316'. The blade 340 rests on and is reciprocable along a roller 344, and the underside of this blade is provided with a cam lobe 343 adapted to pivot the blade about the pin 340a so as to move the forwardly and downwardly inclined front end portion or nose 341 of the blade into lifting engagement with the right-hand end portions of the cigarettes C (see the phantom-line portion 341a of the nose 341 in FIG. 54) and to raise the cigarettes above the belt 311' as soon as the cam lobe 343 engages the roller 344 in response to forward movement of the plunger 316' (arrow 315). Once the cigarettes C are moved onto and beyond the stationary lifting means 333a, the nose 341 descends to the level shown in FIG. 55 and the blade 340 is free to enter the space between the upper and lower runs of the belt 311'.

The stationary supporting member 330 cooperates with a fixed guide plate 339 which is located above the supporting surface 332 and which defines with the member 330 a tunnel whose height equals or slightly exceeds the diameter of a cigarette C. The purpose of the guide plate 339 is to maintain the cigarettes in alignment during transfer onto the supporting surface 332. Once the row of cigarettes enters the tunnel between the members 330, 339, the trailing ends of the cigarettes remain spaced from the belt 311' so that the right-hand end portions of the cigarettes need not be supported and the plunger 316' merely continues to advance in the direction indicated by the arrow 315 in order to clear the upper run of the conveyer 311' preparatory to entry of the next row of cigarettes into the transfer station.

It is assumed that the belt 311' moves continuously, i.e., that the movable blade 340 lifts the cigarettes while the belt 311' continues to travel around the rollers 310. Therefore, the arrangement of FIGS. 54 and 55 must be provided with suitable arresting means which prevents the next row of cigarettes from entering the transfer station before the row shown in FIGS. 54 and 55 is transferred into the passage defined by the members 330, 339. This is done by one side edge portion of the plunger 316' during its operation, e.g., while the cigarettes C shown in FIG. 54 or 55 are being transferred onto the supporting surface 332. This one side edge portion of the plunger 316' performs the dual function of arresting means for the cigarettes C and of means for forming a new row or group of closely adjacent cigarettes C which are free to enter the transfer station as soon as the plunger 316' completes its return stroke. A switch stop means as described in FIGS. 45 and 46 may be provided above the upper run of the belt 311' downstream of the plunger 316' to prevent the foremost cigarette C or C' from advancing beyond the range of the plunger 316'. Thus, when the plunger 316' is retracted to its rear position, the belt 311' is free to advance the cigarettes C' toward the previously mentioned switch stop means.

FIGS. 57 to 63 illustrate a transfer station which includes an arrangement utilizing a pneumatic lifter 401 which replaces the lifting means 333a, 334 or 333a, 340 of FIGS. 50 to 56. The lifter 401 may correspond to any of the previously described pneumatic lifters. The underside of this lifter is provided with a series of holding means in the form of pockets or recesses 403 each of which may receive a cigarette C so that the cigarettes retained by the lifter 401 form a row which is spaced from the upper run of the endless belt 2e as shown in FIG. 27. The lifter 401 is provided with suction slots 404 which are connected with a vacuum generating device, not shown. In FIG. 57, the row of cigarettes C is already lifted off the upper run of the belt 411 and each cigarette is retained in a separate recess 403 by suction generated in the respective slot 404, whereby the gap formed between the upper run of the belt 411 and the row of cigarettes C is of sufficient height to accommodate certain component parts of the means which transfers the cigarettes into a storing device here shown as a tray 415.

The moving means of the arrangement shown in FIGS. 57–63 comprises a plate-like plunger 423 which cooperates with a reciprocable supporting means in the form of a blade 421, the latter connected to or integral with a holder 420 which is reciprocable by one or more pneumatic cylinders in a manner shown, for example, in FIG. 29. The blade 421 is provided with a slot 422 which is parallel with the longitudinal direction of the cigarettes C and which receives the stem of a screw 424 having a head located at the underside of the blade 421 and driven into a bore provided in the plunger 423 so as to couple the plunger to the blade but to permit limited movements of the blade with respect to the plunger.

The blade 421 is reciprocable between a pair of upstanding brackets 427 (only one shown in each of FIGS. 57 and 58) which are secured to a frame member $1m$ and each of which carries a clamping element in the form of a leaf spring 426. These clamping elements engage and bias the respective lateral end faces 425 of the plunger 423 so as to normally hold the plunger against movement with the blade 421 excepting, of course, when the stem of the screw 424 reaches the front end or the rear end of the slot 422. It will be readily understood that the blade 421 may be provided with two or more slots 422 and that each slot may receive a coupling screw 424.

The tray 415 is located to the left of the lifter 401, as viewed in FIGS. 60 to 63, and its side turned toward the belt 411 is open so that the row of cigarettes C held in the recesses 403 may be transferred onto the bottom wall 415a of the tray or onto the uppermost row of cigarettes $C_1$ already deposited in the tray. It is assumed in FIGS. 60 to 63 that the tray contains a single row of cigarettes $C_1$ and that the row of cigarettes C is about to be deposited on the cigarettes $C_1$. The manner in which the tray 415 may be moved with respect to the belt 411 is described in connection with FIG. 1.

The arrangement of FIGS. 57 to 63 operates as follows:

As explained hereinabove, the cigarettes C shown in FIG. 57 are held by suction so as to remain in the respective recesses 403 because the pressure prevailing in the slots 404 is less than atmospheric pressure. The blade 421 and the plunger 423 are held in their retracted positions and the stem of the coupling screw 424 engages the front end wall 422b in the slot 422. In the first step, the holder 420 is moved in a direction to the left and advances the blade 421 toward the lifter 401. The plunger 423 cannot participate in this movement because it is biased by the clamping elements 426 so that the blade 421 moves with respect to and entrains the front end wall 422b in its slot 422 away from the coupling screw 424. At the time the blade 421 reaches the position of FIG. 59, the stem of the screw 424 already engages the rear end wall 422a in the slot 422 and entrains the plunger 423 against the bias of the clamping elements 426 so that the front end faces 423a of the plunger engages the rear ends of the cigarettes C. The length of the slot 422 is selected in such a way that the portion of the blade 421 adapted to project beyond the front end face 423a is longer than one-half the length of a cigarette C in order to make sure that the slots 404 of the lifter 401 may be sealed from the vacuum generating device at the time or even before the end face 423a reaches the right-hand ends of the cigarettes C. The cigarettes are now supported only by the blade 421 and share the leftward movement of the holder 420 under the action of the plunger 423 which latter is now compelled to follow the blade because the stem of the screw 424 engages the rear end wall 422a in the slot 422. The blade 421 and the front end face 423a of the plunger 423 advance the row of cigarettes C into and beyond the position of FIG. 60 until the leading ends of the cigarettes move into abutment with the upstanding side wall 415b of the tray 415 (FIG. 61). The forward stroke of the holder 420 is now completed and the cylinder connected with this holder immediately begins to withdraw the blade 421 to and beyond the position of FIG. 62. Of course, the plunger 423 cannot participate immediately in such return movement of the blade 421 because it is biased by the clamping elements 426, and it begins to return to the position of FIG. 57 only when the blade 421 already reaches the position of FIG. 62 in which the stem of the screw 424 abuts against the front end wall 422b in the slot 422. The blade 421 now entrains the plunger 423 back to the position of FIG. 57 and the arrangement is ready to transfer a new row of cigarettes into the tray 415. As explained in connection with FIG. 1 and as shown in FIGS. 27 to 29, the tray 415 is mounted on a vertically reciprocable platform which causes it to descend in a fully automatic way as soon as the arrangement transfers a new row of cigarettes. The length of intermittent downward movements performed by the tray 415 corresponds to or is somewhat less than the diameter of a cigarette because the cigarettes are preferably stacked in staggered relation (see FIG. 70).

An important advantage of the clamping elements 426 is that they prevent any movements of cigarettes C away from the side wall 415b in response to withdrawal of the blade 421. As shown in FIG. 61, the front end face of the plunger 423 is fully withdrawn from contact with the cigarettes to make sure that friction between the upper side of the blade and the cigarettes C cannot bring about any undesirable displacement of cigarettes C with respect to the cigarettes $C_1$.

FIG. 63 illustrates the plunger 423 in an intermediate position of retraction in which it is compelled to share the rearward movement of the blade 421. The row of cigarettes C is already deposited on the cigarettes $C_1$ of the first row, and the tray 415 has descended through a distance approximating the diameter of a cigarette C or $C_1$ so as to be in requisite position to receive the third row.

It will be readily understood that the arrangement of FIGS. 57 to 63 may be modified in a sense that the blade 421 will lift a row of cigarettes directly off the upper run of the belt 411, i.e. that the lifter 401 may be dispensed with. In such instances, the blade 421 is preferably provided with suitable pivoting means (such as the roller 336 and the cam lobe 337 of FIG. 52) which cause it to rise and fall in rhythm with the forward stroke of the plunger 423.

Figure 69:
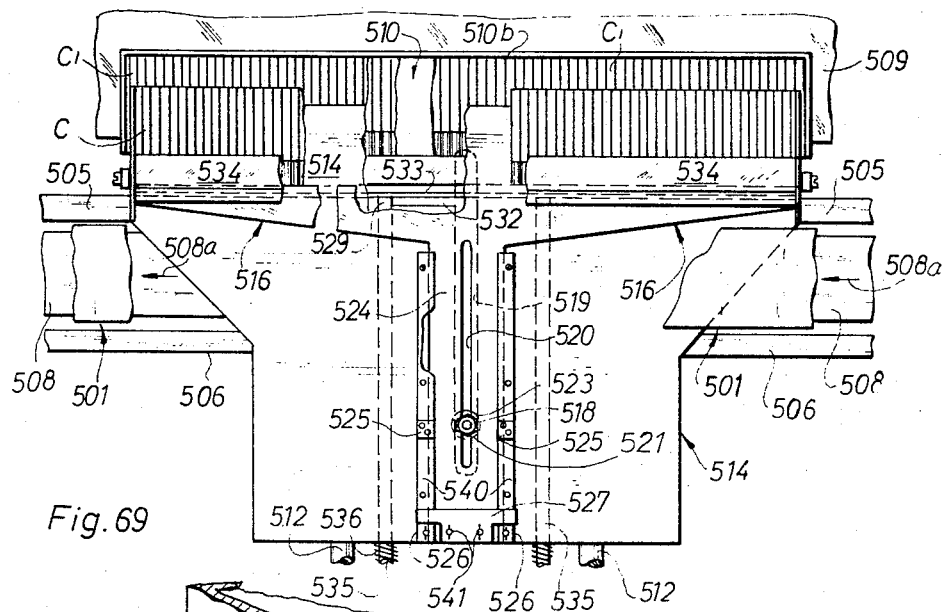
FIG. 69 is a top plan view of a transfer station including an arrangement of the type shown in FIGS. 64 to 68, certain parts of the arrangement being broken away for the sake of clarity.

The arrangement shown in FIGS. 64 to 70 constitutes a modification of the structure illustrated in FIGS. 57 to 63. The cigarettes are advanced by the upper run of an endless conveyer belt 508 which is trained around reversing rollers 507 and which is driven in a direction indicated in FIG. 69 by arrows 508a. The pneumatic lifter 501 which is located above the upper run of the belt 508 corresponds to the lifter 401 of FIGS. 57 to 63 and is provided with recesses 503 each of which may receive and retain a cigarette C by suction generated in the corresponding slot 504. The length of the transfer station including the arrangement of FIGS. 64 to 70 corresponds substantially to the length of the lifter 501 and to the length of a row of cigarettes C or $C_1$ (FIG. 69).

The reversing rollers 507 are mounted in spaced upstanding walls 505, 506 which form part of the machine frame. The wall 505 is disposed between the belt 508 and a vertically movable carrier in the form of a platform 509 which latter is adapted to support one or more trays 510 corresponding to the tray 415 of FIGS. 57 to 63. The platform 509 is movable up and down in rhythm with the operation of other component parts of the arrangement so as to move the tray 510 into requisite position for reception of consecutive rows of cigarettes which are conveyed by the belt 508 and which are thereupon raised above the belt by the lifter 501 prior to actual transfer into the tray 510.

The bottom portion of the wall 505 supports two spaced clamping bushes 511 (only one shown in each of FIGS. 64 to 68) for a pair of guide bars 512 (see FIG. 69) which are parallel with the longitudinal directions of the cigarettes C and which slidably support a reciprocable pusher 513. This pusher comprises a plate-like supporting member or blade 514 which is screwed fast to a holder 515, and a plunger 516 which is reciprocable with respect to the blade 514.

The wall 506 carries a bracket 517 which supports a vertical pin 518, the latter extending through a slot 519 provided in the blade 514 and through a slot 520 in the plunger 516. The pin 518 carries a pair of slidable thrust disks 521, and at least its upper end portion is provided with external threads to mate with an adjusting nut 523. A helical expansion spring 522 is mounted between the lower disk 521 and the upper side of the bracket 517 to bias the plunger 516 in upward direction, and a similar expansion spring 522a is mounted between the upper disk 521 and the nut 523 to counteract the bias of the spring 522 by tending to move the plunger 516 in downward direction. By adjusting the nut 523, the operator may select an optimum position for the plunger 516 so that the front end face of the plunger is aligned with the row of cigarettes C held in the recesses 503 of the lifter 501.

Figure 70:
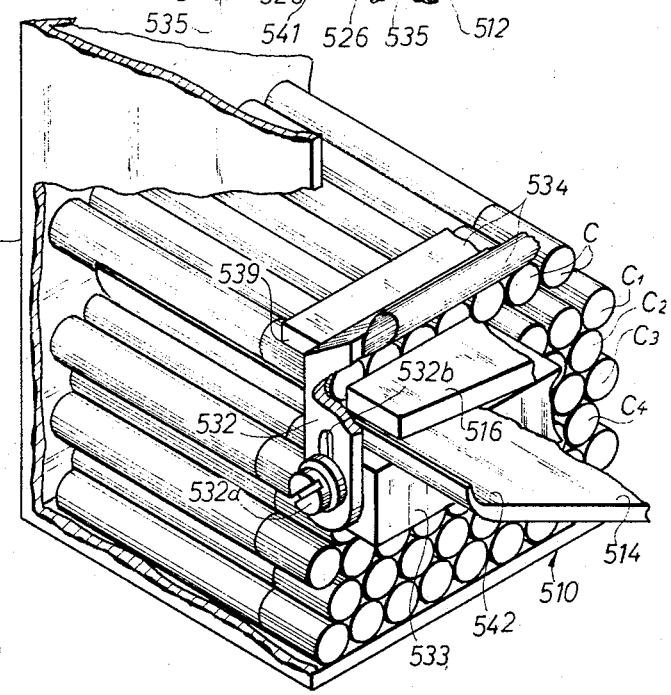
FIG. 70 is a greatly enlarged perspective view of a detail of the structure shown in FIGS. 64 to 69, illustrating the manner in which rows of stick-shaped articles are stacked in the storing device.

As shown in FIG. 69, the plunger 516 comprises an extension 524 which is provided with the aforementioned slot 520 so that, when the plunger 516 is caused to move toward or away from the lifter 501, the upper disk 521 actually slides along the upper side of the extension 524. The holder 515 is provided with two bores 528 which are parallel with the bars 512 and each of which receives a thrust rod 529 (see FIG. 69) with sufficient play to permit reciprocatory movements of the holder 515 along the rods 529. The forward end portions of the rods 529 extend through the space between the upper and lower runs of the belt 508 and project into and beyond the bores 530 provided in the wall 505. In addition, the rods 529 pass freely through bores 531 provided in the wall 506 and aligned with the corresponding bores 528, 530. The rods 529 are disposed in a common horizontal plane and their foremost ends carry mounting means in the form of upwardly extending brackets 532 supporting a horizontal smoothing or aligning ledge 533 which is adjacent to and which is reciprocable toward and away from the open side of the tray 510. The uppermost ends of the brackets 532 support a horizontal guide member 534 which corresponds to the guide member 339 of FIGS. 54 and 55. The vertical distance between the upper side of the supporting blade 514 and the underside of the guide member 534 approximates the diameter of a cigarette C. As shown in FIG. 70, the brackets 532 (only one shown) are adjustable with respect to the aligning ledge 533 by means of screws 532a which extend through slots 532b so that the position of the guide member 534 may be changed if the arrangement is to be utilized for transfer of different types of stick-shaped articles.

The rear end portions 535 of the thrust rods 529 are provided with external threads to mate with adjusting nuts 537, the latter also serving as abutments for helical expansion springs 536 whose front ends abut against the holder 515. As shown in FIGS. 64 to 68, the end portions 535 project rearwardly and beyond the holder 515. In addition, each thrust rod 529 carries an adjustable annular stop 538 which is secured thereto by a screw 538a. The stops 538 are located between the wall 506 and the holder 515. The position of the stops 538 determines the extent to which the holder 515 may entrain the thrust rods 529 in a direction toward the platform 509 in order to move the guide member 534 and the ledge 533 toward the tray 510.

Referring to FIG. 69, the extension 524, of the plunger 516 is reciprocable in parallel ways 540 secured to the blade 514. The slot 519 of the blade 514 is wider than the slot 520 in order to accommodate the lower disk 521 whereby the plunger 516 may be moved toward and away from the blade 514 merely by adjusting the position of the nut 523. The ways 540 carry pairs of adjustable stops 525, 526 which are located in the path and at opposite sides of an abutment member 527 provided at the rear end of the extension 524. This abutment member is secured to the extension 524 by means of U-shaped stirrups 541. The stops 525, 526 and the member 527 may be provided with suitable rubber pads or other cushioning means to avoid excessive wear or breakage of these parts in response to reciprocatory movements of the pusher 513. Similar impact-reducing cushions may be provided on the stops 538.

The position of the parts shown in FIG. 70 corresponds to that of FIG. 67 in which the supporting blade 514 is about to move a row of cigarettes into abutment with the side wall 510b of the tray 510. FIG. 70 further shows that the blade 514 is provided with upwardly extending arcuate side wall portions or stops 542 (only one shown) whose mutual distance equals the length of a row of cigarettes C. One of these sides wall portions 542 i.e. the one shown in FIG. 70) prevents the cigarettes located upstream of the row of cigarettes C from advancing beneath the lifter 501 while the cigarettes C are being transferred into the tray 510 to come to rest on the cigarettes $C_1$ forming the next lower row. It is assumed that the guide member 534 is spaced from the supporting blade 514 through a distance which exceeds only slightly the diameter of a cigarette C, and the height of the aligning ledge 533 also exceeds the diameter of a cigarette to make sure that, when moved to the position of FIGS. 67 or 70, it aligns the row of cigarettes $C_1$ with the row of cigarettes $C_2$ therebelow.

The arrangement of FIGS. 64 to 70 operates as follows:

In FIG. 64, the lifter 501 has removed from the belt 508 a row of cigarettes C which are retained in the recesses 503. These cigarettes were collected in a preceding step off the upper run of the advancing belt 508 and are held in the recesses 503 by suction generated in the slots 504. The lifter 501 is raised above and away from the belt in order to align the row of cigarettes C with the plunger 516. In the next step, the pusher 513 is caused to perform a forward stroke under the action of a pneumatic, hydraulic or otherwise constructed reciprocating device, not shown. The blade 514 follows immediately the forward movement of the pusher 513 because it is rigidly secured thereto, but the plunger 516 begins to participate in such movement only after the stops 526 reach and entrain the abutment member 527. While it is still free to move with respect to the plunger 516, the blade 514 advances beneath the row of cigarettes C (FIG. 65) which are being held in raised position by the lifter 501. In the position of FIG. 65, the relative movement between the blade 514 and the plunger 516 is terminated and the front end face of the plunger 516 is now in abutment with the right-hand ends of the cigarettes C. The pusher 513 continues its forward stroke and causes the plunger 516 to remove the cigarettes C from the respective recesses 503 by advancing the cigarettes toward the tray 510. The cigarettes travel with and are supported by the upper side of the blade 514 which latter passes above the ledge 533 (FIG. 66) to move the cigarettes along the underside of the guide member 534 and into the interior of the tray 510. In the position of FIG. 66, the holder 515 of the pusher 513 has reached the annular stops 538 and, since the pusher continues its forward stroke, the holder 515 now causes the thrust rods 529 to move in their respective bores 528, 530, 531 and to thereby advance the ledge 533 and the guide member 534 toward the tray 510 (FIG. 67). In FIG. 67, the pusher 513 has reached the end of its forward stroke and the row of cigarettes C is moved into abutment with the side wall 510b of the tray 510 to assume a position above but still spaced from the lower row $C_1$. The ledge 533 now bears against the row of cigarettes $C_1$ and pushes this row into abutment with the side wall 510b to make sure that the cigarettes $C_1$ are properly aligned with the cigarettes $C_2$ therebelow.

The pusher 513 now begins its return stroke and the springs 536 (which were free to expand during the forward stroke of the pusher) now entrain the thrust rods 529 in a direction to the right, as viewed in FIG. 68, so as to move the ledge 533 away from the tray 510. The plunger 516 does not immediately begin to participate in return movement of the pusher 513 because it is frictionally engaged by the disks 521 whereby the blade 514 slides with respect to the cigarettes C and is retracted from the interior of the tray 510. The cigarettes C abut against the front end face of the plunger 516 and, when the blade 514 is withdrawn, their leading ends are caused to descend by gravity so as to come to rest on the cigarettes $C_1$. The tilting of cigarettes C takes place while the front end portion of the blade 514 is still located in the interior of the tray 510, i.e. the cigarettes C are caused to tilt about the transversely extending upper edge 514a of the blade 514, whereby their trailing ends move into abutment with the front end face 539 of the guide member 534 (FIG. 68).

The pusher 513 continues its rearward stroke and, as soon as the stops 525 reach the abutment member 527, the blade 514 entrains the plunger 516 which now begins to participate in rearward movement of the pusher 513 and returns to the position of FIG. 64. During such return movement of the blade 514 and plunger 516, the trailing ends of the cigarettes C descend onto the cigarettes $C_1$ and the transferring operation is completed. The arrangement is now in a position to transfer the next row of cigarettes which are assembled in the recesses 503 of the lowered lifter 501 as soon as the arcuate stop 542 of the blade 514 is withdrawn from the path of cigarettes advancing with the upper run of the belt 508. Before the next row of cigarettes is transferred, the tray 510 descends through a distance approximating the diameter of a cigarette so as to be in proper position for deposition of a new row of cigarettes onto the cigarettes C.

Figure 71:
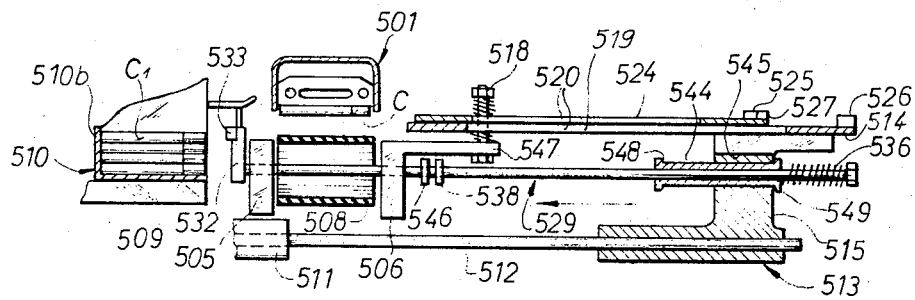
FIG. 71 is a somewhat schematic fragmentary partly elevational and partly sectional view of an arrangement utilizing a transfer mechanism which constitutes a slight modification of the mechanism shown in FIGS. 64 to 70, the arrangement being shown in retracted position of the transfer mechanism.
Figure 72:
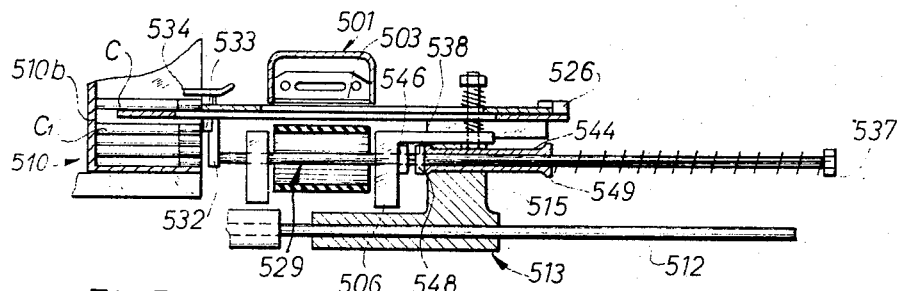
FIG. 72 illustrates the arrangement of FIG. 71 in a position in which the transfer mechanism has completed its forward stroke and the articles are about to be deposited in the storing device.
Figure 73:
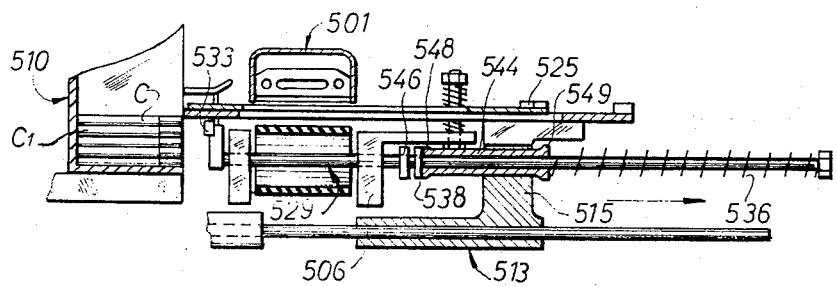
FIG. 73 shows the arrangement of FIGS. 71 and 72 in a further position in which the transfer mechanism is partly withdrawn and the articles are deposited on the uppermost row of articles already stacked in the storing device.

FIGS. 71 to 73 illustrate a modification of the just described arrangement wherein the thrust rods 529 are reciprocable in tubular elements or bushes 544 and wherein each of these bushes is reciprocable in the holder 515. As shown, each bush 544 is provided with spaced external collars 548, 549 which may be moved into abutment with the opposite sides of the holder 515. The bores 545 of the holder 515 in which the bushes 544 are received are shorter than the distance between the respective collars 548, 549.

In addition to the previously described annular stop 538, each rod 529 carries a second adjustable stop 546 which is disposed between the wall 506 and the respective stop 538. The bracket 517 of FIG. 64 is replaced by an arm 547 which is rigid with or which forms an integral part of the wall 506. The remaining parts of the arrangement shown in FIGS. 71 to 73 are identical with those forming part of the arrangement which is illustrated in FIGS. 64 to 70.

In retracted position of the pusher 513 (FIG. 71), the springs 536 maintain the rear collars 549 in abutment with the rear side of the holder 515. When the pusher begins its forward stroke, the front collars 548 are moved into abutment with the rear stops 538 and, once the bushes 544 assume the position of FIG. 72 (in which the collars 548 abut against the front side of the holder 515), the pusher 513 causes the rods 529 to move toward the tray 510 and to entrain the ledge 533 into abutment with the trailing ends of the cigarettes $C_1$. The front stops 546 limit the extent of forward movement of the ledges 533 and of the guide member 534 by abutting against the wall 506 when the pusher 513 completes its forward stroke. The holder 515 begins to move with respect to the bushes 544 at the time the front collars 548 of these bushes reach and engage the rear stops 538.

During a return stroke of the pusher 513 (FIG. 73), the holder 515 slides along the bushes 544 until its rear side engages the collar 549, whereupon the bushes 544 participate in rearward movement of the pusher and return to the position of FIG. 71. In the intermediate position of FIG. 73, the stops 546 are already spaced from the wall 506 but, as long as these stops remain in engagement with the wall 506, the ledge 533 also remains in engagement with the cigarettes $C_1$ and may assist to align the cigarettes C with the cigarettes $C_1$ if it is provided with a forwardly and downwardly inclined front end face (see FIGS. 74–76) along which the trailing ends of the cigarettes C slide onto the cigarettes $C_1$.

The arrangement of FIGS. 71–73 enables the ledge 533 to remain in engagement with the cigarettes which are stacked in the tray 510 for fairly long periods of time so that the ledge may assist in aligning the cigarettes C with the cigarettes $C_1$ in addition to its previously described function of pushing the cigarettes $C_1$ into abutment with the side wall 510b of the tray 510.

The arrangement of FIGS. 74 and 75 utilizes a vertically reciprocable carrier or platform 650 adapted to support a tray 651 into which rows of cigarettes C, $C_1$ . . . $C_6$, $C_n$ are deposited. The front side of the tray 651 may be closed by a vertically reciprocable cover 653 which is held in the position of FIG. 74 while the tray is being loaded and which may descend to and beyond the position of FIG. 75 when the tray is filled.

The cigarettes are transferred by a reciprocable plunger 654 which cooperates with a reciprocable supporting blade 659 in a manner as described in connection with FIGS. 64 to 70 or 71 to 73. Adjacent to the normally open side of the tray 651, there is provided a guide member 656 which is mounted on a reciprocable holder 655. The latter also supports an aligning or smoothing ledge 657 which defines with the guide member 656 a tunnel for the cigarettes C. The height of this tunnel equals or approximates the diameter of a cigarette plus the thickness of the supporting blade 659. The ledge 657 is provided with a forwardly and downwardly sloping front end face 658 for the trailing ends of the cigarettes C along which the cigarettes slide onto the cigarettes $C_1$.

FIG. 74 illustrates the arrangement in a position when the blade 659 and the plunger 654 perform a return stroke after having delivered a row of cigarettes C into the interior of the tray 651. The cigarettes C were held in the plane of the plunger 654 while resting on the blade 659 and, as soon as the blade 659 is withdrawn to the position of FIG. 74, the trailing ends of the cigarettes C begin to slide along the inclined front end face 658 and come to rest on the cigarettes $C_1$. The aligning step is completed when the tray 651 is caused to descend (arrow 650a) through a distance approximating the diameter of a cigarette.

FIG. 75 shows the tray 651 in nearly closed position after it has received the uppermost row of cigarettes Cu. The holder 655 is withdrawn to provide room for the descending cover 653. The plunger 654 and the blade 659 are in fully retracted position ready for the next operation which can begin as soon as the tray 651 is replaced by an empty tray.

It is advisable to couple the release mechanism for the cover 653 with the assembly which reciprocates the holder 655 so as to make sure that the movements of these parts are synchronized and that the cover 653 descends automatically as soon as the holder 655 is withdrawn to the position of FIG. 75. The holder 655 automatically returns into the position of FIG. 74 as soon as an empty tray is placed onto the carrier 650. The means for reciprocating the holder 655 preferably assumes the form of a pneumatic cylinder and piston assembly including a piston rod 655a which may be directly coupled to the holder. The release mechanism for the cover 653 may comprise a suitable catch (see FIG. 1) which is operatively connected with the holder 655 or with the reciprocating means for the holder and which releases the cover as soon as the holder 655 reaches the position of FIG. 75.

FIG. 76 illustrates a portion of a modified arrangement which is similar to the arrangement of FIGS. 74 and 75 but which operates without a supporting blade.

The spacing between the guide member 756 and the ledge 757 approximates or is slightly less than the diameter of a cigarette C. If the height of the passage defined by the ledge 757 and guide member 756 is slightly less than the diameter of a cigarette, the cigarettes are actually clamped in this passage and are held against tilting up to the very moment when the plunger 754 terminates its forward stroke. The compression of the cigarettes C shown in FIG. 76 is exaggerated for the sake of clarity.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and described to be secured by Letters Patent is:

1. An apparatus for stacking rows of elongated articles, comprising conveyer means for advancing a series of articles in an elongated path so that the articles remain substantially perpendicular to the longitudinal direction of said path; row forming means comprising means for consecutively lifting groups each of which contains a predetermined number of articles above said conveyer means and for arranging each of the thus lifted groups in at least one row consisting of equidistant parallel articles regardless of the spacing of such articles in said path; storing means adjacent to said lifting means; and transferring means for consecutively moving such rows of equidistant parallel articles in the longitudinal direction thereof from said lifting means into said storing means.

2. An apparatus for stacking rows of elongated articles, comprising conveyer means for advancing a series of unequally spaced articles in an elongated path so that the articles remain substantially perpendicular to the longitudinal direction of said path; row forming means comprising means for consecutively lifting groups each of which contains a predetermined number of articles above said conveyer means and for arranging each of the thus lifted groups of articles in at least one row of equidistant parallel articles; storing means adjacent to said lifting means; and transferring means for consecutively moving said rows of equidistant parallel articles in the longitudinal direction thereof from said lifting means into said storing means.

3. An apparatus for stacking rows of elongated articles, comprising a conveyer for advancing a series of articles in an elongated path so that the articles remain substantially perpendicular to the longitudinal direction of said path; a row forming arrangement comprising means for consecutively lifting groups each of which contains a predetermined number of articles above said conveyer and for arranging each of the thus lifted groups in at least one row consisting of equidistant parallel articles regardless of the spacing of such articles in said path means, one of said means being movable with respect to the other means between two spaced positions and in the longitudinal direction of said path; an arrangement for consecutively transferring such rows of equidistant parallel articles from said lifting means into said storing means in the longitudinal direction of the articles; and a shifting assembly connected with said one means for reciprocating said one means back and forth between said positions subsequent to consecutive transfers of rows of equidistant parallel articles from said lifting means into said storing means so that the rows of articles stacked in said storing means are staggered with respect to each other.

4. An apparatus as set forth in claim 3, further comprising means for stepwise lowering said storing means subsequent to each transfer of a row of equidistant parallel articles from said lifting means so that the uppermost row of articles stacked in said storing means is located at a level below the articles supported by said lifting means.

5. An apparatus for stacking rows of elongated articles of substantially circular cross section, comprising means for advancing a series of articles in an elongated path so that the articles remain substantially perpendicular to the longitudinal direction of said path; a row forming arrangement comprising means for consecutively lifting groups each of which contains a predetermined number of articles above said advancing means and for arranging each of the thus lifted groups in at least one row wherein the articles are closely adjacent to and are equally spaced from and parallel to each other regardless of the spacing of such articles in such path; storing means adjacent to said row forming arrangement, one of said means being movable with respect to the other means between two spaced positions in the longitudinal direction of said path, the distance between said positions being equal to one-half diameter of an article; and arrangement for transferring such rows of equidistant parallel articles from said lifting means into said storing means in the longitudinal direction of the articles whereby the rows of articles transferred into said storing means define upwardly opening gaps with each other; a shifting assembly connected with said one means for reciprocating said one means back and forth between said positions subsequent to consecutive transfers of said rows of articles from said lifting means into said storing device so that the rows of articles stacked in said storing device are staggered with respect to each other and that each newly transferred row of articles is received in the gaps defined by the uppermost row of articles in the storing device; and means for lowering said storing means subsequent to each transfer of a row of articles from said lifting means so that the gaps defined by the uppermost row of articles in the storing device are aligned with the articles supported by said lifting means.

6. In an apparatus for handling elongated stick-shaped articles, particularly for stacking rows containing predetermined numbers of cigarettes in trays and like storing devices, in combination, conveyor means for advancing a layer of articles in a predetermined path so that the articles are substantially perpendicular to the longitudinal direction of said path; row-forming means comprising vacuum generating means and lifter means disposed above said path and comprising a plurality of parallel holding means each substantially perpendicular to the longitudinal direction of and adjacent of said path, said lifter means having positioning means connected to said vacuum generating means and having intake ends opening into each of said holding means so that articles advancing beneath said lifter means may be sucked into said holding means; means for reciprocating said lifter means toward and away from said conveyer means; transferring means comprising ejecting means aligned with the articles sucked into said holding means for ejecting the articles in the longitudinal direction thereof; and a storing device adjacent to said lifter means and disposed opposite said ejecting means for receiving the articles ejected from said holding means.

7. A method of stacking rows of elongated stick-shaped articles, comprising the steps of advancing the articles in an elongated path so that the articles are substantially perpendicular to the longitudinal direction of said path; lifting a first group containing a predetermined number of articles above said path and simultaneously arranging the thus lifted group of articles in a row of equidistant parallel articles regardless of the spacing of such articles in said path; transferring the row of equidistant parallel articles in the longitudinal direction of the articles; depositing the row; and consecutively lifting, arranging, transferring and depositing additional rows of equidistant parallel articles onto said first mentioned row.

8. In a method of stacking rows of elongated articles of circular cross section, the steps of advancing the articles in an elongated path so that the articles are substantially perpendicular to the longitudinal direction of said path; lifting a first group containing a predetermined number of articles above said path and simultaneously arranging the thus lifted group of articles in a row in which the articles are equidistant from and parallel to each other regardless of the spacing of such articles in said path and in which each pair of adjacent articles defines an upwardly opening gap; transferring the row of equidistant parallel articles in the longitudinal direction of the articles; depositing the row; lifting a second group containing a predetermined number of articles above said path and simultaneously arranging the thus lifted second group of articles in a second row of equidistant parallel articles regardless of the spacing of such articles in said path; transferring the second row of equidistant parallel articles in the longitudinal direction of the articles; shifting one of said rows with respect to the other row so that the articles of the second row are aligned with the gaps defined by the articles of the first row; and depositing the second row onto the first row.

9. A method of stacking rows of elongated stick-shaped articles, comprising the steps of advancing a first group containing a predetermined number of articles in an elongated path so that the articles are substantially perpendicular to the longitudinal direction of said path; consecutively accelerating the articles of said group in said path and simultaneously lifting the accelerated articles seriatim above said path; arranging the thus lifted articles in a row containing a predetermined number of equidistant parallel articles regardless of the spacing of such articles in said path; transferring the row of equidistant parallel articles in the longitudinal direction of the lifted articles; depositing the row; and consecutively accelerating, lifting, arranging, transferring and depositing additional rows containing predetermined numbers of equidistant parallel articles onto said first mentioned row.

10. A method as set forth in claim 9, wherein the articles are accelerated and lifted by suction.

11. A method of forming rows of elongated articles, comprising the steps of advancing the articles in an elongated path so that the articles are substantially perpendicular to the longitudinal direction of said path; accelerating the foremost article in said path; lifting the accelerated article above said path and arresting the lifted article; and consecutively accelerating, lifting and arresting additional articles at the upstream side of said foremost article until the lifted articles form a row of desired length containing a predetermined number of equidistant parallel articles regardless of the spacing of such articles in said path.

12. A method as set forth in claim 11, wherein the articles are accelerated and lifted by suction.

13. A method as set forth in claim 11, wherein the articles are accelerated and lifted by blasts of air.

14. A method as set forth in claim 11, comprising the steps of forming additional rows of articles at the upstream side of said first mentioned row.

15. A method of forming rows of elongated articles, comprising the steps of continuously advancing a series of articles in an elongated path so that the articles are substantially perpendicular to the longitudinal direction of said path; arresting the foremost article at a predetermined point in said path so that a group of articles located upstream of said point forms with said foremost article a row containing a predetermined number of closely adjacent equidistant and parallel articles regardless of the spacing between the articles in said series of articles; lifting the row of articles above said path so that the articles at the upstream side of said row are free to advance toward said point; transferring the row of equidistant parallel articles in the longitudinal direction of the lifted articles; and consecutively forming, lifting and transferring additional rows of equidistant parallel articles at the upstream side of said point in said path.

16. A method of forming rows of articles of circular cross section as set forth in claim 15, wherein the number of articles in the first row of each pair of consecutively formed rows exceeds by one the number of articles in the second row, and further comprising the step of shifting the second row with respect to the first row through a distance equal to one-half diameter of an article.

17. In an apparatus for handling elongated articles, in combination, a conveyer comprising an endless belt having an elongated upper run and an outer side provided with transversely extending pockets; means for delivering articles into said pockets so that the articles are advanced by and travel along the upper run of said belt; row forming means comprising a plurality of equidistant holding means parallel with and located above said pockets, and means for producing currents of air and for thereby lifting predetermined numbers of articles seriatim from said pockets into said holding means so that said row holding means accumulates a row containing a predetermined number of equidistant parallel articles regardless of the spacing of such articles on said upper run; and means for transferring rows of equidistant parallel articles from and in the longitudinal direction of said holding means.

18. In an apparatus for handling elongated articles, in combination, conveyer means for advancing a series of articles in an elongated path so that the articles are substantially perpendicular to the longitudinal direction of said path; row forming means comprising vacuum generating means and a lifter disposed above and having an underside adjacent to said conveyer means, a plurality of parallel equidistant holding means including a foremost and a rearmost holding means, said holding means being provided at the underside of said lifter and each being perpendicular to the longitudinal direction of said path, said lifter defining internal channel means connected to said vacuum generating device and having intake ends opening into each of said holding means so that the articles advancing below said lifter may be sucked seriatim into said holding means; means for raising and lowering said lifter with respect to said conveyer means; and means for regulating the suction in said intake ends in response to raising and lowering of said lifter so that the suction increases and a predetermined number of articles is lifted into said holding means to form a row of equidistant parallel articles regardless of the spacing of such articles in said path when the lifter is lowered, and that the suction drops when the lifter is raised but remains sufficient to retain the thus lifted row of equidistant parallel articles in said holding means.

19. In an apparatus for handling elongated articles, in combination, conveyer means for advancing a series of articles in an elongated path so that the articles are substantially perpendicular to the longitudinal direction of said path; row forming means comprising vacuum generating means and a lifter disposed above and having an underside adjacent to said conveyer means, a plurality of parallel equidistant holding means including a foremost and rearmost holding means, said holding means being provided at the underside of said lifter and each being perpendicular to the longitudinal direction of said path, said lifter defining internal channel means connected to said vacuum generating means and having intake ends opening into each of said holding means so that the articles advancing below said lifter may be sucked seriatim into said holding means to form a row containing a predetermined number of equidistant parallel articles regardless of the spacing of such articles in said path; means for raising and lowering said lifter with respect to said conveyer means; and means aligned with the row of equidistant parallel articles in said holding means when the lifter is raised for transferring the row of articles from and in the longitudinal direction of said holding means.

20. A combination as set forth in claim 19, further comprising shifting means operatively connected with said raising and lowering means for alternately moving the lifter back and forth in the longitudinal direction of said path in response to each upward movement of the lifter.

21. A combination as set forth in claim 20, wherein said transferring means is a plunger having an end face adjacent to said holding means and having a length sufficient to transfer articles from all but one of said holding means, the length of movements imparted to said lifter by said shifting means being such that the plunger alternately leaves an article in said foremost and said rearmost holding means.

22. In an apparatus for handling elongated articles, particularly for stacking rows of tobacco containing products, in combination, conveyer means having an elongated upper run; means for driving said conveyer means; means for consecutively delivering articles onto said upper run so that the articles are substantially perpendicular to and advance along said upper run; row forming means comprising a plurality of equidistant parallel holding means located above and substantially perpendicular to the longitudinal direction of said upper run, and means for producing currents of air and for thereby lifting predetermined number of articles from said upper run into said holding means so that the thus lifted articles form a row of equidistant parallel articles regardless of the spacing of such articles on said upper run; and means for transferring the rows of equidistant parallel articles from and in the longitudinal direction of said holding means.

23. In an apparatus for handling elongated articles of substantially circular cross section, in combination, at least one storing device having an open side; vertically movable carrier means for supporting said storing device; means for intermittently lowering said carrier means through distances approximating the diameter of an article; a source of articles; conveyer means for advancing from said source a series of articles in an elongated path which extends along the open side of said storing device and whose longitudinal direction is substantially perpendicular to the articles; row forming means adjacent to the open side of said storing device for consecutively lifting predetermined numbers of articles off said conveyer means and for arranging the lifted articles in at least one row of equidistant articles; and an arrangement for consecutively transferring the articles from said lifting means into said storing device, said arrangement comprising plunger means adjacent to said conveyer means and located opposite said storing device, and means for reciprocating said plunger means in the longitudinal direction of the articles so that the plunger means transfers the articles from said lifting means into said storing device when moved toward said storing device and that the lifting means is free to form a new row of articles when the plunger is retracted.

24. A combination as set forth in claim 23, further comprising means for supporting the trailing ends of the articles during transfer from said lifting means into said storing device.

25. A combination as set forth in claim 23, wherein said storing device comprises vertically reciprocable cover means for closing said open side thereof.

26. A combination as set forth in claim 23, further comprising aligning means disposed at a level below said plunger means and connected with said reciprocating means for engaging at least one row of articles already contained in said storing device during transfer of articles from said lifting means.

27. A combination as set forth in claim 23, further comprising supporting means disposed between said storing device and said conveyer means, said supporting means located at a level immediately below said plunger means for supporting the rows of articles during transfer into said storing device.

28. A combination as set forth in claim 27, further comprising means for connecting said supporting means with said reciprocating means so that the supporting means moves toward said storing device during transfer of articles from said lifting means.

29. A combination as set forth in claim 23, wherein the means for reciprocating said plunger means comprises supporting means connected to and located below said plunger means, said supporting means projecting beyond said plunger means in a direction toward said storing device to support the trailing ends of the articles when the plunger means transfers the articles into said storing device.

30. A combination as set forth in claim 29, wherein said reciprocating means further comprises means for reciprocably connecting said supporting means with said plunger means so that the supporting means is first retractible with respect to said plunger means and thereupon retracts the plunger means away from said storing device whereby the articles transferred into said storing device are held by said plunger means against return movement with said supporting means.

31. A combination as set forth in claim 23, wherein said reciprocating means comprises a blade having a portion projecting beyond said plunger means in a direction toward said storing device when the plunger means transfers articles from said lifting means, said blade located at a level below said plunger means so as to support the trailing ends of the articles, means for slidably coupling said plunger means with said blade so that the blade is reciprocable with respect to said plunger means, spaced first and second stop means rigid with said blade, and abutment means rigid with said plunger means and located intermediate said first and second stop means, said plunger means being entrained by said blade in a direction to advance toward said storing device when said abutment means is engaged by one of said stop means and said plunger means being retracted when said abutment means is engaged by the other of said stop means.

32. A combination as set forth in claim 31, wherein the distance between said first and second abutment means is not substantially less than one-half of the length of an article.

33. In an apparatus for handling rows of elongated articles of substantially circular cross section, in combination, lifter means having an underside and comprising a plurality of parallel holding means located at said underside and each adapted to receive an article so that the articles received in said holding means form a row, each of said holding means having a first end and a second end; and an arrangement for transferring rows of articles from said holding means, said arrangement comprising supporting means located at one end of said holding means and at a level at least slightly below the row of articles in said holding means, guide means located above and defining with said supporting means a tunnel of a height approximating the diameter of an article, and plunger means adjacent to the other end of said holding means and located at the level of the row of articles in said holding means, said plunger means reciprocable in the longitudinal direction of said holding means toward and away from said supporting means so as to transfer the row of articles from said holding means into said tunnel when moved toward said supporting means and to permit said holding means to receive a new row of articles when moved in a direction away from said supporting means.

34. An apparatus for handling deformable articles as set forth in claim 33, wherein the height of said tunnel is less than the diameter of an article so that the articles are compressed while passing through said tunnel.

35. In an apparatus for handling elongated articles in which rows of aligned equidistant articles are consecutively transferred into storing devices, a transferring arrangement comprising, in combination, substantially plate-like plunger means having an article-engaging front end face; and means for reciprocating said plunger means, said reciprocating means comprising a plate-like supporting member adjacent to one side of said plunger means and having elongated slot means substantially perpendicular to said front end face, coupling means extending through said slot means and secured to said plunger means, stationary resilient means for normally holding said plunger means against movement with said supporting member, and pusher means connected with said supporting member for moving the same in the longitudinal direction of said slot means between two spaced positions whose distance exceeds the length of said slot means so that plunger means is entrained in a first direction against the action of said resilient means when said coupling means reaches one longitudinal end of said slot means and that the plunger means is entrained in the opposite direction against the action of said resilient means when the coupling means reaches the other longitudinal end of said slot means.

36. A transferring arrangement as set forth in claim 35, wherein said plunger means is located in a horizontal plane and wherein said supporting member is adjacent to the underside of said plunger means, said supporting member having a portion extending beyond the front end face of said plunger means when said coupling means is located at that end of said slot means which is nearer to said front end face.

37. In an apparatus for handling elongated articles in which rows of aligned equidistant articles are consecutively transferred into storing devices, a transferring arrangement comprising, in combination, substantially plate-like plunger means having an article-engaging front end face and elongated slot means perpendicular to said front end face; and means for reciprocating said plunger means, said reciprocating means comprising a supporting member adjacent to one side of said plunger means and having slot means in registry with said first mentioned slot means, stationary coupling means extending through said registering slot means, ways provided on said supporting member and parallel with said slot means for holding said plunger means against movement other than in the longitudinal direction of said slot means, resilient means provided on said coupling means for normally holding said plunger means against movement with said supporting member, spaced first and second stop means provided on said supporting member, abutment means provided on said plunger means and disposed intermediate said first and second stop means, and pusher means for reciprocating said supporting member along said coupling means, said plunger means being entrained by said supporting member against the action of said resilient means when end of said stop means engages said abutment means.

38. An arrangement as set forth in claim 37, wherein said supporting member comprises a portion projecting beyond said front end face when said abutment means is engaged by one of said stop means.

39. An arrangement as set forth in claim 38, further comprising guide means normally spaced from the front end face of said plunger means and means for connecting said guide means with said pusher means, said plunger means having an upper side and an underside and said supporting member adjacent to the underside of said plunger means, said guide means having an underside located at a level slightly above the upper side of said plunger means.

40. An arrangement as set forth in claim 39, wherein the means for connecting said guide means with said pusher means comprises thrust rod means parallel with said slot means and stop means provided on said thrust rod means and located in the path of said pusher means.

41. An arrangement as set forth in claim 40, wherein said pusher means comprises a holder and said connecting means further comprises sleeve means slidably extending through said holder and slidably receiving said thrust rod means, said sleeve means having spaced first and second flange means disposed at the opposite sides of said holder, resilient means for biasing one of said flange means into abutment with said holder and stop means provided on said thrust rod means for moving the other flange means into abutment with said holder when the pusher means is moved toward said last mentioned stop means whereby the holder entrains said thrust rod means and said guide means.

42. An arrangement as set forth in claim 39, further comprising elongated aligning means supported by said connecting means and located at a level below said guide means, said aligning means parallel with said front end face.

43. In an apparatus for handling rows of elongated articles, in combination, conveyer means for supporting a row of parallel articles; supporting means located at one side of said conveyer means and adjacent to the row of articles, said supporting means having a first surface portion located at a level slightly below the row of articles; a second surface portion located at a level above the row of articles, and a central portion extending between said surface portions; plunger means located at the level of the articles on said conveyer means and reciprocable in the longitudinal direction of the articles, said plunger means located at the other side of said conveyer means; and means for reciprocating said plunger means so that, when the plunger means is moved toward said stationary supporting means, the articles are moved along said central portion and onto said second surface portion.

44. A combination as set forth in claim 43, wherein the longitudinal ends of the articles extend beyond the conveyer means so that one end of each article is located above the first surface portion of said supporting means, and further comprising movable supporting means connected with said plunger means and normally located at a level below the other ends of the articles, and cam means for lifting said movable supporting means above said conveyor means during at least a portion of the movement of said plunger means toward said first mentioned supporting means so that the other ends of the articles are engaged and lifted by said movable supporting means when the plunger means transfers the row onto said first mentioned supporting means.

45. In an apparatus for handling rows of elongated articles, particularly for handling cigarettes, in combination, conveyer means for supporting a row containing a predetermined number of articles so that the longitudinal ends of the articles extend laterally beyond the conveyer means; stationary supporting means located at one side of said conveyer means and adjacent to the row of articles supported by said conveyer means; movable supporting means located at the other side of said conveyer means opposite said stationary supporting means; plunger means connected with said movable supporting means for transferring the row of articles onto and completely beyond said stationary supporting means; and means for reciprocating said movable supporting means and said plunger means toward and away from said stationary supporting means.

46. In an apparatus for handling rows of elongated articles, in combination, lifter means having an underside and comprising holding means located at said underside for supporting a row of parallel articles; first supporting means located at one side of said lifter means and at a level below the row of articles in said holding means; second supporting means located at the other side of said lifter means opposite said first supporting means and located at a level below the row of cigarettes in said holding means; plunger means connected with said second supporting means and located at the level of the articles; and means for reciprocating said plunger means and said second supporting means in the longitudinal direction of the articles toward and away from said first supporting means so that, when the plunger means moves toward said first supporting means, the articles are first supported by said second supporting means and are thereupon advanced by said plunger means toward and onto said first supporting means.

47. A combination as set forth in claim 46, comprising means for reciprocably connecting said plunger means with said second supporting means so that the second supporting means is movable with respect to said plunger means and is adapted to project beyond the plunger means in a direction toward said lifter means.

References Cited by the Examiner

UNITED STATES PATENTS

| | | | |
|---|---|---|---|
| 1,606,834 | 11/1926 | Halank | 53—148 |
| 2,470,795 | 5/1949 | Socke. | |
| 2,768,756 | 10/1956 | Horman | 198—24 X |
| 2,927,707 | 3/1960 | Reed. | |
| 2,933,207 | 4/1960 | Edmonds | 198—31.2 X |
| 2,972,845 | 2/1961 | Innocenti | 53—236 |
| 3,106,810 | 10/1963 | Pembroke | 53—148 |

FOREIGN PATENTS 295,347   11/1916   Germany.

MARVIN A. CHAMPION, *Primary Examiner.*

HUGO O. SCHULZ, *Examiner.*